US00RE48269E

(19) United States
(12) Reissued Patent
Yoshino

(10) Patent Number: US RE48,269 E
(45) Date of Reissued Patent: Oct. 20, 2020

(54) THRUST FOIL BEARING

(71) Applicant: NTN CORPORATION, Osaka (JP)

(72) Inventor: Masato Yoshino, Mie (JP)

(73) Assignee: NTN CORPORATION, Osaka (JP)

(21) Appl. No.: 15/483,456

(22) Filed: Apr. 10, 2017

Related U.S. Patent Documents

Reissue of:
(64) Patent No.: 9,033,579
Issued: May 19, 2015
Appl. No.: 14/235,580
PCT Filed: Jul. 25, 2012
PCT No.: PCT/JP2012/068790
§ 371 (c)(1),
(2) Date: Jan. 28, 2014
PCT Pub. No.: WO2013/018605
PCT Pub. Date: Feb. 7, 2013

(30) Foreign Application Priority Data

| | | |
|---|---|---|
| Aug. 1, 2011 | (JP) | 2011-168282 |
| Aug. 24, 2011 | (JP) | 2011-182717 |
| Aug. 29, 2011 | (JP) | 2011-186347 |
| Sep. 1, 2011 | (JP) | 2011-190636 |
| Sep. 14, 2011 | (JP) | 2011-200410 |

(51) Int. Cl.

| | |
|---|---|
| ***F16C 32/06*** | (2006.01) |
| ***F16C 17/04*** | (2006.01) |
| ***F16C 17/26*** | (2006.01) |
| ***F16C 17/10*** | (2006.01) |
| ***F16C 17/02*** | (2006.01) |

(52) U.S. Cl.
CPC ..... *F16C 17/042* (2013.01); *F16C 17/024* (2013.01); *F16C 17/10* (2013.01); *F16C 17/102* (2013.01); *F16C 17/26* (2013.01); *F16C 2360/23* (2013.01); *F16C 2360/24* (2013.01)

(58) Field of Classification Search
CPC ..... F16C 17/042; F16C 2360/24; F16C 17/10
See application file for complete search history.

(56) References Cited

U.S. PATENT DOCUMENTS

| | | | | |
|---|---|---|---|---|
| 3,434,762 | A | 3/1969 | Marley | |
| 3,635,534 | A * | 1/1972 | Barnett | F16C 17/024 384/106 |

(Continued)

FOREIGN PATENT DOCUMENTS

| | | |
|---|---|---|
| CN | 101716995 | 6/2010 |
| JP | 61-36725 | 3/1986 |

(Continued)

OTHER PUBLICATIONS

English language machine translation of CN101716995, 10 pgs.*

(Continued)

*Primary Examiner* — Robert M Fetsuga
(74) *Attorney, Agent, or Firm* — Wenderoth, Lind & Ponack, L.L.P.

(57) ABSTRACT

A thrust foil bearing includes a thrust member, and a foil member mounted to an end surface of the thrust member and having a thrust bearing surface that forms a thrust bearing gap. The foil member includes a foil that integrally includes a plurality of leaves each having a free end on one side in a circumferential direction and the thrust bearing surface, and a coupling portion for coupling the plurality of leaves to each other.

18 Claims, 33 Drawing Sheets

(56) References Cited

U.S. PATENT DOCUMENTS

| | | | | |
|---|---|---|---|---|
| 3,957,317 | A | 5/1976 | Silver | |
| 4,597,677 | A * | 7/1986 | Hagiwara et al. | 384/105 |
| 4,621,930 | A * | 11/1986 | Gu | F16C 17/042 384/105 |
| 5,529,398 | A * | 6/1996 | Bosley | 384/105 |
| 5,634,723 | A | 6/1997 | Agrawal | |
| 5,918,985 | A | 7/1999 | Bosley | |
| 6,261,002 | B1 * | 7/2001 | Ermilov et al. | 384/105 |
| 6,702,463 | B1 * | 3/2004 | Brockett et al. | 384/105 |
| 6,997,613 | B2 * | 2/2006 | Katou et al. | 384/106 |
| 7,364,363 | B2 * | 4/2008 | Kim et al. | 384/103 |
| 9,062,712 | B1 * | 6/2015 | Bruckner | F16C 37/002 |
| 2004/0120617 | A1 | 6/2004 | Fournier et al. | |
| 2009/0087299 | A1 | 4/2009 | Agrawal et al. | |
| 2011/0103725 | A1 | 5/2011 | Omori | |

FOREIGN PATENT DOCUMENTS

| | | |
|---|---|---|
| JP | 61-38321 | 3/1986 |
| JP | 62-39287 | 8/1987 |
| JP | 62-193139 | 12/1987 |
| JP | 63-45216 | 3/1988 |
| JP | 63-195412 | 8/1988 |
| JP | 04-008915 | 1/1992 |
| JP | 08-317586 | 11/1996 |
| JP | 11-148512 | 6/1999 |
| JP | 2002-364643 | 12/2002 |
| JP | 2003-262222 | 9/2003 |
| JP | 2006-510855 | 3/2006 |
| JP | 2006-105380 | 4/2006 |
| JP | 2007-92994 | 4/2007 |
| JP | 2008-241015 | 10/2008 |
| JP | 2009-299748 | 12/2009 |
| KR | 10-2005-0096594 | 10/2005 |

OTHER PUBLICATIONS

English language machine translation of JP2007092994, 5 pgs.*

Wikipedia Article, "Boundary layer" [online], [retrieved on Mar. 20, 2019], [Retrieved from https://en.wikipedia.org/wiki/Boundary_layer], 15 pgs.*

Formal English language translation of CN101716995, 40 pgs.*

International Search Report dated Oct. 16, 2012 in International (PCT) Application No. PCT/JP2012/068790.

International Preliminary Report on Patentability and Written Opinion of the International Searching Authority dated Feb. 13, 2014 in International (PCT) Application No. PCT/JP2012/068790.

Japanese Office Action dated Sep. 30, 2014 in corresponding Japanese Patent Application No. 2011-168282 with partial English translation.

Chinese Office Action dated Dec. 1, 2017 in corresponding Chinese Patent Application No. 201610561066.7 with English translation of Search Report.

Machine translation of JP 2007-092994 A obtained on Aug. 26, 2014.*

* cited by examiner

THRUST FOIL BEARING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is a reissue of U.S. Pat. No. 9,033,579, which issued on May 19, 2015 from application Ser. No. 14/235,580, which is a U.S. National Stage Application of International (PCT) Application No. PCT/JP2012/068790, filed on Jul. 25, 2012.*

TECHNICAL FIELD

The present invention relates to a thrust foil bearing for supporting a rotary member in thrust directions with fluid films formed in thrust bearing gaps that are formed by thrust bearing surfaces provided to thin film foils.

BACKGROUND ART

Shafts of a gas turbine and a supercharger (turbocharger) are driven to rotate at high speed. Further, turbine blades mounted to the shafts are exposed to high temperature. Thus, bearings for supporting those shafts are required to endure severe environments involving high temperature and high speed rotation. As bearings for such use, an oil-lubricated rolling bearing or a hydraulic dynamic pressure bearing may be used. However, use of the hydraulic bearings is restricted under such conditions that lubrication with a liquid such as a lubricating oil is difficult, that an auxiliary device of a lubricating oil circulatory system is difficult to provide separately in view of energy efficiency, and that shearing resistance of the liquid causes problems. Under the circumstance, attention has been focused on an air dynamic pressure bearing as a bearing suited to use under the above-mentioned conditions.

In general, the air dynamic pressure bearing has rigid bearing surfaces on both of a rotary side and a fixed side. However, in the air dynamic pressure bearing of this type, when stability limit is exceeded under a state in which management of bearing gaps that are formed between the bearing surfaces on the rotary side and the fixed side is insufficient, self-excited centrifugal whirling of a shaft, which is called a whirl, is liable to occur. Thus, it is important to manage the gaps in accordance with operating rotational speeds. However, in environments involving drastic temperature changes as in the case of the gas turbine and the supercharger, widths of the bearing gaps fluctuate due to influence of thermal expansion, and hence the gaps are significantly difficult to manage with high accuracy.

There has been known a foil bearing as a bearing that allows the gaps to be easily managed even in the environments involving drastic temperature changes. The foil bearing refers to a bearing having bearing surfaces formed of flexible thin films (foils) having low flexural rigidity. The foils of the foil bearing are flexible, and hence appropriate bearing gaps are formed in accordance with operating conditions such as a rotation speed of a shaft, a load on the shaft, and an ambient temperature. In this way, the foil bearing has a feature of excellent stability, and hence can be used at higher speed in comparison with general air dynamic pressure bearings. Further, in the general dynamic pressure bearings, bearing gaps of approximately several micrometers need to be constantly secured. Thus, in consideration of not only a manufacturing tolerance but also the thermal expansion in the drastic temperature changes, the gaps are difficult to strictly manage. Meanwhile, the foil bearing is advantageous in that bearing gaps only need to be managed to have a size of approximately several tens of micrometers, and hence the foil bearing can be easily manufactured and the bearing gaps can be easily managed.

Further, reactive forces generated in thrust directions by the high speed rotation of the turbine are applied to the shafts of the gas turbine and the supercharger, and hence the shafts need to be supported not only in a radial direction but also in the thrust directions. For example, Patent Literatures 1 to 3 each disclose a foil bearing for supporting a rotary shaft in a radial direction. Further, Patent Literatures 4 to 6 each disclose a leaf type thrust foil bearing as one type of a thrust foil bearing for supporting a rotary member in a thrust direction. The thrust foil bearing includes a plurality of leaves provided at a plurality of positions in a circumferential direction of an end surface of a fixed member. The leaves each include one circumferential end provided as a free end, and another circumferential end fixed to the end surface of the fixed member. Along with rotation of the rotary member, a thrust bearing gap is formed between bearing surfaces of the leaves and an opposing end surface of the rotary member, and a fluid film in the thrust bearing gap supports the rotary member in the thrust direction in a non-contact manner.

CITATION LIST

Patent Literature 1: Japanese Patent Application Laid-open No. 2002-364643

Patent Literature 2: Japanese Patent Application Laid-open No. 2003-262222

Patent Literature 3: Japanese Patent Application Laid-open No. 2009-299748

Patent Literature 4: Japanese Utility Model Application Laid-open No. Sho 61-36725

Patent Literature 5: Japanese Utility Model Application Laid-open No. Sho 61-38321

Patent Literature 6: Japanese Patent Application Laid-open No. Sho 63-195412

SUMMARY OF INVENTION

Technical Problems

[First Object]

However, in the leaf type thrust foil bearing as described above, the plurality of leaves need to be separately formed, and hence a larger number of components are required. Further, the leaves need to be assembled one by one to the end surface of the fixed member. Thus, assembly of the leaves requires time and effort, which causes a cost increase.

It is a first object of the present invention to achieve cost reduction by reducing the number of components of a leaf type thrust foil bearing and simplifying assembly of leaves.

[Second Object]

Load capacity of the above-mentioned fluid film alone in the thrust bearing gap is insufficient with respect to a high load that is applied in the thrust direction. As a result, the rotary member may be less stable, or the rotary member and the fixed member may be brought into contact with each other. In particular, thrust bearings used in the gas turbine and the supercharger have been strongly demanded to have higher load capacity in the thrust direction. This is because a high load is applied to the shafts in the thrust direction by high speed rotation of a rotor (blades).

For example, a foil bearing 2100 illustrated in FIG. 37 is a foil bearing of what is called a leaf type, including a plurality of (eight in the illustrated example) leaf foils 2110, and is used for support in the thrust direction. The leaf foils 2110 each include one circumferential end provided as a free end 2111, and another circumferential end provided as a fixed end 2112 that is fixed to an end surface of a disc-like thrust member 2120. The leaf foils 2110 each include a thrust bearing surface 2113. As illustrated in FIG. 38, a wedge-like thrust bearing gap 2140 is formed between an end surface 2131 of a rotary member 2130 and the thrust bearing surfaces 2113 of the leaf foils 2110. A small gap portion 2141 of the thrust bearing gap 2140 is formed near the free end 2111 of each of the leaf foils 2110. Immediately posterior to the free end 2111 (near the fixed end 2112 in the illustrated example), a large gap portion 2142 of the thrust bearing gap 2140 is formed. Along with rotation of the rotary member 2130 in a direction of the arrow C, a fluid film in the thrust bearing gap 2140 flows. At this time, pressure of the fluid becomes higher at the time of flowing in the small gap portion 2141, and relatively lower at the time of flowing in the large gap portion 2142. Thus, as illustrated in FIG. 39, a high pressure region H is formed near the free end 2111 of the leaf foil 2110, and a low pressure region L is formed near the fixed end 2112 of the leaf foil 2110. Note that, springs 2150 of FIG. 38 schematically illustrate spring property of the leaf foils 2110.

At this time, the fluid does not flow at a constant flow rate in the large gap portion 2142. Specifically, in the large gap portion 2142, the flow rate becomes higher near the end surface of the rotary member 2130 (upper part in the illustrated example) because the pressure of the fluid is high at the time of flowing therein from the small gap portion 2141 (high pressure region H) (refer to the arrow $v_1'$ in FIG. 38). Meanwhile, in the large gap portion 2142, the flow rate of the fluid is low near the thrust bearing surface 2113 (lower part in the illustrated example) because influence of the high pressure of the fluid that flows therein from the small gap portion 2141 is small (refer to the arrow $v_2'$ in FIG. 38). Thus, in the large gap portion 2142, the fluid in the lower part in FIG. 38 scarcely flows into the small gap portion 2141, and hence the pressure of the fluid is difficult to become higher in the small gap portion 2141.

The problems as described above occur in foil bearings in which a plurality of wedge-like films are formed on bearing surfaces on the same side, and specifically, those problems occur not only in foil bearings used for supporting a shaft in the thrust direction but also in foil bearings used for supporting the shaft in the radial direction.

Further, in the thrust foil bearing, a centrifugal force is generated along with the rotation of the rotary member, and may cause the fluid in the thrust bearing gap to flow radially outward. Thus, an amount of the fluid in the thrust bearing gap is reduced, with the result that the pressure of the fluid film becomes lower.

It is a second object of the present invention to increase load capacity of a thrust foil bearing.

[Third Object]

When the foil bearing for supporting the rotary member in the radial direction and the foil bearing for supporting the rotary member in the thrust direction are provided separately from each other, a larger number of components are required, which causes a cost increase.

Further, as described above, in the foil bearing, bearing gaps can be configured to be larger than those in rolling bearings and general air dynamic pressure bearings. However, a relative allowable moving amount of the shaft becomes larger in proportion to an increase in size of the bearing gaps. In particular, in a case where the foil bearing is used as a thrust bearing for supporting the shaft of the gas turbine or the supercharger, when an allowable moving amount in the thrust direction of the shaft is large, an allowable moving amount in the thrust direction of the blades (turbine or compressor) mounted to the shaft increases in proportion thereto. Thus, a clearance between the blades and a casing needs to be set to be somewhat larger in advance so that the blades do not interfere with the casing. When the clearance between the blades and the casing is set to be large, air leaks through the clearance. As a result, a rate of compression by the compressor or a rate of conversion by the turbine is deteriorated.

It is a third object of the present invention to reduce the number of components of a foil bearing for relatively supporting a shaft in a radial direction and a thrust direction, and to reduce a relative allowable moving amount in the thrust direction of the shaft.

Solution to Problems

[First Invention of Present Application]

According to a first invention of the present application, which has been made to achieve the above-mentioned first object, there is provided a thrust foil bearing comprising: a thrust member; and a foil member mounted to an end surface of the thrust member and having a thrust bearing surface that forms a thrust bearing gap, wherein the foil member comprises a foil integrally comprising: a plurality of leaves each comprising: a free end on one side in a circumferential direction; and the thrust bearing surface; and a coupling portion for coupling the plurality of leaves to each other.

In this way, the plurality of leaves are not provided independently but coupled to each other with the coupling portion to be integrated into a foil, and hence the number of components can be reduced. Further, the integrated foil is assembled to the end surface of the thrust member, and hence the plurality of leaves can be assembled at a time. Thus, assembly of the plurality of leaves is simplified. Still further, the plurality of leaves are integrated, and hence an assembly man-hour does not increase even when the number of leaves is increased. Thus, without causing a cost increase, the number of leaves can be increased to achieve higher load capacity in a thrust direction.

In the foil bearing described above, when silts are formed into a single foil so as to form the plurality of leaves and the coupling portion, the foil integrally comprising the plurality of leaves can be easily formed. When a plurality of foils described above are provided, and the plurality of leaves of one of the plurality of foils are inserted through the slits formed in another of the plurality of foils, the plurality of leaves of the one of the plurality of foils and the plurality of leaves of the another of the plurality of foils can be arranged alternately to each other in the circumferential direction. In this way, the plurality of leaves each having the thrust bearing surface can be arranged close to each other in the circumferential direction, and hence thrust load capacity of the bearing can be arbitrarily changed.

When the free end of each of the plurality of leaves comprises a radially outer edge portion inclined radially inward to a forward side in a rotational direction of a rotary member, air can be drawn from a space around the foil member into the thrust bearing gap. Thus, higher pressure is generated in the thrust bearing gap, and hence the thrust load capacity can be increased. Specifically, the free end of each of the plurality of leaves can be arranged, for example, in a spiral pattern of a pump-in type or a herringbone pattern.

When the foil bearing further comprises support portions arranged to support the plurality of leaves from an opposite side with respect to the thrust bearing surface, through adjustment of the number, a shape, and arrangement positions of the support portions, inclination angles of the plurality of leaves that are raised from a mounting surface, and a curved shape of the thrust bearing surface can be freely set. With this, the plurality of leaves can be designed into an optimum shape in accordance with required property.

In a foil bearing, during high speed operation, a fluid film is formed between the thrust bearing surface of the foil member and a surface opposed thereto, and those surfaces enter a non-contact state. However, a fluid film formed during a low speed rotation state at the time of actuation or a stop of the rotary member is difficult to have a thickness equal to or larger than surface roughnesses of the thrust bearing surface of the foil member, and the surface opposed thereto. Thus, the rotary member and a fixed member may come into contact with each other across the foil member, and a surface of the foil member may be damaged. As a countermeasure, coating is preferred to be provided to the thrust bearing surface of the foil member so as to prevent the damage.

Further, between the foils of the foil member, or between the foil and a foil mounting surface, sliding occurs along with a load fluctuation and vibration, and causes minute displacement. As a countermeasure, coating is preferred to be provided on a surface on an opposite side with respect to the thrust bearing surface of the foil of the foil member so as to prevent damage that may be caused by the sliding.

In many cases, the foil bearing is used at a position at which lubrication with a liquid is difficult, and hence the coating described above may comprise a DLC film, a titanium aluminum nitride film, or a molybdenum disulfide film. The DLC film and the titanium aluminum nitride film are each excellent in strength due to its hardness and a low friction coefficient. Meanwhile, the molybdenum disulfide film can be formed by jetting such as spraying, and hence can be easily formed into coating.

The thrust foil bearing as described above can be suitably used for supporting a rotor of a gas turbine or a supercharger.

[Second Invention of Present Application]

According to a second invention of the present application, which has been made to achieve the above-mentioned second object, there is provided a thrust foil bearing, comprising: a fixed member; a rotary member; and a foil member arranged between an end surface of the rotary member and an end surface of the fixed member and having a thrust bearing surface, wherein a thrust bearing gap is formed by the thrust bearing surface of the foil member, wherein the rotary member is supported in a thrust direction by a fluid film that is formed in the thrust bearing gap, wherein the fixed member comprises a magnet mounted thereto, wherein the rotary member comprises a magnet mounted thereto, and wherein the magnets are arranged to mutually generate repulsive forces in the thrust direction.

In this way, the fixed member and the rotary member have magnets mounted thereon so as to generate the repulsive forces in the thrust direction. Therefore, supportability in the thrust direction, which is obtained by pressure of the fluid film that is formed in the thrust bearing gap, can be assisted by the repulsive forces generated between the magnets. As a result, load capacity of the thrust foil bearing can be increased.

By the way, in a general dynamic pressure bearing having rigid bearing surfaces on both the rotary member and the fixed member, as described above, a value of the thrust bearing gap is constantly as markedly small as approximately several micrometers. Thus, when the fixed member and the rotary member comprise the magnets, a distance between the magnets is markedly reduced, and hence the repulsive forces generated between the magnets become relatively greater. For this reason, in a case where pressure of the fluid film in a bearing gap has not yet been sufficiently increased, for example, during low speed rotation immediately after actuation or immediately before a stop of the rotary member, the rotary member may be inclined with respect to the fixed member by influence of the repulsive forces between the magnets, and the rotary member may be less stable. Meanwhile, in the foil bearing, as described above, the value of the thrust bearing gap can be set to be relatively large. Thus, the magnets provided to the fixed member and the rotary member are arranged relatively apart from each other. As a result, the repulsive forces generated between the magnets are suppressed, and hence the risk of the inclination of the rotary member can be prevented. Then, the rotary member is rotated at higher speed, and a high load in the thrust direction is applied to the rotary member. As a result, the thrust bearing gap is narrowed. Thus, the distance between the magnets is reduced, and hence the repulsive forces therebetween become greater. In this way, the supportability in the thrust direction is enhanced. At this time, even when the repulsive forces generated between the magnets become greater, the risk of the inclination of the rotary member can be prevented. This is because the pressure of the fluid film in the bearing gap (in particular, radial bearing gap) has already been sufficiently increased by the high speed rotation. In this way, in the thrust foil bearing described above, the repulsive forces generated between the magnets are small when the rotary member is rotated at low rpm, and hence the risk of the inclination of the rotary member by the influence of the repulsive forces can be prevented. In addition, the repulsive forces generated between the magnets become greater when the rotary member is rotated at high rpm, and hence the supportability in the thrust direction is enhanced.

The magnets described above can be arranged, for example, along a circumferential direction (circumferential direction about a rotation axial center of the rotary member). In this case, when the magnets are each formed into a shape of a ring that is continuous over the entire circumference, the magnet can be easily mounted to the fixed member or the rotary member. Meanwhile, when the magnets described above each comprise a plurality of magnets arranged apart from each other in the circumferential direction, an entire diameter of the magnets can be freely set, and hence a degree of freedom in design can be increased. Further, in this case, the magnets can be each formed into an arbitrary shape, and hence existing magnets can be used. As a result, cost reduction can be achieved.

As described above, in the case where the magnets are arranged along the circumferential direction, when an outer diameter of the magnet mounted to the rotary member and an outer diameter of the magnet mounted to the fixed member are set to be different from each other, one of the magnets is arranged on a radially inner side with respect to another of the magnets. As a result, the rotary member is further stabilized in a radial direction. Specifically, as illustrated, for example, in FIG. 20A, in a case where ring-shaped magnets 1101 and 1102 having the same diameter are opposed to each other in the thrust direction, when the magnets 1101 and 1102 are decentered slightly in the radial direction as illustrated in FIG. 20B, repulsive forces generated between both the magnets 1101 and 1102 are applied in a direction in which the magnets 1101 and 1102 are further decentered in the radial direction (refer to the hollow arrow in FIG. 20B). Meanwhile, as illustrated in FIG. 21A, when ring-shaped magnets 1103 and 1104 having different outer diameters are arranged coaxially with each other in a manner that the magnet 1103 is arranged on the radially inner side with respect to the magnet 1104, as indicated by the hollow arrow in FIG. 21A, repulsive forces generated between the magnets 1103 and 1104 are applied in a direction in which the magnet 1103 having a small diameter is urged radially inward. Thus, as illustrated in FIG. 21B, even when the magnet 1103 having the small diameter is decentered slightly in the radial direction with respect to the magnet 1104 having a large diameter, radial components of the repulsive forces generated between both the magnets 1103 and 1104 allow the magnet 1103 having the small diameter to be urged to an axial center side of the magnet 1104 having the large diameter. In this way, radial decentering between the magnets 1103 and 1104 is corrected, and the rotary member is further stabilized in the radial direction.

When the thrust foil bearing is used in high temperature environments such as a gas turbine and a supercharger, a samarium cobalt magnet that exhibits satisfactory property even in the high temperature environment is preferred to be used.

The foil member described above may comprise a foil integrally comprising: a plurality of leaves each comprising a free end on one side in the circumferential direction and having the thrust bearing surface; and a coupling portion for coupling the plurality of leaves to each other. Further, a plurality of foils described above may be combined with each other to form the foil member.

In a foil bearing, during high speed operation, a fluid film is formed between the thrust bearing surface of the foil member and a surface opposed thereto, and those surfaces enter a non-contact state. However, a fluid film formed during a low speed rotation state at the time of actuation or a stop of the rotary member is difficult to have a thickness equal to or larger than surface roughnesses of the thrust bearing surface of the foil member, and the surface opposed thereto. Thus, the rotary member and the fixed member may come into contact with each other across the foil member, and a surface of the foil member may be damaged. As a countermeasure, coating is preferred to be provided to the thrust bearing surface of the foil member so as to prevent the damage.

Further, between the foils of the foil member, or between the foil and a foil mounting surface, sliding occurs along with a load fluctuation and vibration, and causes minute displacement. As a countermeasure, coating is preferred to be provided on a surface on an opposite side with respect to the thrust bearing surface of the foil of the foil member so as to prevent damage that may be caused by the sliding.

In many cases, the foil bearing is used at a position at which lubrication with a liquid is difficult, and hence the coating described above may comprise a DLC film, a titanium aluminum nitride film, or a molybdenum disulfide film. The DLC film and the titanium aluminum nitride film are each excellent in strength due to its hardness and a low friction coefficient. Meanwhile, the molybdenum disulfide film can be formed by jetting such as spraying, and hence can be easily formed into coating.

The thrust foil bearing as described above can be suitably used for supporting a rotor of a gas turbine or a supercharger.

[Third Invention of Present Application]

According to a third invention of the present application, which has been made to achieve the above-mentioned second object, there is provided a foil bearing, comprising: a fixed member; a rotary member; and a plurality of leaf foils arranged between the fixed member and the rotary member and each comprising a free end on one side in a circumferential direction, wherein a wedge-like bearing gap is formed by bearing surfaces provided to the plurality of leaf foils, wherein the rotary member is supported by a fluid film that is formed in the wedge-like bearing gap, and wherein the free end of each of the plurality of leaf foils comprises: a plurality of cutout portions; and a plurality of land portions that are continuous with the bearing surface, the plurality of cutout portions and the plurality of land portions being provided alternately to each other.

In this way, the plurality of cutout portions and the plurality of land portions are provided alternately to each other along the free end of each of the plurality of leaf foils. Therefore, the fluid in the wedge-like bearing gap is allowed to dynamically flow. As a result, pressure of the fluid in the wedge-like bearing gap can be increased. This is because of the following reason. For example, as illustrated in FIG. 25, when a free end 231 of each leaf foil 230 is formed into a zigzag shape so as to provide a plurality of cutout portions 231a and a plurality of land portions 231b alternately to each other, as illustrated in FIG. 23, a small gap portion T1 of a thrust bearing gap T is formed near each of the free ends 231. When a rotary member (flange portion 240) is rotated in a direction of the arrow D, the pressure of the fluid is increased in the small gap portions T1. A part of the high-pressure fluid is released toward a back side of the leaf foil 230 (opposite side with respect to a bearing surface 233) via the cutout portions 231a (refer to the arrow A in FIG. 23). Along therewith, the fluid flows in a part on a thrust member 221 side in a large gap portion T2 in the thrust bearing gap T (lower side in FIG. 23) (refer to the arrow $v_2$ in FIG. 23). As a result, a moving amount of the fluid in the large gap portion T2 in the thrust bearing gap T is increased, and hence a larger amount of the fluid flows from the large gap portion T2 into the small gap portion T1 in comparison with the case illustrated in FIG. 38. In this way, higher pressure is generated in the small gap portions T1.

The free end of each of the plurality of leaf foils can be formed, for example, into a zigzag shape (refer to FIGS. 24 and 25), or a corrugated shape (refer to FIG. 26).

The foil bearing described above may comprise a single foil integrally comprising the plurality of leaf foils and a coupling portion for coupling the plurality of leaf foils to each other. With this, the plurality of leaf foils can be mounted to the fixed member or the rotary member at a time. Further, when the plurality of foils described above are combined with each other to form a foil member, a larger number of leaf foils can be mounted to the fixed member or the rotary member at a time.

In the foil bearing described above, during high speed operation, a fluid film is formed between the bearing surface of each of the plurality of leaf foils and a surface opposed thereto, and those surfaces enter a non-contact state. However, a fluid film formed during a low speed rotation state at the time of actuation or a stop of the rotary member is difficult to have a thickness equal to or larger than surface roughnesses of the bearing surface of each of the plurality of leaf foils, and the surface opposed thereto. Thus, the rotary member and a fixed member may come into contact with each other across the plurality of leaf foils, and a surface of each of the plurality of leaf foils may be damaged. As a countermeasure, coating is preferred to be provided to the bearing surface of each of the plurality of leaf foils so as to prevent the damage.

Further, between the plurality of leaf foils, or between the leaf foil and a leaf foil fixing surface, sliding occurs along with a load fluctuation and vibration, and causes minute displacement. As a countermeasure, coating is preferred to be provided on a surface on an opposite side with respect to the bearing surface of the leaf foil so as to prevent damage that may be caused by the sliding.

In many cases, the foil bearing is used at a position at which lubrication with a liquid is difficult, and hence the coating described above may comprise a DLC film, a titanium aluminum nitride film, or a molybdenum disulfide film. The DLC film and the titanium aluminum nitride film are each excellent in strength due to its hardness and a low friction coefficient. Meanwhile, the molybdenum disulfide film can be formed by jetting such as spraying, and hence can be easily formed into coating.

The configuration described above is applicable not only to a foil bearing used for support in the thrust direction, but also to a foil bearing used for support in the radial direction.

The foil bearing as described above can be suitably used for supporting a rotor of a gas turbine or a supercharger.

[Fourth Invention of Present Application]

According to a fourth invention of the present application, which has been made to achieve the above-mentioned second object, there is provided a thrust foil bearing, comprising: a fixed member; a rotary member; and a foil member arranged between the fixed member and the rotary member, wherein a thrust bearing gap is formed by a thrust bearing surface provided to the foil member, wherein the rotary member is supported in a thrust direction by a fluid film that is formed in the thrust bearing gap, and wherein the thrust bearing surface comprises circumferentially long protrusions or circumferentially long grooves that are provided at a plurality of positions spaced apart from each other in a radial direction.

In this way, the thrust bearing surface comprises the circumferentially long protrusions or the circumferentially long grooves at the plurality of positions spaced apart from each other in the radial direction. Therefore, a fluid that may be caused by a centrifugal force to flow radially outward through the thrust bearing gap hits against the circumferentially long protrusions or the circumferentially long grooves, to thereby flow along a circumferential direction (rectifying effect). In this way, an amount of the fluid that is caused by the centrifugal force to flow radially outward through the thrust bearing gap can be reduced, and hence pressure of the fluid film that is formed in the thrust bearing gap can be increased. Note that, the "circumferentially long" shape refers to a shape that is longer in circumferential dimension than radial dimension, and comprises not only a circular-arc shape parallel to the circumferential direction, but also a circumferentially long rectangular shape (refer to FIG. 42) and a circumferentially long triangular shape (refer to FIG. 44).

The circumferentially long protrusions may comprise rectifying members fixed to the thrust bearing surface of the foil member. In this case, the rectifying members are brought as close as possible to an end surface of a counterpart member facing the rectifying members across the thrust bearing gap without bringing the rectifying members into contact with the end surface of the counterpart member. Thus, the rectifying effect can be further enhanced.

Meanwhile, the circumferentially long grooves can be easily formed in the foil member by a pressing process and the like, and hence a manufacturing cost can be reduced in comparison with that in a case where the rectifying members are fixed. When the circumferentially long grooves are set to be gradually smaller in groove width toward a forward side in a rotational direction or gradually larger in groove depth toward the forward side in the rotational direction, the rectifying effect can be further enhanced.

The configuration described above is applicable, for example, to a leaf type thrust foil bearing in which the foil member comprises a plurality of leaves each comprising a free end on one side in the circumferential direction. In this case, the foil member may comprise a foil integrally comprising: the plurality of leaves each comprising the free end on the one side in the circumferential direction and having the thrust bearing surface; and a coupling portion for coupling the plurality of leaves to each other. Further, a plurality of foils described above may be combined with each other to form the foil member.

In a foil bearing, during high speed operation, a fluid film is formed between the thrust bearing surface of the foil member and a surface opposed thereto, and those surfaces enter a non-contact state. However, a fluid film formed during a low speed rotation state at the time of actuation or a stop of the rotary member is difficult to have a thickness equal to or larger than surface roughnesses of the thrust bearing surface of the foil member, and the surface opposed thereto. Thus, the rotary member and the fixed member may come into contact with each other across the foil member, and a surface of the foil member may be damaged. As a countermeasure, coating is preferred to be provided to the thrust bearing surface of the foil member so as to prevent the damage.

Further, between the foils of the foil member, or between the foil and a foil mounting surface, sliding occurs along with a load fluctuation and vibration, and causes minute displacement. As a countermeasure, coating is preferred to be provided on a surface on an opposite side with respect to the thrust bearing surface of the foil of the foil member so as to prevent damage that may be caused by the sliding.

In many cases, the foil bearing is used at a position at which lubrication with a liquid is difficult, and hence the coating described above may comprise a DLC film, a titanium aluminum nitride film, or a molybdenum disulfide film. The DLC film and the titanium aluminum nitride film are each excellent in strength due to its hardness and a low friction coefficient. Meanwhile, the molybdenum disulfide film can be formed by jetting such as spraying, and hence can be easily formed into coating.

The thrust foil bearing as described above can be suitably used for supporting a rotor of a gas turbine or a supercharger.

[Fifth Invention of Present Application]

According to a fifth invention of the present application, which has been made to achieve the above-mentioned third object, there is provided a foil bearing, comprising: a shaft; an outer member having an inner periphery on which the shaft is inserted; and a foil member arranged between an outer peripheral surface of the shaft and an inner peripheral surface of the outer member and having a flexible bearing surface, wherein a bearing gap is formed by the flexible bearing surface of the foil member, wherein the shaft and the outer member are supported to rotate relative to each other by a fluid film that is formed in the bearing gap, wherein the outer peripheral surface of the shaft and the inner peripheral surface of the outer member respectively comprise tapered surfaces that are provided in pairs so as to face each other, wherein the foil member is mounted to one of the tapered surfaces, and wherein the bearing gap is formed between another of the tapered surfaces and the flexible bearing surface.

In this way, in the foil bearing according to the present invention, the bearing gap is formed between the flexible bearing surface of the foil member mounted to the one of the tapered surfaces, and the another of the tapered surfaces. In this case, supportability is generated in normal directions of the tapered surfaces, and hence a radial component and a thrust component of the supportability enable the shaft to be relatively supported in a radial direction and a thrust direction. Thus, with use of the foil bearing described above, the number of components can be reduced in comparison with a case where a bearing for support in the radial direction and a bearing for support in the thrust direction are provided separately from each other.

Further, in the foil bearing described above, the bearing gap is formed in a direction inclined with respect to the thrust direction (normal direction of each of the tapered surfaces), and hence an allowable moving amount in the thrust direction of the shaft with respect to the outer member can be reduced. Specifically, as illustrated, for example, in FIG. 58, when a bearing gap in the thrust direction is formed between a bearing surface 4102a of a foil 4102 mounted to a fixed member 4101 and an end surface 4104a of a flange portion 4104 of a rotary shaft 4103, a size X' of the thrust bearing gap is equal to an allowable moving amount x' in the thrust direction of the rotary shaft 4103 (x'=X'). Meanwhile, in the example illustrated in FIG. 59, an end surface 4201a of a fixed member 4201 and an end surface 4204a of a flange portion 4204 of a rotary shaft 4203 are each provided as a tapered surface inclined at an angle θ with respect to an axial direction, and a bearing gap is formed between a bearing surface 4202a of a foil 4202 mounted to the end surface 4201a of the fixed member 4201 and the end surface 4204a of the flange portion 4204. In this case, a thrust component corresponding to a size X of the bearing gap is equal to an allowable moving amount x in the thrust direction of the rotary shaft 4203 ($x=X\cdot\sin\theta$). Thus, when the size X' of the thrust bearing gap illustrated in FIG. 58 and the size X of the bearing gap illustrated in FIG. 59 are equal to each other, the allowable moving amount of the rotary shaft can be set to be smaller in the example illustrated in FIG. 59, in which the bearing gap is formed between the tapered surfaces ($x<x'$). Note that, in FIGS. 58 and 59, for the sake of better understanding, the sizes X and X' of the bearing gaps are illustrated on an exaggerated scale.

In the foil bearing described above, when the outer peripheral surface of the shaft and the inner peripheral surface of the outer member are provided with a pair of first tapered surfaces facing each other and each comprising a large diameter portion arranged on one side in the axial direction and a pair of second tapered surfaces facing each other and each comprising a large diameter portion arranged on another side in the axial direction, the first tapered surfaces and the second tapered surfaces enable the shaft to be supported in both thrust directions with respect to the outer member.

During relative rotation of the shaft and the outer member, a relative peripheral speed of each of the pairs of the tapered surfaces is higher on a large diameter side. Thus, pressure that is generated in the bearing gap is highest in the large diameter portion of each of the tapered surfaces. Therefore, when the first tapered surfaces and the second tapered surfaces are arranged in an axial alignment so as to locate the large diameter portions thereof on an outer side in the axial direction, an axial distance (bearing span) between the large diameter portions having high supportability can be set to be large. As a result, a moment rigidity of the foil bearing can be increased.

When the foil bearing as described above is used for supporting a rotor of a gas turbine or a supercharger, the allowable moving amount in the thrust direction of the shaft can be reduced. With this, a clearance between blades of a turbine or a compressor and a casing can be set to be small. As a result, a rate of compression by the compressor or a rate of conversion by the turbine can be increased.

Advantageous Effects of Invention

As described above, according to the first invention of the present application, the number of components of the leaf type thrust foil bearing can be reduced, and assembly of leaves can be simplified. Thus, cost reduction can be achieved.

Further, according to the second invention of the present application, load capacity of the thrust foil bearing can be increased by the repulsive forces between the magnets.

Still further, according to the third invention of the present application, the moving amount of the fluid in the bearing gap is increased, and hence pressure of the fluid film generated in the bearing gap can be increased. Thus, load capacity of the foil bearing can be increased.

Yet further, according to the fourth invention of the present application, the flow of the fluid in the thrust bearing gap is rectified in the circumferential direction, and hence pressure of the fluid film generated in the thrust bearing gap can be increased. Thus, load capacity of the thrust foil bearing can be increased.

Yet further, according to the fifth invention of the present application, in the foil bearing for relatively supporting the shaft in the radial direction and the thrust direction, the number of components of can be reduced, and a relative allowable moving amount in the thrust direction of the shaft can be reduced.

DESCRIPTION OF EMBODIMENTS

Now, description is made of embodiments of a first invention of the present application with reference to FIGS. 1 to 14.

Figure 1:
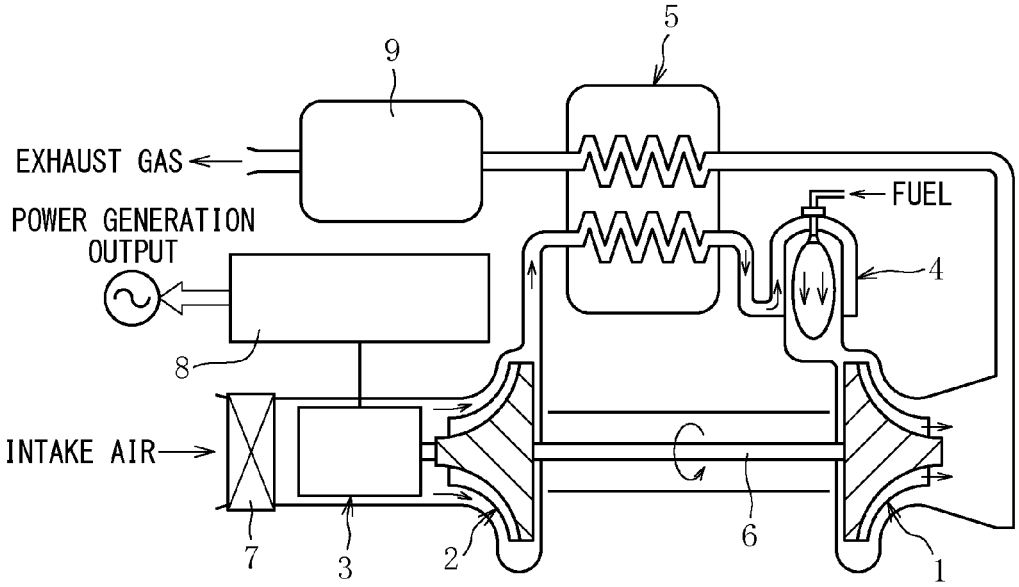
FIG. 1 is a schematic view of a micro gas turbine.

FIG. 1 is a schematic view of a configuration of a gas turbine apparatus called a micro gas turbine. The micro gas turbine mainly comprises a turbine 1 comprising a blade cascade, a compressor 2, a power generator 3, a combustor 4, and a regenerator 5. The turbine 1, the compressor 2, and the power generator 3 comprise a common shaft 6 extending in a horizontal direction. The shaft 6, the turbine 1, and the compressor 2 serve as an integrally rotatable rotor. Air sucked from an air-intake port 7 is compressed by the compressor 2, heated by the regenerator 5, and then fed into the combustor 4. The compressed air is mixed with fuel and combusted so as to rotate the turbine 1 with a high-temperature and high-pressure gas generated at that time. A rotational force of the turbine 1 is transmitted to the power generator 3 through intermediation of the shaft 6 so as to rotate the power generator 3. In this way, electric power is generated and output through intermediation of an inverter 8. The gas having rotated the turbine 1 has a relatively high temperature. Thus, the gas is fed into the regenerator 5 so that heat thereof is exchanged with that of the compressed air prior to the combustion. In this way, the heat of the gas after the combustion is reused. The gas that has been subjected to the heat exchange in the regenerator 5 passes through an exhaust heat recovery device 9, and then is exhausted as an exhaust gas.

Figure 2:
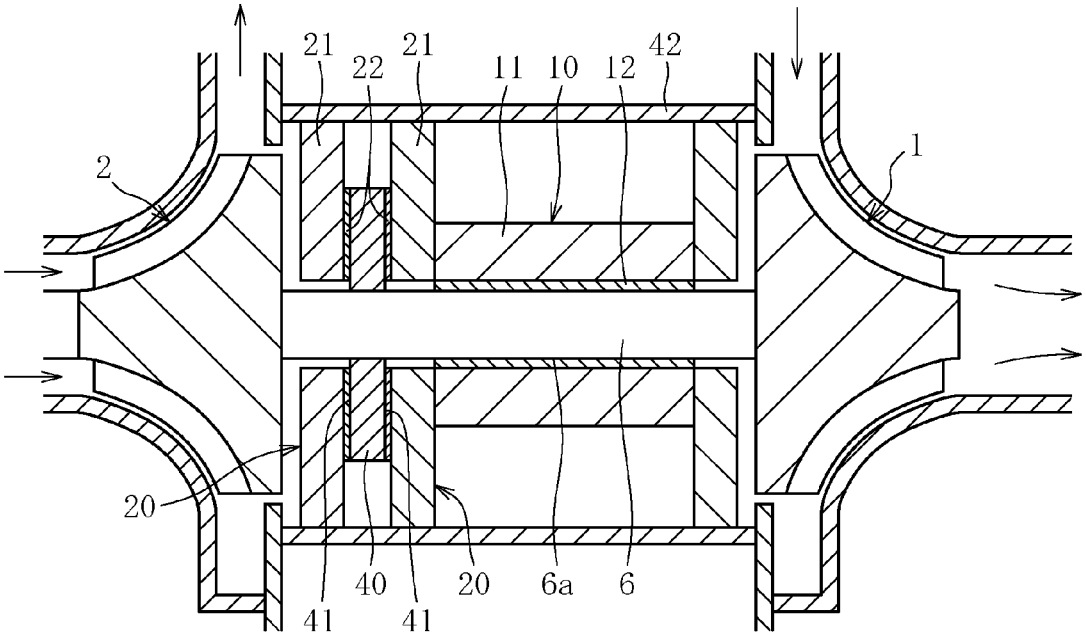
FIG. 2 is a sectional view of a support structure for a shaft of the micro gas turbine.

FIG. 2 illustrates a support structure for the rotor, specifically, a support structure for the shaft 6 in an axial region between the turbine 1 and the compressor 2. This region is adjacent to the turbine 1 rotated by the high-temperature and high-pressure gas, and hence an air dynamic pressure bearing, in particular, a foil bearing is suitably used in this region. Specifically, a radial foil bearing 10 supports the shaft 6 in a radial direction, and thrust foil bearings 20 according to an embodiment of the present invention support a flange portion 40 provided to the shaft 6 in both thrust directions. The radial foil bearing 10 and the thrust foil bearings 20 and 20 are fixed to a casing 42.

Figure 3:
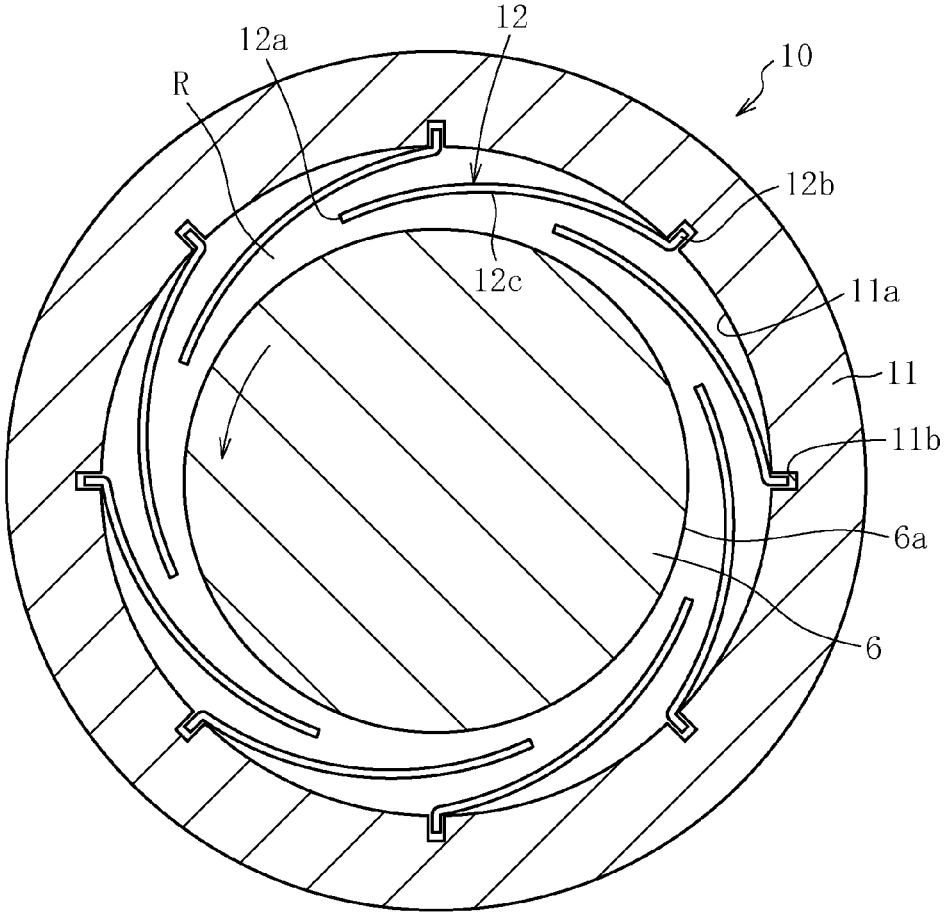
FIG. 3 is a sectional view of a radial foil bearing incorporated in the support structure.

The radial foil bearing 10 comprises a leaf type foil bearing. In this embodiment, as illustrated in FIG. 3, the radial foil bearing 10 comprises a cylindrical outer member 11 having an inner periphery on which the shaft 6 is inserted, and a plurality of leaves 12 fixed to an inner peripheral surface 11a of the outer member 11 and arranged in a circumferential array.

The leaves 12 are each formed of a belt-like foil made of a metal that is excellent in resiliency and processability, such as a steel material or a copper alloy, and having a thickness of from approximately 20 μm to 200 μm. As in this embodiment, in the air dynamic pressure bearing that uses air as a fluid film, a lubricating oil does not exist in an atmosphere, and hence a rust inhibiting effect by an oil cannot be expected. Carbon steel and brass can be taken as typical examples of the steel material and the copper alloy. However, general carbon steel is liable to corrode due to rust, and brass may be subjected to delayed cracking due to processing strain (this liability becomes higher in proportion to a Zn content in brass). Thus, it is preferred that the belt-like foil be made of stainless steel or bronze.

The leaves 12 each comprise an end portion 12a on one side in a circumferential direction (forward side in a rotational direction of the shaft 6, refer to the arrow), and an end portion 12b on another side in the circumferential direction. The end portion 12a is provided as a free end, and the end portion 12b is fixed to the outer member 11. The fixed end 12b of the leaf 12 is fitted and fixed to an axial groove 11b formed in the inner peripheral surface 11a of the outer member 11. A partial region on the free end 12a side of the leaf 12 is arranged to overlap in the radial direction with another leaf 12. The leaves 12 each have a radially inner surface that serves as a radial bearing surface 12c formed into a shape of a smooth curved surface without pores or steps.

Figure 4:
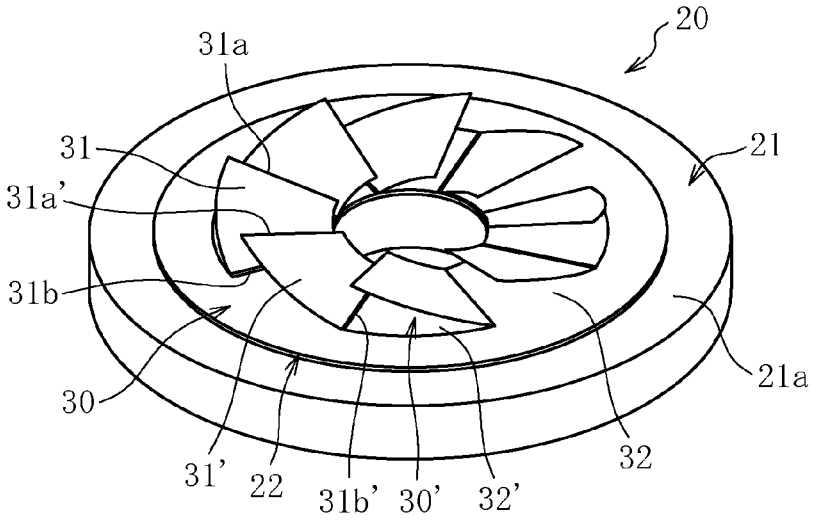
FIG. 4 is a perspective view of a thrust foil bearing according to an embodiment of a first invention of the present application, which is incorporated in the support structure.

The thrust foil bearings 20 each comprise a leaf type foil bearing. As illustrated in FIG. 4, the thrust foil bearings 20 in this embodiment each comprise a hollow-disc-like thrust member 21, and a foil member 22 fixed to an end surface 21a of the thrust member 21.

Figure 5:
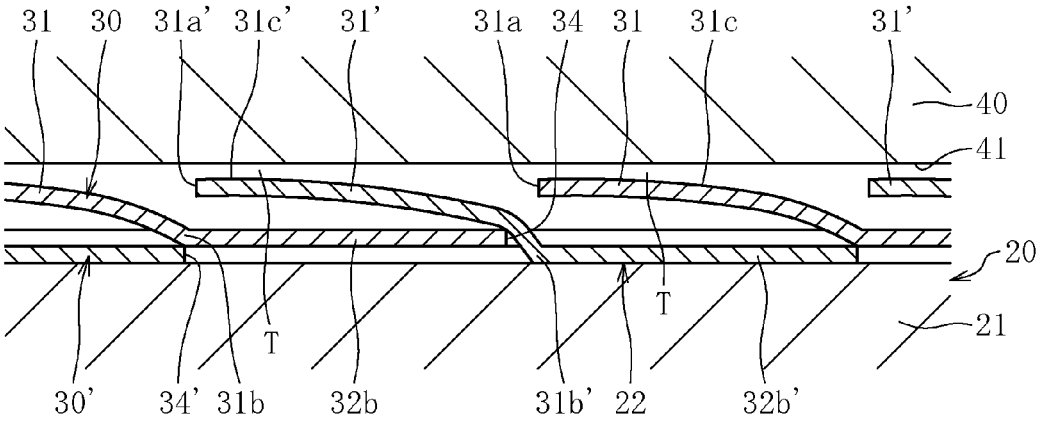
FIG. 5 is a sectional view of the thrust foil bearing.

The foil member 22 comprises a plurality of foils. In this embodiment, the foil member 22 comprises two metal foils 30 and 30' having the same shape (refer to FIG. 7A). The foils 30 and 30' of the foil member 22 respectively comprise leaves 31 and 31' arranged alternately to each other in the circumferential direction. As illustrated in FIG. 5, the leaves 31 and 31' respectively comprise end portions 31a and 31a' on the one side in the circumferential direction (forward side in the rotational direction of the shaft 6, that is, the left side in FIG. 5), which are provided as free ends and allow the leaves 31 and 31' to be freely deflected. The free ends 31a and 31a' of the leaves 31 and 31' are arranged at substantially the same circumferential positions as those of end portions 31b' and 31b on the another side in the circumferential direction of adjacent leaves 31' and 31. Surfaces on the flange portion 40 side (surface on an upper side in FIG. 5) of the plurality of leaves 31 and 31' serve as thrust bearing surfaces 31c and 31c' each formed into a shape of a smooth curved surface without pores or steps.

Here, description is made of a configuration of each of the foils 30 and 30' of the foil member 22. Note that, the foils 30 and 30' have completely the same configuration, and hence description is made only of the configuration of one foil 30, and description of another foil 30' is omitted (in the drawings, single quotation marks are added to reference symbols of parts of the another foil 30', which correspond to those of the one foil 30).

Figure 6:
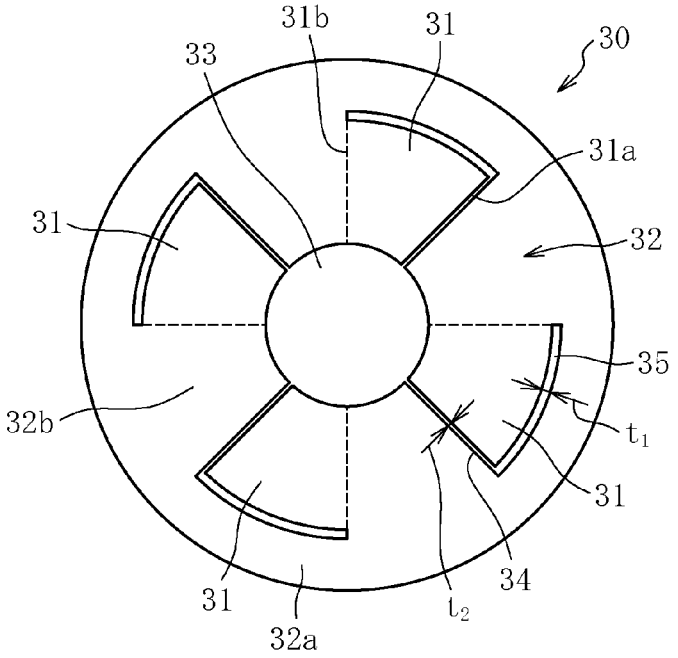
FIG. 6 is a plan view of a foil of the thrust foil bearing.

The foil 30 is made of the same material and has the same thickness as those of the leaves 12 described above. As illustrated in FIG. 6, the foil 30 integrally comprises the plurality of (four in the illustrated example) leaves 31 that are equiangularly arranged, and a coupling portion 32 for coupling the plurality of leaves 31 to each other. The foil 30 is formed into a circular shape, and comprises a circular hole 33 that is formed at a center thereof so as to allow the shaft 6 to pass therethrough. In this embodiment, the plurality of leaves 31 and the coupling portion 32 are formed by forming slits into a single foil 30 through a wire cutting process, a pressing process, and the like. Specifically, at a plurality of equiangular positions (four positions in the illustrated example) on the circular foil 30, there are provided radial slits 34 that extend radially outward from the hole 33 toward a position short of a radially outer rim of the foil 30. Then, circumferential slits 35 extend from radially outer ends of the slits 34 toward the another side in the circumferential direction (backward side in the rotational direction of the shaft 6, that is, counterclockwise direction in FIG. 6). The circumferential slits 35 extend in the circumferential direction up to central portions of adjacent radial slits 34. The circumferential slits 35 each have a length approximately equal to ⅛ of the entire circumference in the illustrated example. The circumferential slits 35 each have a width $t_1$ that is larger than a width $t_2$ of each of the radial slits 34 ($t_1>t_2$). When the radial slits 34 and the circumferential slits 35 are formed into the foil 30, the plurality of leaves 31 each having the end portion 31a provided on the one side in the circumferential direction as the free end that is freely movable upward and downward in the axial direction, and the coupling portion 32 for coupling the leaves 31 to each other can be formed at a time. The coupling portion 32 comprises an annular portion 32a surrounding outer peripheries of the plurality of leaves 31, and a plurality of (four in the illustrated example) extending portions 32b extending radially inward from the annular portion 32a. The extending portions 32b are continuous with the end portions 31b on the another side in the circumferential direction of the leaves 31 (indicated by dotted lines in FIG. 6). In the illustrated example, the extending portions 32b of the coupling portion 32 and the leaves 31 are equal to each other in circumferential length, and provided alternately to each other in the circumferential direction.

Next, with reference to FIG. 7, description is made of a method of manufacturing the thrust foil bearing 20, specifically, a method of assembling the two foils 30 and 30' into the foil member 22. Note that, the two foils 30 and 30' are made of completely the same material and formed into completely the same shape. However, in FIG. 7, for the sake of better understanding, the one foil 30' is indicated by a dotted pattern. Further, a vertical direction in this description corresponds to a central axis direction of the foils 30 and 30'.

Figure 7A:
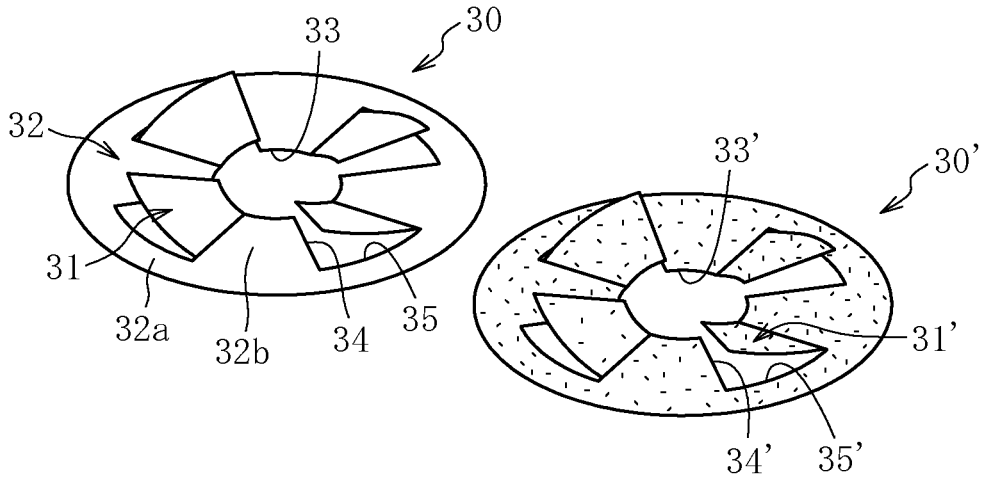
FIG. 7A is a perspective view illustrating how two foils are assembled.
Figure 7B:
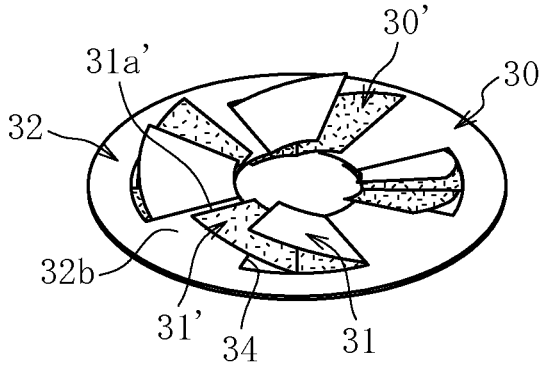
FIG. 7B is another perspective view illustrating how the two foils are assembled.
Figure 7C:
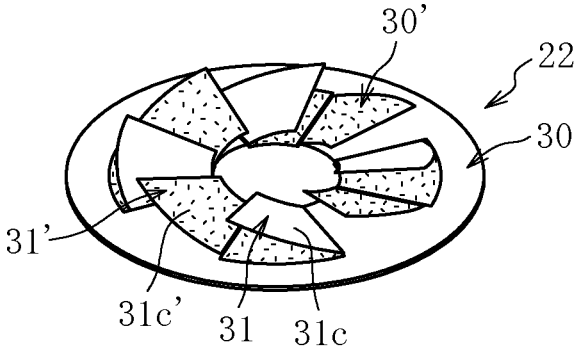
FIG. 7C is still another perspective view illustrating how the two foils are assembled.

First, the two foils 30 and 30' illustrated in FIG. 7A are arranged in a vertically stacked manner as illustrated in FIG. 7B. The free ends 31a' of the leaves 31' of the lower foil 30' are inserted through the radial slits 34 of the upper foil 30. With this, the free ends 31a' of the leaves 31' of the lower foil 30' are arranged above the coupling portion 32 (extending portions 32b) of the upper foil 30. Then, the two foils 30 and 30' are rotated relative to each other so that the free ends 31a' of the leaves 31' of the lower foil 30' reach a position above the end portions 31b of the leaves 31 of the upper foil 30 as illustrated in FIG. 7C. In this way, the foil member 22 comprising the leaves 31 of the upper foil 30 and the leaves 31' of the lower foil 30', which are arranged alternately to each other in the circumferential direction, can be obtained. In this case, the thrust bearing surfaces 31c and 31c' that serve as the upper surfaces of the leaves 31 and 31' are arranged alternately to and seamlessly with each other in the circumferential direction.

After the two foils 30 and 30' are integrated with each other as described above, the foil member 22 is fixed to the end surface 21a of the thrust member 21 (refer to FIG. 4). Fixing means is not particularly limited, and the foil member 22 is fixed, for example, by bonding or welding. More specifically, under a state in which the two foils 30 and 30' are stacked on each other, the two foils 30 and 30' are fixed to the thrust member 21 at a time by welding at a plurality of circumferential points of the annular portions 32a and 32a' of the coupling portions 32 and 32'. In this way, the thrust foil bearings 20 are completed (refer to FIG. 2).

As described above, the plurality of leaves 31 and 31' of the thrust foil bearing 20 are integrated with each other with the coupling portions 32 and 32'. Thus, in comparison with a case where the plurality of leaves are provided separately one by one, the number of components is reduced, and an operation of assembling the leaves 31 and 31' to the thrust member can be significantly simplified. Further, by combining the two foils 30 and 30' with each other as described above, a large number of leaves 31 and 31' can be easily provided, and hence load capacity in thrust directions can be increased.

Along with rotation of the shaft 6 to the one side in the circumferential direction, a radial bearing gap R is formed between the radial bearing surfaces 12c of the leaves 12 of the radial foil bearing 10 and the outer peripheral surface 6a of the shaft 6. A fluid film (air film) is formed in the radial bearing gap R, and supports the shaft 6 in the radial direction in a non-contact manner (refer to FIG. 3). Simultaneously, at a position between end surfaces 41 on both axial sides of the flange portion 40 and the thrust bearing surfaces 31c and 31c' of each of the thrust foil bearings 20 provided on both the axial sides with respect to the flange portion 40, there are formed thrust bearing gaps T narrowed in the axial direction toward the one side in the circumferential direction. Fluid films (air films) are formed in the thrust bearing gaps T, and support the shaft 6 in both the thrust directions in a non-contact manner (refer to FIG. 5). At this time, the leaves 12 of the radial foil bearing 10 and the leaves 31 and 31' of each of the thrust foil bearings 20 are flexible, and hence the bearing surfaces 12c, 31c, and 31' of the leaves 12, 31, and 31' are arbitrarily deformed in accordance with operating conditions such as a load, a rotation speed of the shaft 6, and an ambient temperature. Thus, the radial bearing gap R and the thrust bearing gaps T are automatically adjusted to have appropriate widths in accordance with the operating conditions. As a result, even under severe conditions involving high temperature and high speed rotation, the radial bearing gap R and the thrust bearing gaps T can be managed to have optimum widths, and hence the shaft 6 can be stably supported. Note that, the widths of the radial bearing gap R and the thrust bearing gaps T are actually as fine as approximately several tens of micrometers, but are illustrated on an exaggerated scale in FIGS. 3 and 5.

In the foil bearings 10 and 20, air films formed during low speed rotation immediately before stop of the shaft 6 or immediately after actuation of the shaft 6 are difficult to have a thickness equal to or larger than surface roughnesses of the radial bearing surface 12c of each of the leaves 12, the thrust bearing surfaces 31c and 31c' of the leaves 31 and 31', and the outer peripheral surface 6a of the shaft 6. Thus, metal contact occurs between the radial bearing surfaces 12c and the outer peripheral surface 6a of the shaft 6, and between the thrust bearing surfaces 31c and 31c' and the flange portion 40. In order to reduce a frictional force generated by the metal contact so that damage on the leaves 12, 31, and 31' and torque are reduced, it is desired that the radial bearing surfaces 12c and the thrust bearing surfaces 31c and 31c' be provided with coating for reducing friction of the surfaces. As the coating of this type, there may be used, for example, a DLC film, a titanium aluminum nitride film, or a molybdenum disulfide film. The DLC film, the titanium, or aluminum nitride film can be formed through CVD or PVD, and the molybdenum disulfide film can be easily formed through spraying. In particular, the DLC film and the titanium aluminum nitride film are hard. Thus, when the coating is formed of those films, abrasion resistance of the radial bearing surfaces 12c and the thrust bearing surfaces 31c and 31c' can also be enhanced. As a result, a bearing life can be prolonged. Note that, the coating as described above may be formed not only on the radial bearing surfaces 12c and the thrust bearing surfaces 31c and 31c' but also on the opposed side, that is, the outer peripheral surface 6a of the shaft 6 and the end surfaces 41 of the flange portion 40.

During an operation of the bearing, slight sliding occurs not only between back surfaces of the leaves 12 (surfaces on an opposite side with respect to the radial bearing surfaces 12c) and the inner peripheral surface 11a of the outer member 11, but also between back surfaces of the leaves 31 and 31' (surfaces on an opposite side with respect to the thrust bearing surfaces 31c and 31c') and the end surface 21a of each of the thrust members 21. Thus, the coating described above may be formed also on those sliding parts, specifically, one of or both of the back surfaces of the leaves 12, 31, and 31', and parts in contact therewith, that is, the inner peripheral surface 11a of the outer member 11 and the end surface 21a of each of the thrust members 21 so as to enhance abrasion resistance. Note that, in order to achieve a greater vibration damping effect, it may be preferred to generate a frictional force at those sliding portions to some extent. Thus, the coating on those parts needs not have significantly low frictional property. For those reasons, it is preferred that the DLC film, the titanium, or aluminum nitride film be used as the coating on those parts.

The present invention is not limited to the embodiment described above. Note that, in the following description, parts having the same functions as those in the embodiment described above are denoted by the same reference symbols, and redundant description thereof is omitted.

Figure 8:
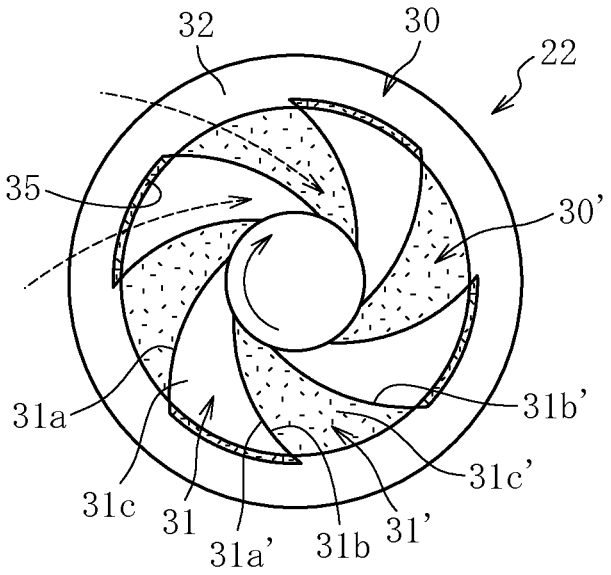
FIG. 8 is a plan view of a foil member of a thrust foil bearing according to another embodiment of the first invention.
Figure 9:
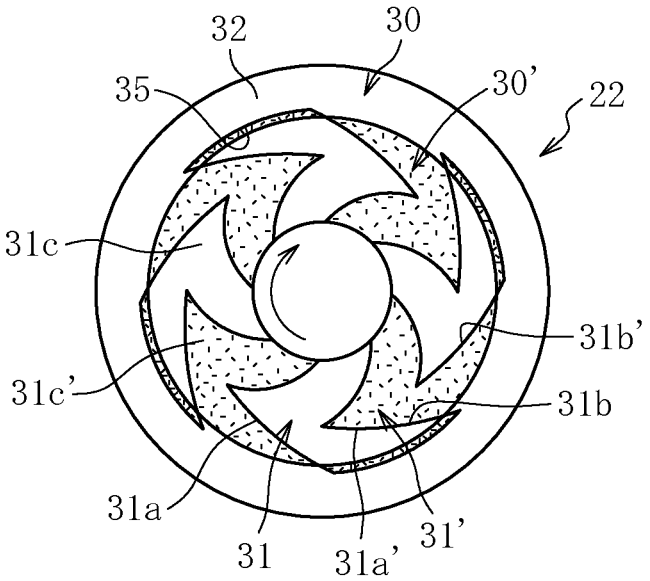
FIG. 9 is a plan view of a foil member of a thrust foil bearing according to still another embodiment of the first invention.
Figure 10:
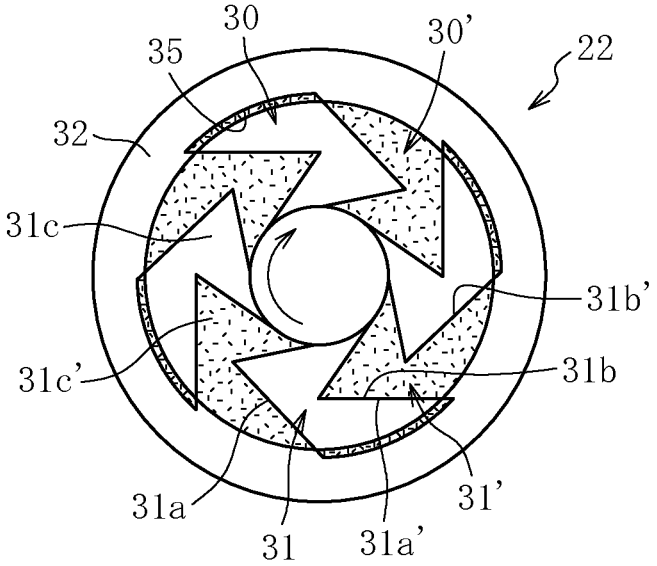
FIG. 10 is a plan view of a foil member of a thrust foil bearing according to yet another embodiment of the first invention.

The shapes of the leaves 31 and 31' of the thrust foil bearings 20 are not limited to those in the embodiment described above. For example, as illustrated in FIGS. 8 to 11, radially outer edges of the free ends 31a and 31a' of the leaves 31 and 31' may be inclined radially inward to the forward side in the rotational direction of the shaft 6. With this, along with the rotation of the shaft 6, air on the radially outer side of the thrust foil bearings 20 is fed to the radially inner side along the leaves 31 and 31' (refer to dotted-line arrows in FIG. 8). Thus, a larger amount of air can be fed into the thrust bearing gaps T, and hence higher pressure can be generated in the thrust bearing gaps T. Specifically, as illustrated, for example, in FIG. 8, the free ends 31a and 31a' of the leaves 31 and 31' can be arrayed in a spiral pattern of a pump-in type. In this case, the free ends 31a and 31a' may be formed into a curved shape as illustrated in FIG. 8, or may be formed into a linear shape (not shown). Alternatively, as illustrated in FIGS. 9 and 10, the free ends 31a and 31a' of the leaves 31 and 31' may be arrayed in a herringbone pattern. The herringbone pattern refers to a substantially V-shape in which the radially outer edges and radially inner edges of the free ends 31a and 31a' are inclined to a radial center and to the forward side in the rotational direction of the shaft 6. In this case, the free ends 31a and 31a' may be formed into a curved shape (refer to FIG. 9), or may be formed into a linear shape (refer to FIG. 10). Note that, in FIGS. 8 to 10, as in FIG. 7, the one foil 30' of the two foils 30 and 30' having the same shape is indicated by a dotted pattern.

Figure 11:
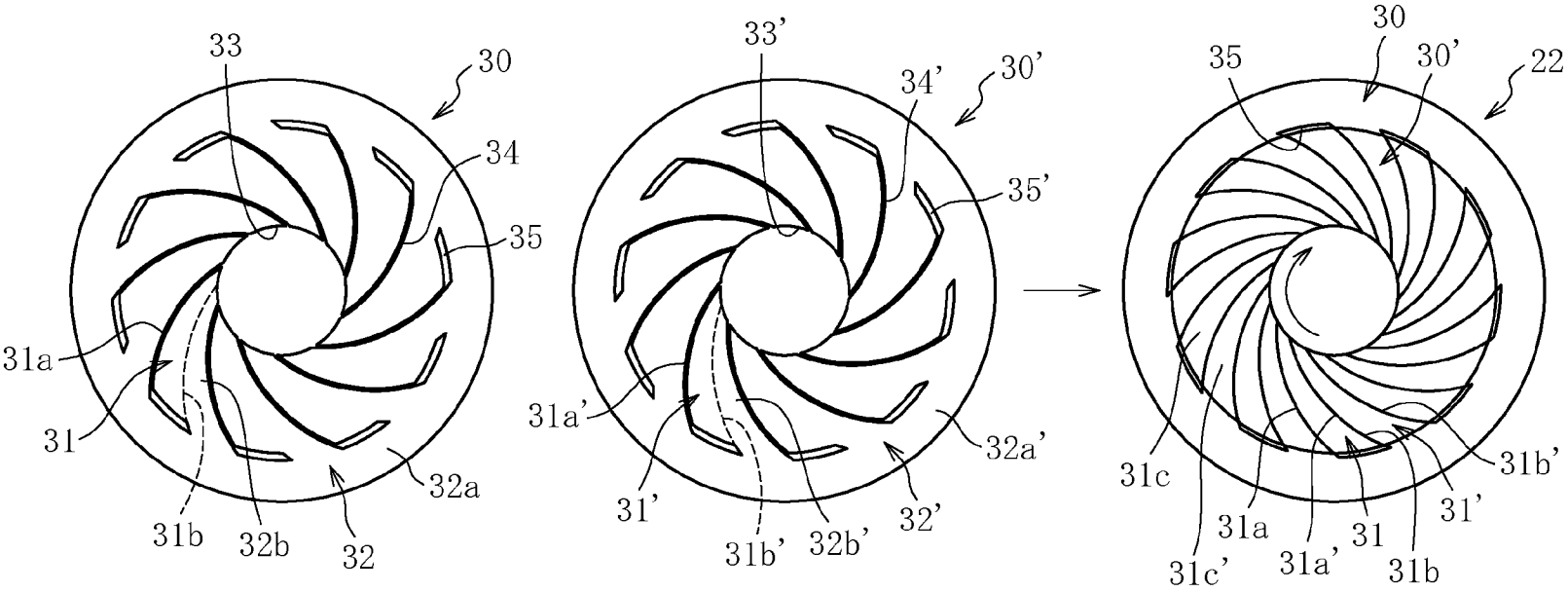
FIG. 11 is a plan view of a foil member of a thrust foil bearing according to yet another embodiment of the first invention.

Further, according to the present invention, the leaves 31 and 31' can be easily assembled to the thrust member 21, and hence a larger number of the leaves 31 and 31' can be provided to the foils 30 and 30'. For example, FIG. 11 illustrates an embodiment in which ten leaves 31 and 31' are provided to the foils 30 and 30', respectively, and the ten leaves 31 and 31' are combined with each other. In other words, a total of twenty leaves are provided. In this way, a larger number of the leaves 31 and 31' are provided, and hence the load capacity in the thrust directions can be arbitrarily changed.

Figure 12:
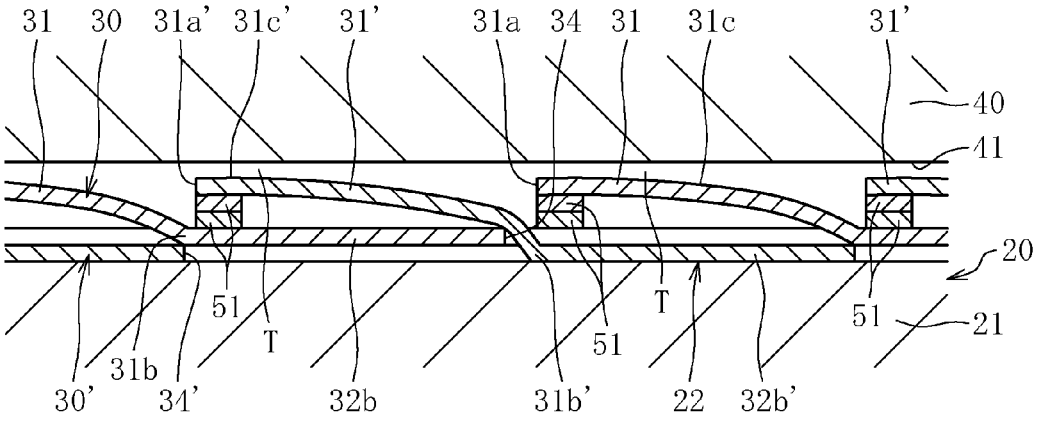
FIG. 12 is a sectional view of a thrust foil bearing according to yet another embodiment of the first invention.
Figure 13:
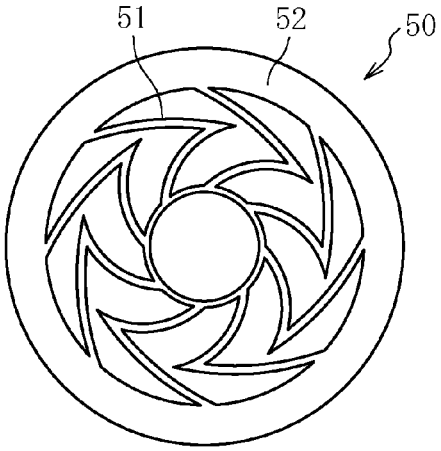
FIG. 13 is a plan view of a support foil provided to the thrust foil bearing illustrated in FIG. 12.

Further, FIG. 12 illustrates an embodiment in which support portions 51 are provided under the leaves 31 and 31'. The support portions 51 support the leaves 31 and 31' from the opposite side with respect to the thrust bearing surfaces 31c and 31c' (lower side in FIG. 12). Through adjustment of a shape, a thickness, the number, and arrangement positions of the support portions 51, a rising height of the free ends 31a and 31a' of the leaves 31 and 31' can be freely set. Thus, inclination angles of the leaves 31 and 31' and the shapes (curvatures) of the thrust bearing surfaces 31c and 31c' are adjusted, and hence the thrust bearing gaps T can be configured to have an optimum shape. For example, when the support portions 51 are provided to the foil member 22 illustrated in FIG. 9, as illustrated in FIG. 13, it is possible to use a support foil 50 integrally comprising the support portions 51 formed into a linear shape along the free ends 31a and 31a' of the leaves 31 and 31' and an annular portion 52 coupling outer peripheries of the support portions 51 to each other. In FIG. 12, two support foils 50 are used in a stacked form, and the support portions 51 are arranged in a double piled state along and under the free ends 31a and 31a' of the leaves 31 and 31'.

In the embodiments described above, the foil member 22 comprises the two foils 30 and 30'. However, the present invention is not limited thereto, and the foil member may comprise one foil, or three or more foils.

Further, in the embodiments described above, the thrust member 21 and the foil member 22 are provided on a fixed side, but may be provided on a rotary side. However, when the foil member 22 is rotated at high speed, the foils 30 and 30' may be deformed due to a centrifugal force. Thus, in view of avoiding such a failure, as in the embodiments described above, it is preferred that the thrust member 21 and the foil member 22 be provided on the fixed side.

Figure 14:
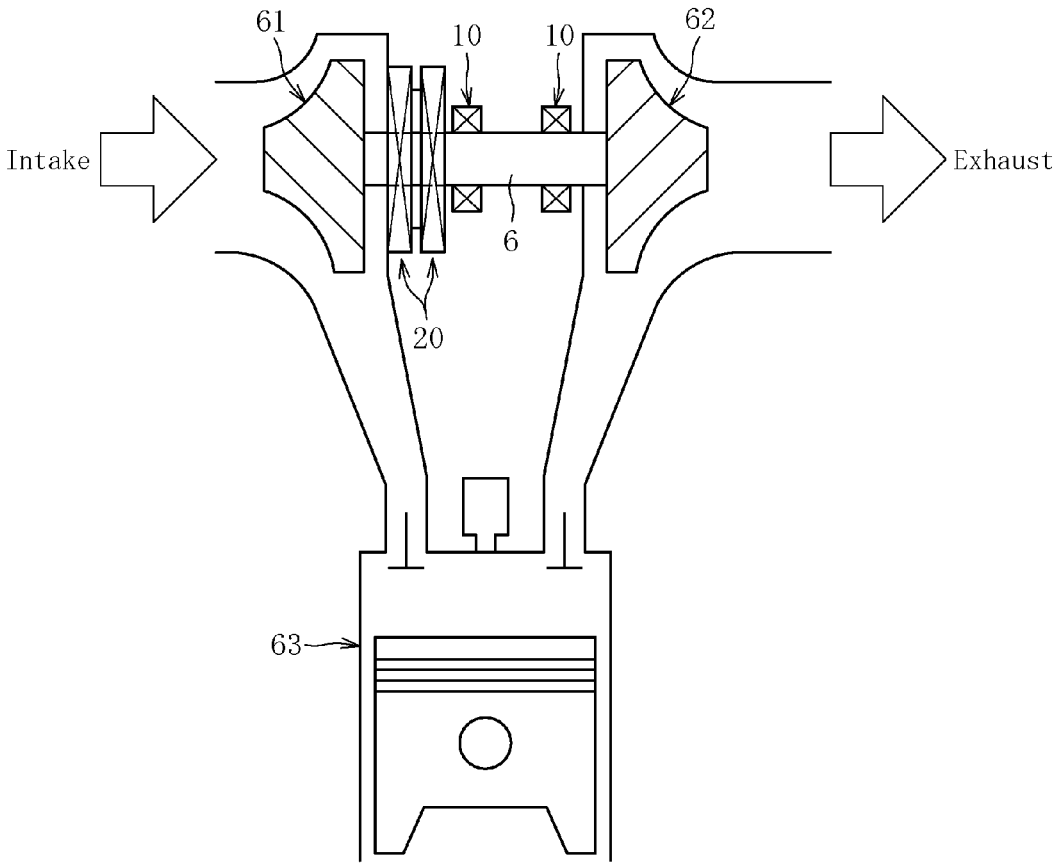
FIG. 14 is a schematic view of a supercharger.

Still further, in the embodiments described above, the thrust foil bearings 20 according to the present invention are applied to a gas turbine. However, the present invention is not limited thereto, and the thrust foil bearings 20 may be applied, for example, to a supercharger as illustrated in FIG. 14. This supercharger is what is called a turbocharger for feeding air into an engine 63, and comprises a compressor 61 and a turbine 62. The compressor 61 and the turbine 62 are coupled to each other with the shaft 6. The shaft 6 is supported in the radial direction and both the thrust directions by the radial foil bearings 10 and the thrust foil bearings 20. In the illustrated example, the radial foil bearings 10 are provided at two positions spaced apart from each other in the axial direction. Air sucked from an air-intake port (not shown) is compressed by the compressor 61, mixed with fuel, and fed into the engine 63. The compressed air mixed with the fuel is combusted in the engine 63 so as to rotate the turbine 62 with a high-temperature and high-pressure gas exhausted from the engine 63. A rotational force generated at this time by the turbine 62 is transmitted to the compressor 61 through intermediation of the shaft 6. The gas that has rotated the turbine 62 is exhausted as an exhaust gas to an outside.

The foil bearing according to the present invention can be used not only in the gas turbine or the supercharger, but widely used also as bearings for vehicles such as an automobile, which are used under restrictions such as a difficulty in lubricating with a liquid such as a lubricating oil, a difficulty in separately providing an auxiliary device of a lubricating oil circulatory system in view of energy efficiency, or problems that may be caused by shearing resistance of the liquid. The foil bearing according to the present invention can be widely used also as bearings for industrial devices.

Note that, the foil bearing described above is suited to a case where air is used as a lubricant, but is applicable to other gases, and is operated through intermediation of a liquid such as water and an oil.

Now, description is made of embodiments of a second invention of the present application with reference to FIGS. 15 to 19.

Figure 15:
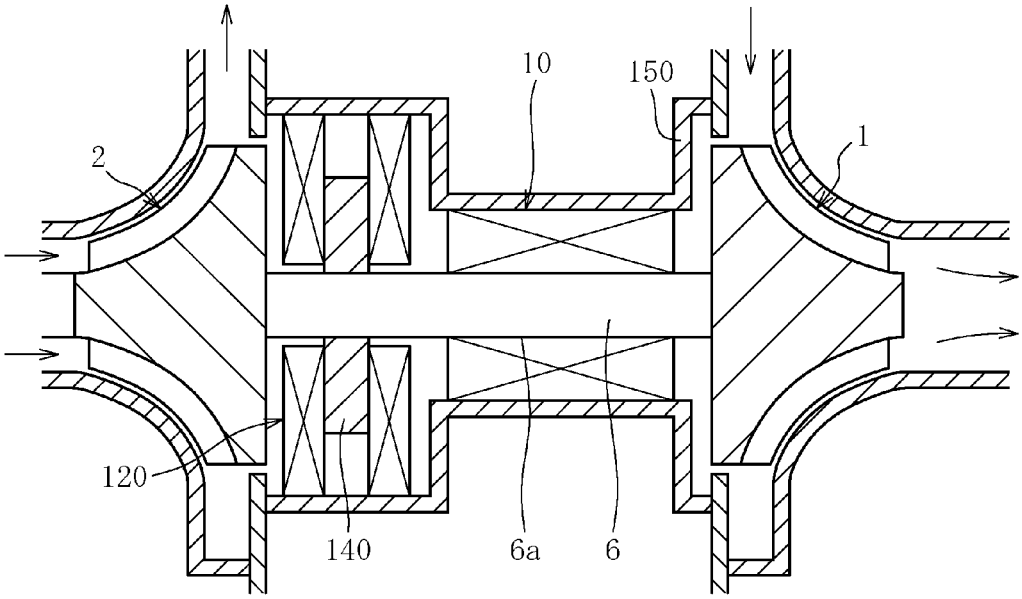
FIG. 15 is a sectional view of a support structure for a rotor of the micro gas turbine.

FIG. 15 illustrates a support structure for the rotor of the micro gas turbine (refer to FIG. 1), specifically, a support structure for the shaft 6 in the axial region between the turbine 1 and the compressor 2. This region is adjacent to the turbine 1 rotated by the high-temperature and high-pressure gas, and hence an air dynamic pressure bearing, in particular, a foil bearing is suitably used in this region. Specifically, the radial foil bearing 10 supports the shaft 6 in the radial direction, and a thrust foil bearing 120 according to an embodiment of the present invention supports a flange portion 140 provided to the shaft 6 in both the thrust directions.

The radial foil bearing 10 has the same structure as that illustrated in FIG. 3, and hence redundant description thereof is omitted.

Figure 16:
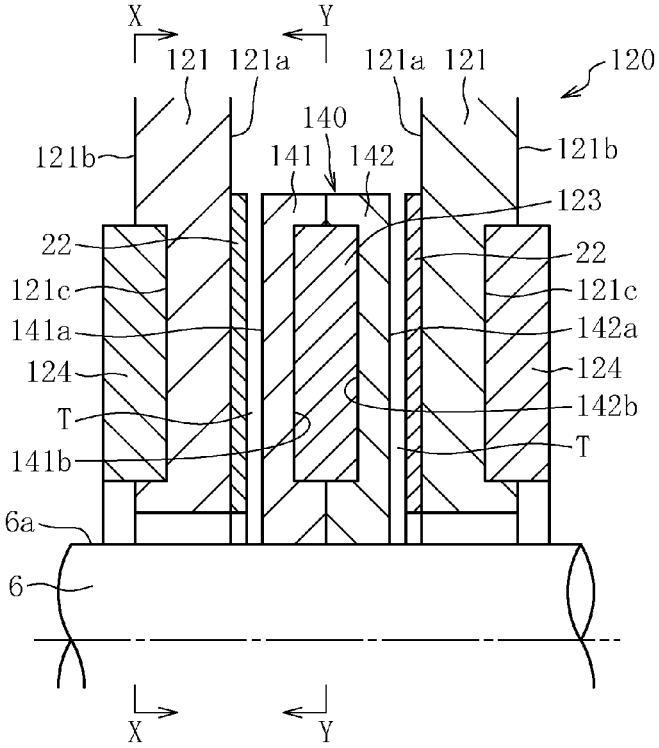
FIG. 16 is a sectional view of a thrust foil bearing according to an embodiment of a second invention of the present application, which is incorporated in the support structure for the rotor.

As illustrated in FIGS. 15 and 16, the thrust foil bearing 120 according to the embodiment of the present invention comprises the flange portion 140 (rotary member) provided to project radially outward from the outer peripheral surface 6a of the shaft 6, thrust members 121 (fixed members) fixed to a casing 150, and the foil members 22 arranged between the flange portion 140 and the thrust members 121. In this embodiment, the thrust members 121 are provided in pairs on both axial sides with respect to the flange portion 140, and the foil member 22 is fixed to an end surface 121a of each of the thrust members 121. The thrust bearing gaps T are formed respectively between one end surface 141a of the flange portion 140 and one of the foil members 22, and between another end surface 142a of the flange portion 140 and another of the foil members 22.

Figure 17A:
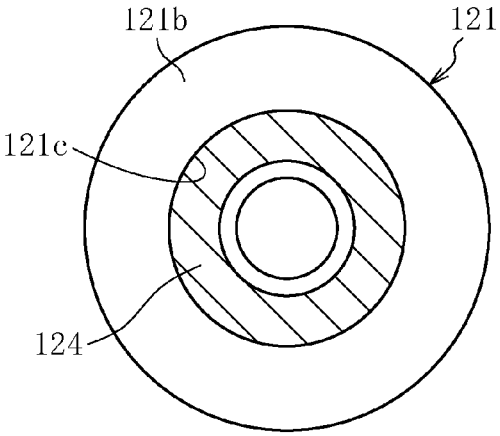
FIG. 17A is a sectional view of a thrust member, which is taken along the line X-X of FIG. 16.
Figure 17B:
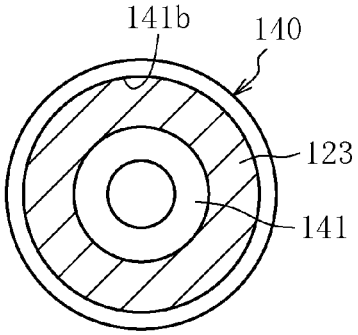
FIG. 17B is a sectional view of a flange member, which is taken along the line Y-Y of FIG. 16.
Figure 18A:
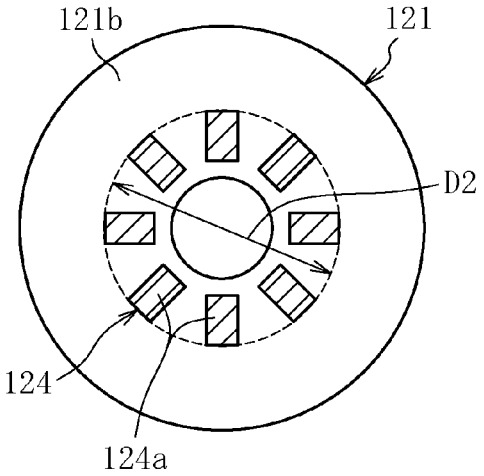
FIG. 18A is a sectional view of a thrust member according to another embodiment of the second invention.
Figure 18B:
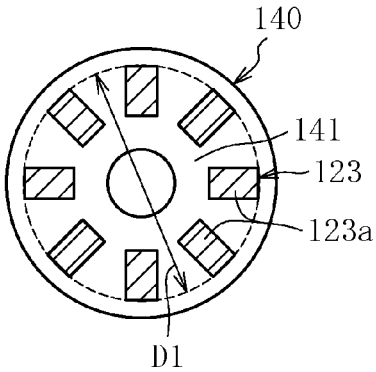
FIG. 18B is a sectional view of a flange portion according to another embodiment of the second invention.
Figure 19:
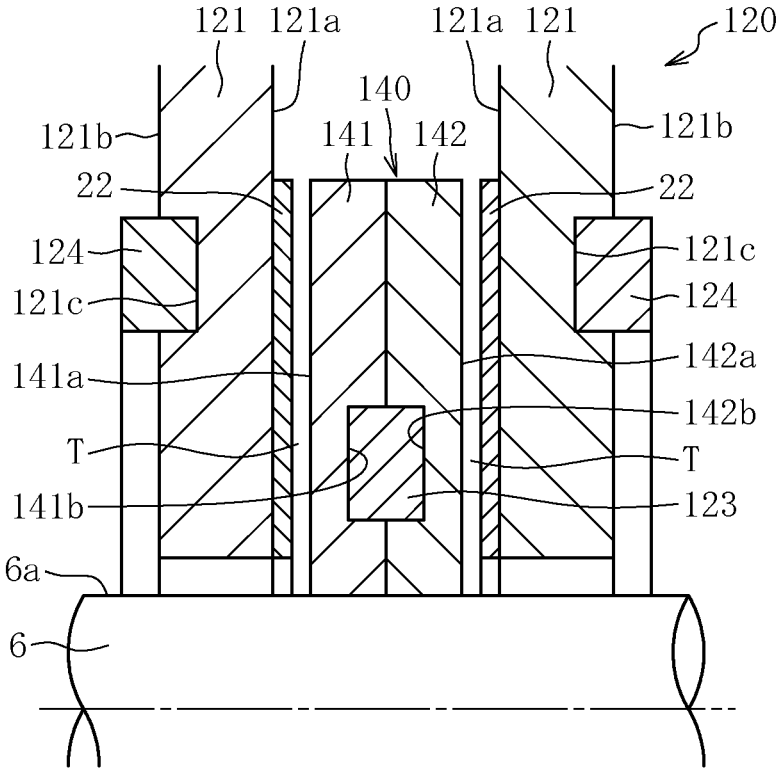
FIG. 19 is a sectional view of a thrust foil bearing according to still another embodiment of the second invention.
Figure 20A:
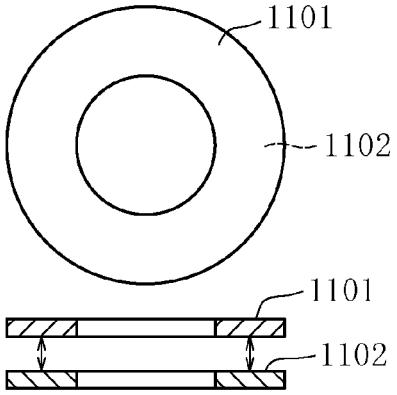
FIG. 20A is a plan view and sectional view illustrating a state in which magnets having the same diameter are arranged coaxially with each other.
Figure 20B:
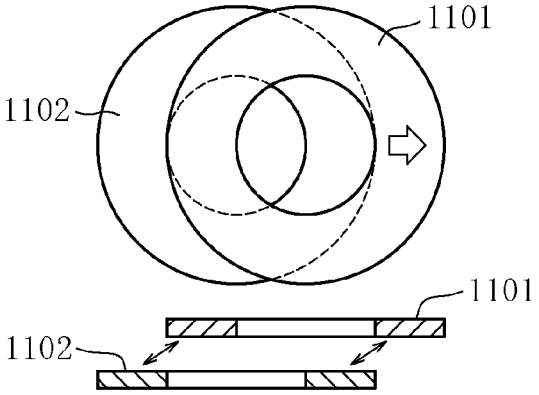
FIG. 20B is a plan view and sectional view illustrating a case where the magnets of FIG. 20A are decentered in a radial direction.
Figure 21A:
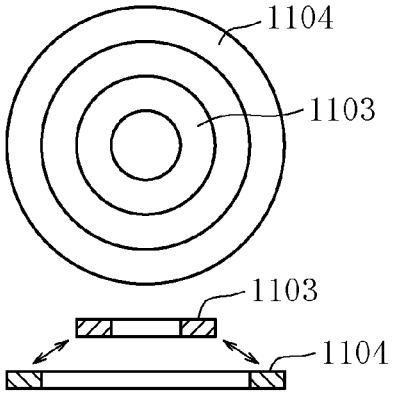
FIG. 21A is a plan view and sectional view illustrating a state in which magnets having different outer diameters are arranged coaxially with each other.
Figure 21B:
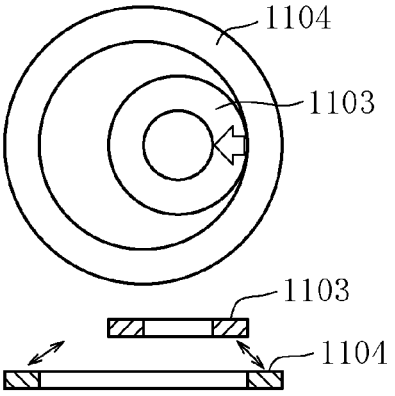
FIG. 21B is a plan view and sectional view illustrating a case where the magnets of FIG. 21A are decentered in the radial direction.

The flange portion 140 and the thrust members 121 of the thrust foil bearing 120 respectively have magnets 123 and 124 mounted thereto. The magnets 123 and 124 are arranged to respectively generate repulsive forces in the thrust directions, specifically, arranged in a manner that the same poles (N-poles or S-poles) face each other. In this embodiment, both the magnets 123 and 124 are arranged along the circumferential direction. Specifically, as illustrated in FIGS. 17A and 17B, both the magnets 123 and 124 are arranged coaxially with each other in a shape of a ring that is continuous over the entire circumference. In the illustrated example, the magnets 123 and 124 have the same shape, specifically, have a shape of a hollow disc with a rectangular shape in cross-section. As described above, when the magnets 123 and 124 are each formed into the shape of the ring that is continuous over the entire circumference, the magnets 123 and 124 can be easily mounted to the flange portion 140 or the thrust members 121.

The one magnet 123 is fixed to the flange portion 140. In this embodiment, the one magnet 123 is embedded into the flange portion 140. Specifically, as illustrated in FIG. 16, the flange portion 140 is divided at an axial intermediate portion so as to provide a pair of flange members 141 and 142. The pair of flange members 141 and 142 have opposed end surfaces comprising annular recessed portions 141b and 142b, and the ring-shaped magnet 123 is arranged in a space formed by facing the recessed portions 141b and 142b. The one magnet 123 may be damaged at the time of high speed rotation together with the shaft 6. However, when the one magnet 123 is incorporated into the flange portion 140 as described above, the damage at the time of the high speed rotation can be prevented. Note that, means for preventing the damage on the magnet 123 is not limited to the means described above, and for example, a case for covering the magnet 123 may be mounted thereto.

The other magnets 124 are fixed respectively to the pair of thrust members 121. In this embodiment, the other magnets 124 are mounted respectively to other end surfaces 121b of the thrust members 121 (end surfaces on an opposite side with respect to the foil members 22). Specifically, an annular recessed portion 121c is formed in each of the other end surfaces 121b of the thrust members 121, and the ring-shaped magnets 124 are each fitted and fixed to the recessed portion 121c.

As illustrated in FIG. 16, the foil member 22 is mounted to the end surface 121a of each of the thrust members 121 having a shape of a hollow disc. The foil member 22 in this embodiment comprises a plurality of foils combined with each other. In the illustrated example, the foil member 22 comprises the two metal foils 30 and 30' having the same shape. The configuration of the foils 30 and 30', the method of assembling the two foils 30 and 30' into the foil member 22, and the method of fixing the foil member 22 to the end surface 121a of each of the thrust members 121 are the same as those illustrated in FIGS. 4 to 7. Thus, redundant description thereof is omitted.

Along with the rotation of the shaft 6 to the one side in the circumferential direction, the fluid film is formed in the radial bearing gap R between the radial bearing surfaces 12c of the leaves 12 of the radial foil bearing 10 and the outer peripheral surface 6a of the shaft 6. This fluid film supports the shaft 6 in the radial direction in a non-contact manner (refer to FIG. 3). Simultaneously, the fluid films are formed in the thrust bearing gaps T between the thrust bearing surfaces (bearing surfaces 31c and 31c' of the leaves 31 and 31') of the pair of foil members 22 of the thrust foil bearing 120 and the end surfaces 141a and 142a of the flange portion 140. Those fluid films support the shaft 6 in both the thrust directions in a non-contact manner (refer to FIG. 16). At this time, the leaves 12 of the radial foil bearing 10 and the leaves 31 and 31' of the thrust foil bearing 120 are flexible, and hence the bearing surfaces 12c, 31c, and 31' of the leaves 12, 31, and 31' are arbitrarily deformed in accordance with operating conditions such as a load, a rotation speed of the shaft 6, and an ambient temperature. Thus, the radial bearing gap R and the thrust bearing gaps T are automatically adjusted to have appropriate widths in accordance with the operating conditions. As a result, even under severe conditions involving high temperature and high speed rotation, the radial bearing gap R and the thrust bearing gaps T can be managed to have optimum widths, and hence the shaft 6 can be stably supported.

Further, due to the repulsive forces generated in the thrust directions by the magnets 123 and 124 provided to the thrust foil bearing 120, supportability in the thrust directions of the shaft 6 is further enhanced. In other words, the repulsive forces generated between the magnets 123 and 124 urge the flange portion 140 and the thrust members 121 to be separated from each other in the thrust directions so as to assist the fluid films to support the shaft 6 in the thrust bearing gaps T in the thrust directions. In particular, when high loads in the thrust directions are applied to the shaft 6 due to the high speed rotation of the turbine 1, the thrust bearing gaps T are narrowed. Thus, the magnets 123 and 124 come closer to each other. As a result, the repulsive forces generated therebetween become greater. In this way, a risk that the flange portion 140 comes into contact with the foil members 22 and the thrust members 121 can be avoided. Note that, as the repulsive forces generated between the magnets 123 and 124 become greater, a greater force is applied to the flange portion 140. As a result, there arises a risk that the flange portion 140 is inclined with respect to the thrust members 121 and the thrust bearing gaps T are non-uniform in the circumferential direction. However, the shaft 6 is rotated at high speed, and hence pressure of the fluid film in the radial bearing gap R becomes higher. As a result, a moment rigidity of the shaft 6 becomes higher, and such a failure can be prevented.

It is desired that the radial bearing surface 12c and the thrust bearing surfaces 31c and 31c' of the foil bearings 10 and 120 be provided with coating for reducing friction of the surfaces. As the coating of this type, there may be used, for example, a DLC film, a titanium aluminum nitride film, or a molybdenum disulfide film. Such coating may be formed not only on the radial bearing surfaces 12c and the thrust bearing surfaces 31c and 31c' but also on the opposed side, that is, the outer peripheral surface 6a of the shaft 6 and the end surfaces of the flange portion 140. Further, the coating described above may be formed also on one of or both of the back surfaces of the leaves 12, 31, and 31', and parts in contact therewith, that is, the inner peripheral surface 11a of the outer member 11 and the end surface 121a of each of the thrust members 121.

The present invention is not limited to the embodiment described above. Note that, in the following description, parts having the same functions as those in the embodiment described above are denoted by the same reference symbols, and redundant description thereof is omitted.

For example, in the embodiment described above, the magnets 123 and 124 are each formed into the shape of the ring that is continuous over the entire circumference. However, the present invention is not limited thereto, and a plurality of magnets may be arranged apart from each other in the circumferential direction as one of or both of the magnets 123 and 124. For example, in the example illustrated in FIG. 18, a plurality of magnets 123a and 124a are arranged at a plurality of (eight in the illustrated examples) equiangular positions as both the magnets 123 and 124, respectively. The plurality of magnets 123a and 124a are fixed respectively to the end surface 121b of each of the thrust members 121 and the end surface of the flange member 141. In this case, only by changing arrangement of the magnets 123a and 124a, an entire diameter of each of the magnets 123 and 124 can be freely changed. For example, in the arrangement of the illustrated examples, an outer diameter D1 of the magnet 123 and an outer diameter D2 of each of the magnets 124 are equal to each other. However, the present invention is not limited thereto, and there may be employed a design in which the magnets 124a of each of the magnets 124 are arranged on the radially outer side than in the illustrated example so as to set the outer diameter D2 of each of the magnets 124 to be larger than the outer diameter D1 of the magnet 123. Further, each one of the magnets 123a and 124a needs not necessarily be formed into a special shape. For example, the magnets 123a and 124a may each be formed into a rectangular shape (rectangular parallelepiped shape) as in the illustrated examples. When the magnets 123a and 124a have such simple shapes, inexpensive existing magnets can be used. As a result, manufacturing cost can be reduced.

Further, in the embodiment described above, the magnets 123 and 124 having the same ring shape are mounted to the flange portion 140 and the thrust members 121. However, the present invention is not limited thereto. For example, in the embodiment illustrated in FIG. 19, the magnet 123 mounted to the flange portion 140 and the magnets 124 mounted to the thrust members 121 are set to have different outer diameters and arranged coaxially with each other. Specifically, the outer diameter of each of the magnets 124 is set to be larger than the outer diameter of the magnet 123 so that the magnet 123 having the smaller diameter is arranged on the radially inner side with respect to the magnets 124 each having the larger diameter. The magnets 123 and 124 may each be formed into the shape of the ring that is continuous over the entire circumference (refer to FIG. 17), or the plurality of magnets may be arranged apart from each other in the circumferential direction (refer to FIG. 18). In those cases, radial components of the repulsive forces generated between both the magnets 123 and 124 allow the magnet 123 having the smaller diameter to be urged to the radially inner side. Thus, radial decentering between the magnets 123 and 124 is corrected, and hence radial decentering between the flange portion 140 and the thrust members 121 is corrected as well. As a result, the flange portion 140 is stably supported by the magnets 123 and 124.

Still further, in the embodiment described above, the foil members are fixed to the fixed members (thrust members 121). However, reversely, the foil members may be fixed to the rotary member (flange portion 140). In this case, wedge-like thrust bearing gaps are formed between the thrust bearing surfaces provided to the leaves of the foil members and the end surfaces of the fixed members. However, when the foil members are fixed to the rotary member, the foil members are rotated at high speed, and hence the foils may be deformed due to the centrifugal force. Thus, in view of avoiding the deformation of the foils, it is preferred that the foil members be mounted to the fixed members.

Yet further, in the configuration of the embodiment described above, the thrust members 121 and the foil members 22 are provided on both the axial sides with respect to the flange portion 140 so as to support the flange portion 140 in both the thrust directions. However, the present invention is not limited thereto, and the thrust member 121 and the foil member 22 may be provided only on one axial side with respect to the flange portion 140 so as to support the flange portion 140 only in one of the thrust directions. Such a configuration is applicable, for example, to a case where the flange portion needs not be supported in another of the thrust directions, or a case where the flange portion is supported by another structure in the another of the thrust directions.

Yet further, in the configuration of the embodiment described above, the foil members 22 of the thrust foil bearing 120 each comprise the foil 30 integrally comprising the plurality of leaves 31, and the foil 30' integrally comprising the plurality of leaves 31', and the foils 30 and 30' are combined with each other. However, the present invention is not limited thereto. For example, the plurality of leaves may be fixed one by one to the thrust members 121. Alternatively, there may be employed a foil member of a bump foil type, comprising a top foil having a thrust bearing surface and a corrugated back foil arranged between the top foil and a thrust member.

Yet further, in the embodiment described above, the thrust foil bearing 120 according to the present invention is applied to a gas turbine. However, the present invention is not limited thereto, and the thrust foil bearing 120 may be applied, for example, to the supercharger as illustrated in FIG. 14.

The foil bearing according to the present invention can be used not only in the gas turbine or the supercharger. For example, the foil bearing according to the present invention can be widely used also as bearings for vehicles such as an automobile, which are used under restrictions such as a difficulty in lubricating with a liquid such as a lubricating oil, a difficulty in separately providing an auxiliary device of a lubricating oil circulatory system in view of energy efficiency, or problems that may be caused by shearing resistance of the liquid. The foil bearing according to the present invention can be widely used also as bearings for industrial devices.

Note that, the foil bearing described above is suited to a case where air is used as a lubricant, but is applicable to other gases, and is operated through intermediation of a liquid such as water and an oil.

Now, description is made of embodiments of a third invention of the present application with reference to FIGS. 22 to 36.

Figure 22:
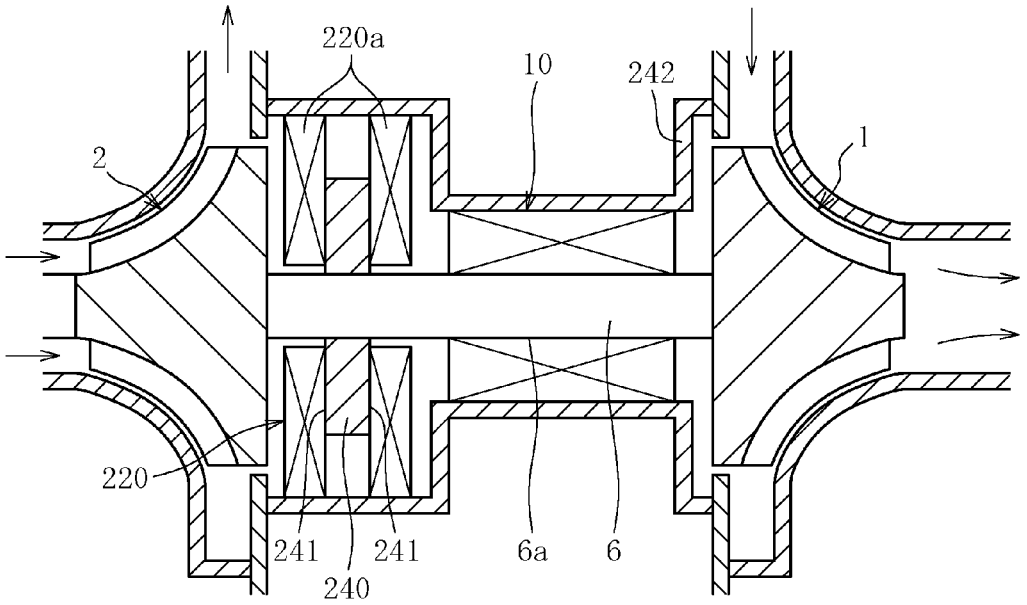
FIG. 22 is a sectional view of a support structure for the rotor of the micro gas turbine.

FIG. 22 illustrates a support structure for the rotor of the micro gas turbine (refer to FIG. 1), specifically, a support structure for the shaft 6 in the axial region between the turbine 1 and the compressor 2. This region is adjacent to the turbine 1 rotated by the high-temperature and high-pressure gas, and hence an air dynamic pressure bearing, in particular, a foil bearing is suitably used in this region. Specifically, the radial foil bearing 10 for supporting the shaft 6 in the radial direction, and a thrust foil bearing 220 for supporting a flange portion 240 provided to the shaft 6 in both the thrust directions support the rotor in a freely rotatable manner. In this embodiment, description is made of a case where a foil bearing according to an embodiment of the present invention is applied to the thrust foil bearing 220.

The radial foil bearing 10 has the same structure as that illustrated in FIG. 3, and hence redundant description thereof is omitted.

Figure 23:
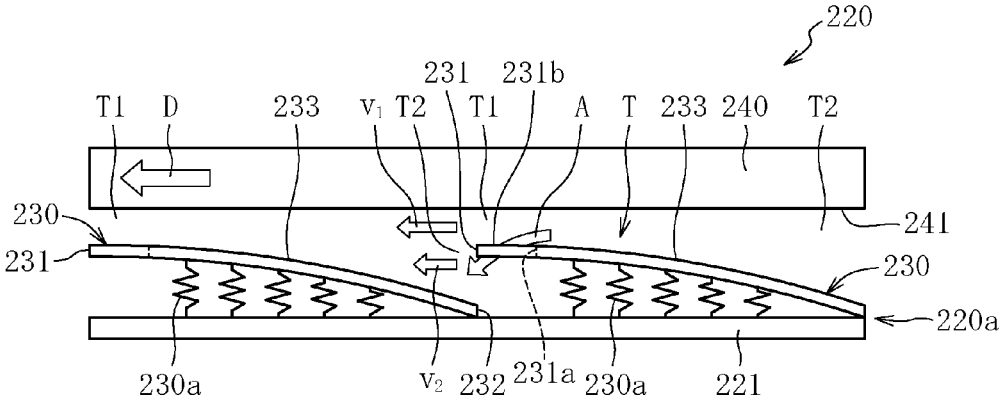
FIG. 23 is a schematic side view of a thrust foil bearing according to an embodiment of a third invention of the present application, which is incorporated in the support structure for the rotor.
Figure 24:
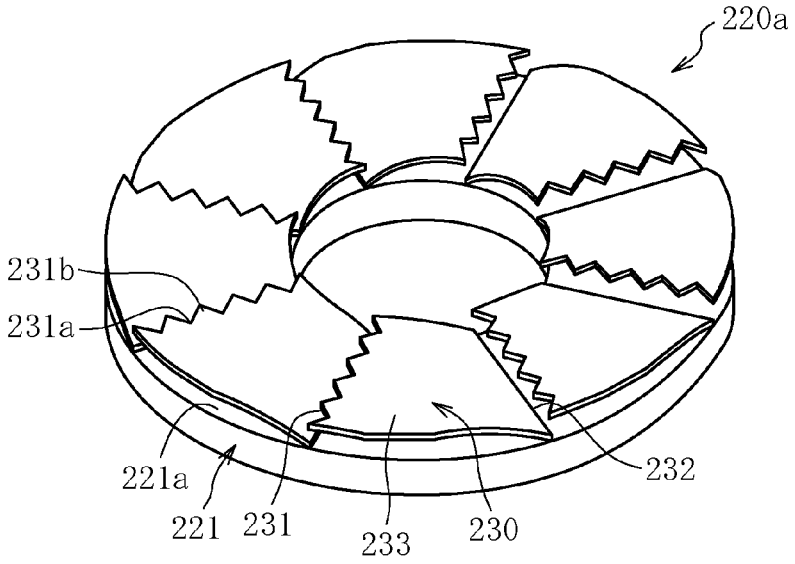
FIG. 24 is a perspective view of a bearing member of the thrust foil bearing.

As illustrated in FIGS. 22 to 24, the thrust foil bearing 220 comprises the flange portion 240 (rotary member) provided to project radially outward from the outer peripheral surface 6a of the shaft 6, disc-like thrust members 221 (fixed members) fixed to a casing 242, and a plurality of leaf foils (leaves 230) arranged between the flange portion 240 and the thrust members 221. In this embodiment, bearing members 220a are provided on both axial sides with respect to the flange portion 240. The bearing members 220a each comprise the disc-like thrust member 221 (fixed member), and the plurality of leaves 230 fixed in an equiangular array to an end surface 221a of the thrust member 221.

The leaves 230 are formed of a single metal foil made of the same material and having the same thickness as those of the leaves 12 of the radial foil bearing 10, and are formed into a fan shape along the circumferential direction of the thrust member 221. The leaves 230 each comprise a free end 231 formed of an end portion on the one side in the circumferential direction (forward side in the rotational direction of the shaft 6, that is, left side in the drawings), and a fixed end 232 formed of an end portion on the another side in the circumferential direction, which is fixed to the thrust member 221. A surface of each of the leaves 230 on an opposite side with respect to the thrust member 221 serves as a thrust bearing surface 233 having a shape of a curved surface projected to the flange portion 240 side. The shape of the curved surface of the thrust bearing surface 233 is smooth without pores or steps. Note that, springs 230a schematically illustrate spring property of the leaves 230, and hence are not actually provided.

Figure 25:
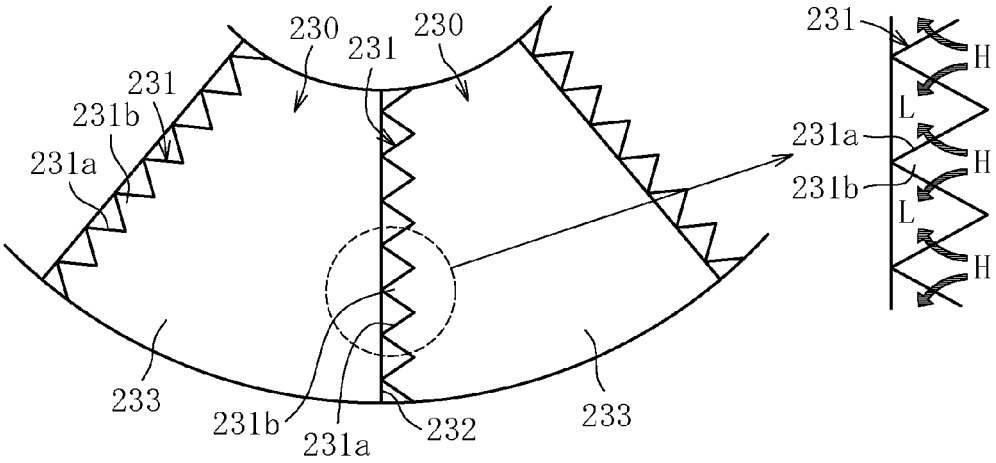
FIG. 25 is a plan view of leaf foils of the thrust foil bearing.

As illustrated in FIG. 25, the free end 231 of each of the leaves 230 comprises a plurality of cutout portions 231a, and land portions 231b that are continuous with the thrust bearing surface 233, and the cutout portions 231a and the land portions 231b are arranged alternately to each other in an extending direction of the free end 231 (radial direction in this embodiment). In the illustrated example, the free end 231 is formed into a zigzag shape so as to form the triangular cutout portions 231a and the land portions 231b alternately to each other.

Along with the rotation of the shaft 6 to the one side in the circumferential direction, the wedge-like radial bearing gap R narrowed in the radial direction toward the one side in the circumferential direction is formed between the radial bearing surfaces 12c of the leaves 12 of the radial foil bearing 10 and the outer peripheral surface 6a of the shaft 6 (refer to FIG. 3). The fluid film (air film) is formed in the radial bearing gap R, and supports the shaft 6 in the radial direction in a non-contact manner. Simultaneously, the thrust bearing gaps T narrowed in the axial direction toward the one side in the circumferential direction are formed between end surfaces 241 on both axial sides of the flange portion 240 and the thrust bearing surfaces 233 of the leaves 230 of the thrust foil bearing 220 (refer to FIG. 23). The fluid films (air films) are formed in the thrust bearing gaps T, and support the shaft 6 in both the thrust directions in a non-contact manner. Note that, the widths of the radial bearing gap R and the thrust bearing gaps T are actually as fine as approximately several tens of micrometers, but are illustrated on an exaggerated scale in FIGS. 3 and 23.

At this time, as illustrated in FIG. 23, a part of a high-pressure fluid in a small gap portion T1 in the thrust bearing gap T is released as it is toward the forward side in the rotational direction of the shaft 6. With this, in a large gap portion T2, the fluid flows near the flange portion 240 (upper part in FIG. 23) (refer to the arrow $v_1$ in FIG. 23). Simultaneously, another part of the fluid in the small gap portion T1 is released toward a back side of the leaf 230 (lower side in FIG. 23) via the cutout portions 231a. With this, in the large gap portion T2, the fluid flows near the thrust bearing surface 233 (lower part in FIG. 23) (refer to the arrow $v_2$ in FIG. 23). In this way, the fluid in the entire large gap portion T2 is allowed to dynamically flow, and a larger amount of the fluid flows from the large gap portion T2 into a subsequent small gap portion 11. As a result, higher pressure is generated in the small gap portions 11, and hence the load capacity in the thrust directions can be increased.

Further, at this time, the leaves 12 of the radial foil bearing 10 and the leaves 230 of the thrust foil bearing 220 are flexible, and hence the bearing surfaces 12c and 233 of the leaves 12 and 230 are arbitrarily deformed in accordance with operating conditions such as a load, a rotation speed of the shaft 6, and an ambient temperature. Thus, the radial bearing gap R and the thrust bearing gaps T are automatically adjusted to have appropriate widths in accordance with the operating conditions. As a result, even under severe conditions involving high temperature and high speed rotation, the radial bearing gap R and the thrust bearing gaps T can be managed to have optimum widths, and hence the shaft 6 can be stably supported.

It is desired that the radial bearing surfaces 12c and the thrust bearing surfaces 233 of the foil bearings 10 and 220 be provided with coating for reducing friction of the surfaces. As the coating of this type, there may be used, for example, a DLC film, a titanium aluminum nitride film, or a molybdenum disulfide film. Such coating may be formed not only on the radial bearing surfaces 12c and the thrust bearing surfaces 233 but also on the opposed side, that is, the outer peripheral surface 6a of the shaft 6 and the end surfaces 241 of the flange portion 240. Further, the coating described above may be formed also on one of or both of the back surfaces of the leaves 12 and 230, and parts in contact therewith, that is, the inner peripheral surface 11a of the outer member 11 and the end surface 221a of each of the thrust members 221.

The present invention is not limited to the embodiment described above. Note that, in the following description, parts having the same functions as those in the embodiment described above are denoted by the same reference symbols, and redundant description thereof is omitted.

Figure 26:
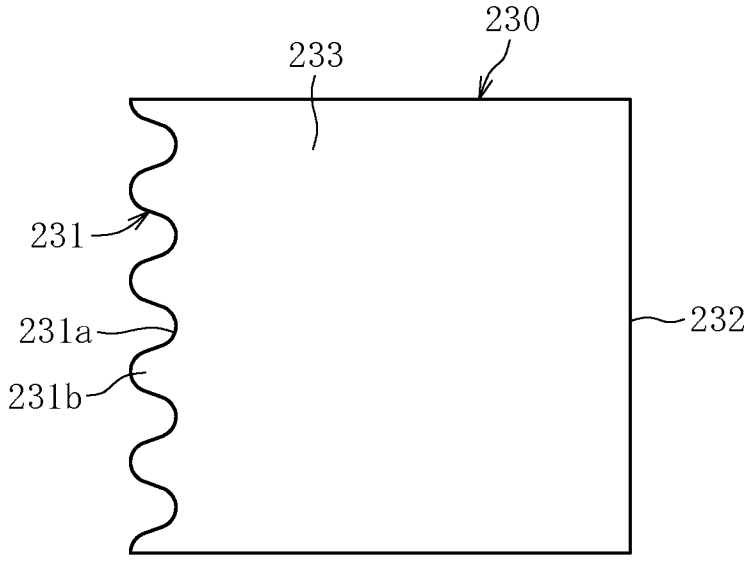
FIG. 26 is a plan view of a leaf foil of a thrust foil bearing according to another embodiment of the third invention.
Figure 27:
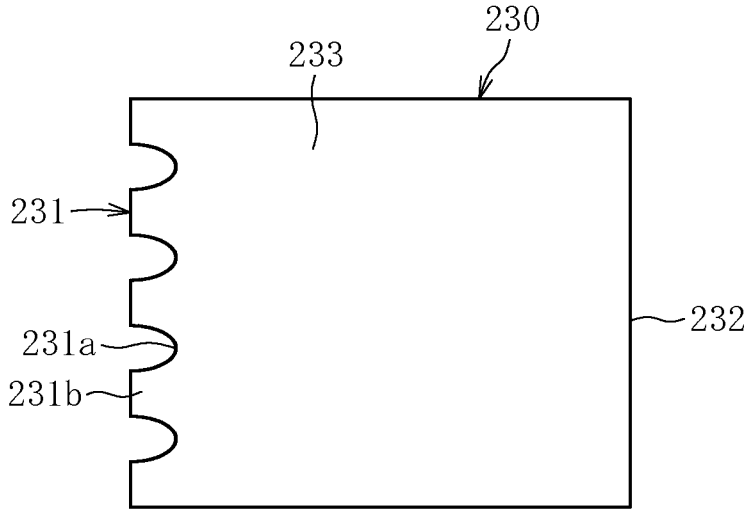
FIG. 27 is a plan view of a leaf foil of a thrust foil bearing according to still another embodiment of the third invention.

The shape of the free end 231 of the leaf 230 is not limited to the shape described above. For example, as illustrated in FIG. 26, the free end 231 of the leaf 230 may be formed into a corrugated shape. Alternatively, as illustrated in FIG. 27, the free end 231 of the leaf 230 may comprise a plurality of cutout portions 231a provided at a plurality of positions spaced apart from each other in the radial direction. Further, the cutout portions 231a and the land portions 231b may be formed not only into the triangular shape (refer to FIG. 25), the corrugated shape (refer to FIG. 26), or the circular-arc shape (refer to FIG. 27), but also into a rectangular shape or a trapezoidal shape (not shown).

Figure 28:
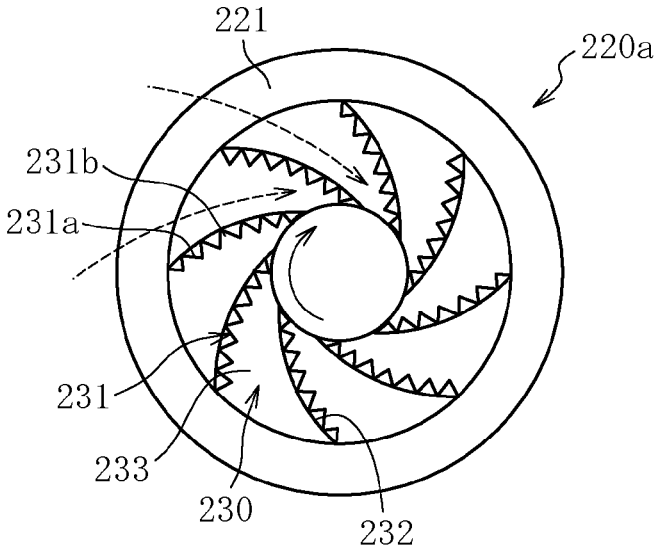
FIG. 28 is a plan view of a bearing member of a thrust foil bearing according to another embodiment of the third invention.
Figure 29:
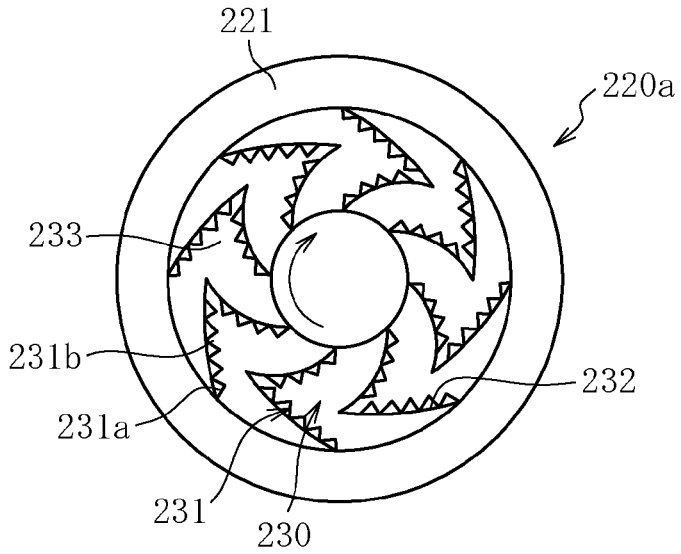
FIG. 29 is a plan view of a bearing member of a thrust foil bearing according to still another embodiment of the third invention.

Further, in the embodiment described above, the free end 231 of each of the leaves 230 extends along the radial direction. However, the present invention is not limited thereto. For example, as illustrated in FIGS. 28 and 29, radially outer edges of the free ends 231 of the leaves 230 may be inclined radially inward to the forward side in the rotational direction of the shaft 6. With this, along with the rotation of the shaft 6, air on the radially outer side of the bearing members 220a of the thrust foil bearing 220 is fed to the radially inner side along the leaves 230 (refer to dotted-line arrows in FIG. 28). Thus, a larger amount of air can be fed into the thrust bearing gaps T, and hence higher pressure can be generated in the thrust bearing gaps T. Specifically, as illustrated, for example, in FIG. 28, the free ends 231 of the leaves 230 can be arrayed in a spiral pattern of a pump-in type. Alternatively, as illustrated in FIG. 29, the free ends 231 of the leaves 230 may be arrayed in a herringbone pattern. Note that, the herringbone pattern refers to a substantially V-shape in which the radially outer edges and radially inner edges of the free ends 231 are inclined to a radial center and to the forward side in the rotational direction of the shaft 6.

Figure 30:
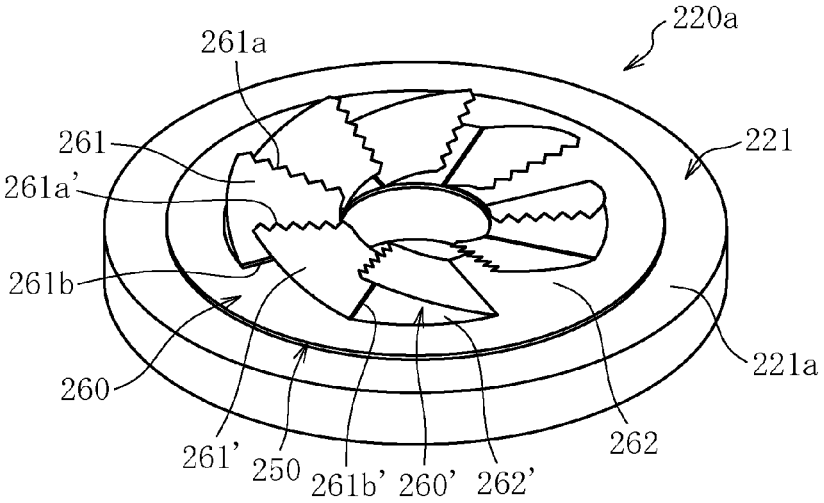
FIG. 30 is a perspective view of a bearing member of a thrust foil bearing according to yet another embodiment of the third invention.
Figure 31:
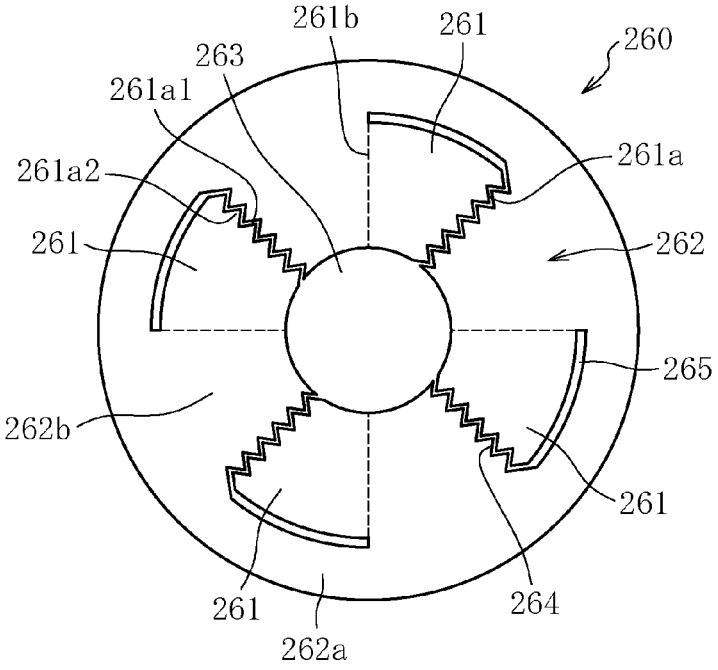
FIG. 31 is a plan view of a foil of the thrust foil bearing of FIG. 30.
Figure 32:
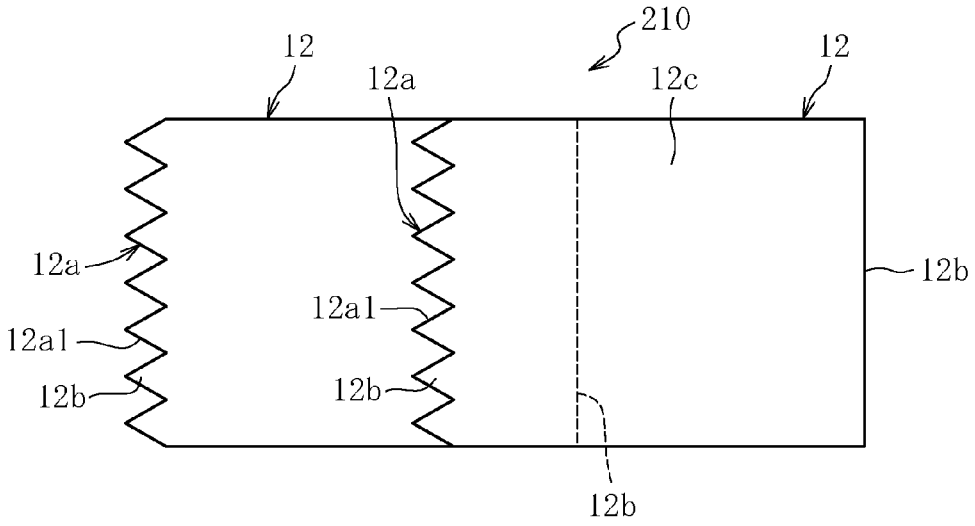
FIG. 32 is a plan view of a foil of a radial foil bearing according to an embodiment of the third invention of the present application.

Still further, in the embodiment described above, the plurality of leaf foils are formed separately one by one. However, the present invention is not limited thereto. For example, a plurality of leaf foils may be provided to a single foil. Specifically, FIG. 30 illustrates an embodiment in which two foils 260 and 260' each comprising a plurality of leaf foils are combined with each other so as to form a foil member 250, and the foil member 250 is fixed to each of the thrust members 221.

Here, description is made of a configuration of each of the foils 260 and 260'. Note that, the foils 260 and 260' have completely the same configuration, and hence description is made only of the configuration of one foil 260, and description of another foil 260' is omitted (in FIG. 30, single quotation marks are added to reference symbols of parts of the another foil 260', which correspond to those of the one foil 260).

The foil 260 is formed into a circular shape, and comprises a circular hole 263 that is formed at a center thereof so as to allow the shaft 6 to pass therethrough. In this embodiment, a plurality of (four in the illustrated example) equiangularly arranged leaves 261 and a coupling portion 262 are formed by forming substantially L-shaped slits into a single foil 260 through a wire cutting process, a pressing process, and the like. Specifically, at a plurality of equiangular positions (four positions in the illustrated example) on the circular foil 260, there are provided radial slits 264 that extend radially outward from the hole 263 in a zigzag pattern toward a position short of a radially outer rim of the foil 260. Then, circumferential slits 265 extend from radially outer ends of the slits 264 toward the another side in the circumferential direction (backward side in the rotational direction of the shaft 6, that is, counterclockwise direction in FIG. 31). When those slits 264 and 265 are formed into the foil 260, the plurality of leaves 261 each having an end portion 261a provided on the one side in the circumferential direction as the free end that is freely movable upward and downward in the axial direction, and the coupling portion 262 for coupling the leaves 261 to each other can be formed integrally with each other. The coupling portion 262 comprises an annular portion 262a surrounding outer peripheries of the plurality of leaves 261, and a plurality of (four in the illustrated example) extending portions 262b extending radially inward from the annular portion 262a. The extending portions 262b are continuous with end portions 261b on the another side in the circumferential direction of the leaves 261 (indicated by dotted lines in FIG. 31). In the illustrated example, the extending portions 262b of the coupling portion 262 and the leaves 261 are equal to each other in circumferential length, and provided alternately to each other in the circumferential direction. The free end 261a of each of the leaves 261 is formed into a zigzag shape comprising a plurality of cutout portions 261a1 and land portions 261a2 formed alternately to each other.

The two foils 260 and 260' are assembled to each other by the method illustrated in FIG. 7, and hence redundant description thereof is omitted here.

Figure 33:
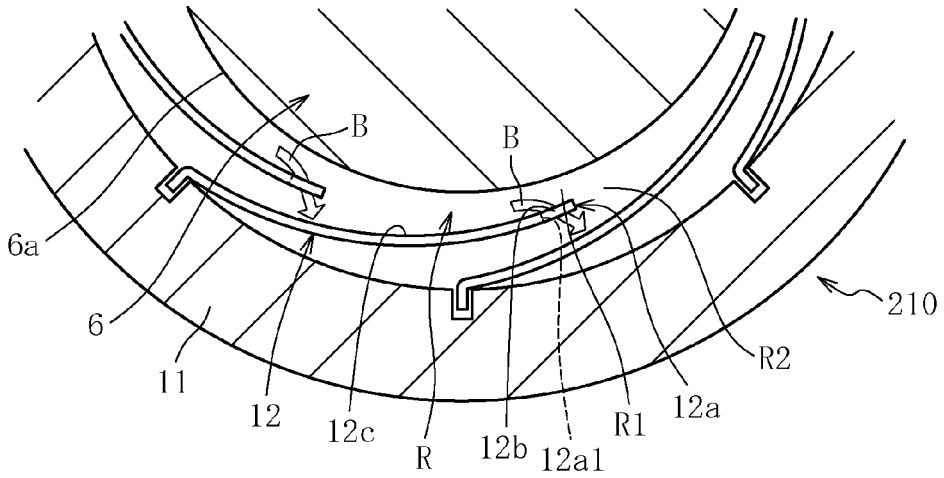
FIG. 33 is a sectional view of the radial foil bearing.

Further, in the embodiments described above, the present invention is applied to a thrust foil bearing for supporting a rotor in the thrust directions. However, the present invention is not limited thereto, and is applicable to a radial foil bearing for supporting a rotor in the radial direction. For example, as in a radial foil bearing 210 illustrated in FIGS. 32 and 33, the free end 12a of the leaf 12 mounted to an outer member 211 (fixed member) may alternately comprise a plurality of cutout portions 12a1, and a plurality of land portions 12b that are continuous with the radial bearing surface 12c. With this, as illustrated in FIG. 33, in the radial bearing gap R between the radial bearing surfaces 12c and the outer peripheral surface 6a of the shaft 6, the fluid flows radially outward via the cutout portions 12a1 (refer to the arrows B in FIG. 33) in a small gap portion R1 formed near the free end 12a of the radial bearing surface 12c. With this, the fluid in a large gap portion R2 is allowed to dynamically flow, and a larger amount of the fluid flows from the large gap portion R2 into the small gap portion R1. As a result, higher pressure is generated in the small gap portion R1.

Figure 34:
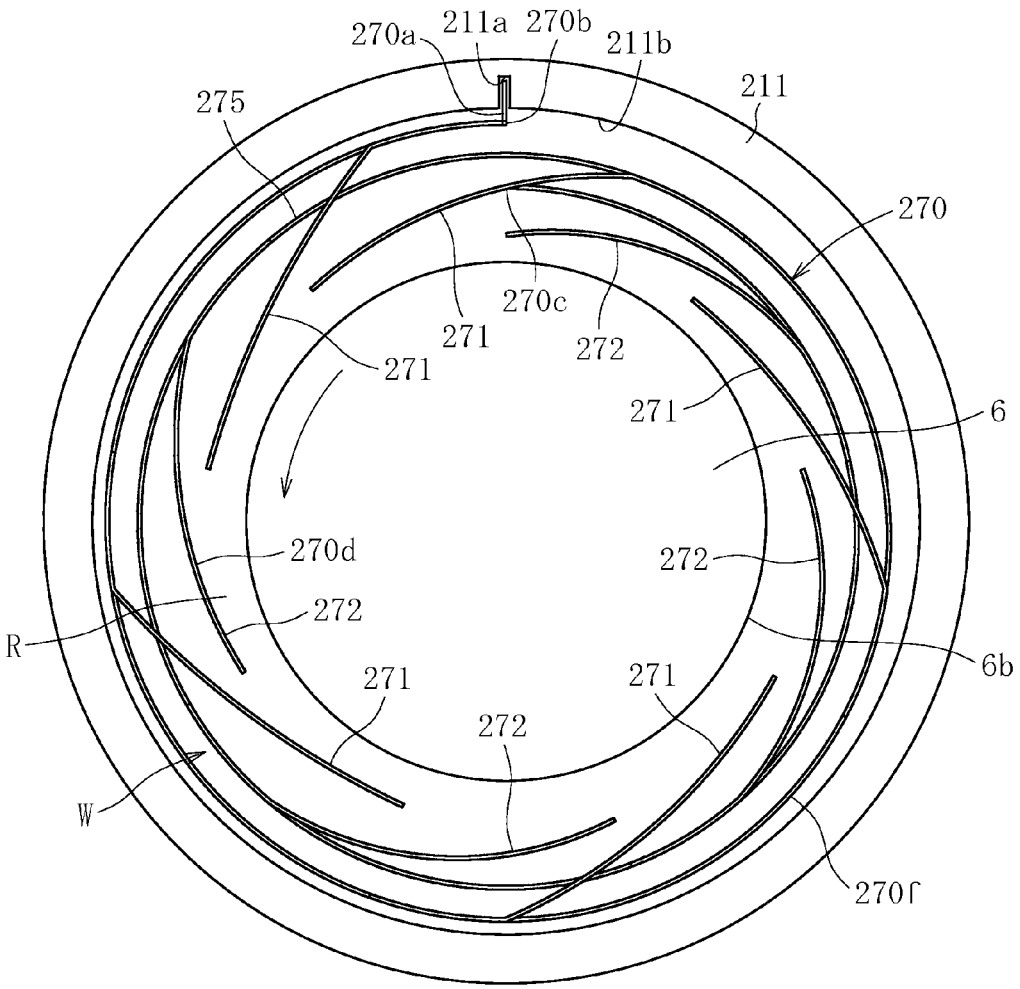
FIG. 34 is a sectional view of a radial foil bearing according to another embodiment of the third invention.
Figure 35:
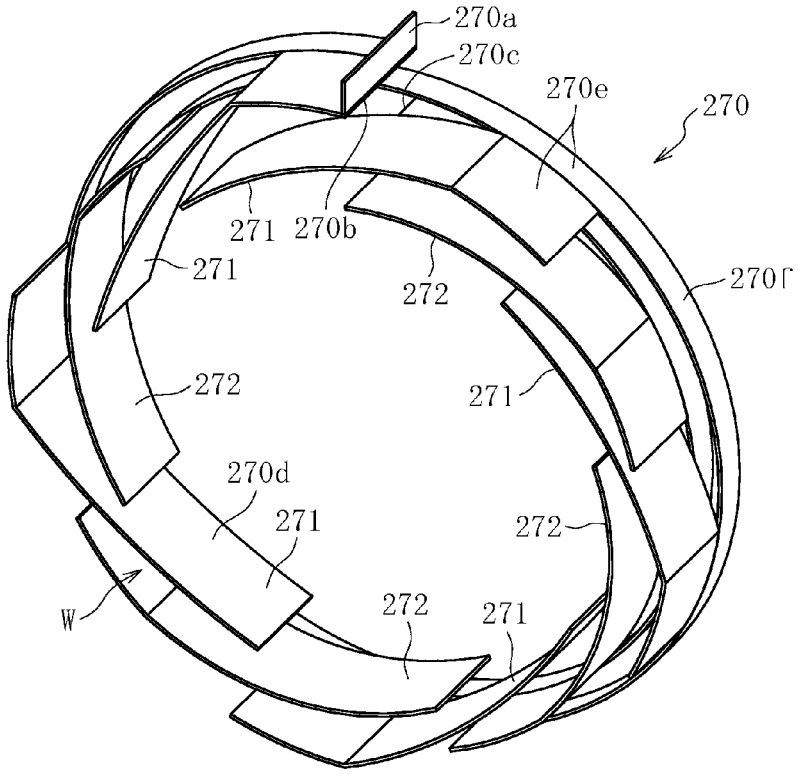
FIG. 35 is a perspective view of a foil member of the radial foil bearing.

Still further, in the radial foil bearing 10 described above, the plurality of leaves may be formed of a single foil. For example, a foil member 270 illustrated in FIGS. 34 and 35 is formed by turning a single belt-like foil around the shaft 6 so as to radially overlap the foil in a spiral form. This embodiment exemplifies a case where the foil member 270 is turned twice and both ends 270b and 270c of the foil are arranged at substantially the same position in the circumferential direction. With this, a double-layer foil portion W is formed substantially over the entire circumference of the foil member 270 in a manner that two foils are radially overlapped with each other. In the double-layer foil portion W, an outer foil is partially raised radially inward to form first leaves 271 each having a radially inner edge provided as a free end, and an inner foil is partially raised radially inward to form second leaves 272 each having a radially inner edge provided as a free end. The first leaves 271 and the second leaves 272 are arranged alternately to each other in the circumferential direction except a vicinity of both the end portions 270b and 270c of the foil.

The first leaves 271 and the second leaves 272 each have an inner peripheral surface that serves as a bearing surface 270d having a shape of a curved surface projected radially outward. The radial bearing gap R having a shape of a wedge that shrinks along the rotational direction of the shaft 6 is formed between the bearing surfaces 270d and the outer peripheral surface 6a of the shaft 6. The free ends of the leaves 271 and 272 are each radially overlapped with another adjacent leaf on the forward side in the rotational direction.

Figure 36A:
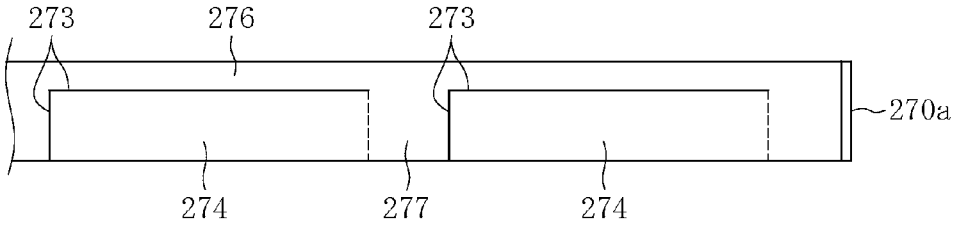
FIG. 36A is a plan view of a method of assembling the foil member.
Figure 36B:
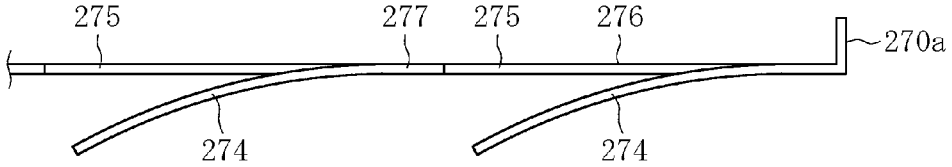
FIG. 36B is a side view of the method of assembling the foil member.
Figure 37:
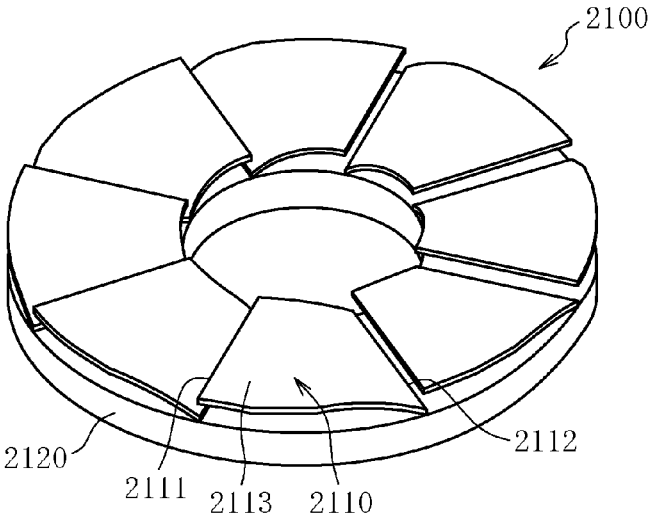
Fig. 37 PRIOR ART
FIG. 37 is a perspective view of a conventional foil bearing.
Figure 38:
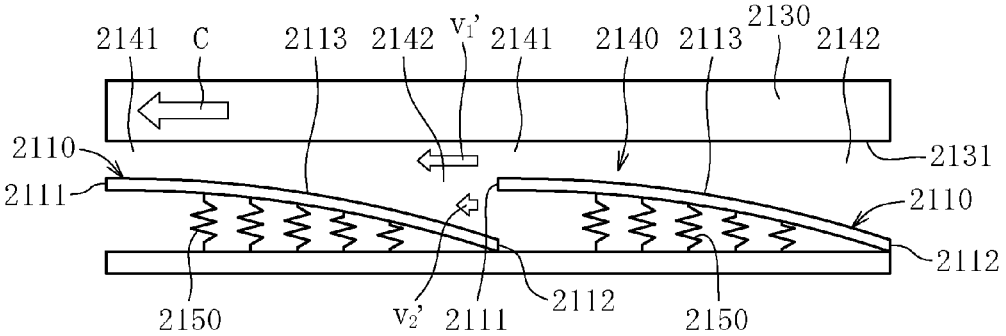
Fig. 38 PRIOR ART
FIG. 38 is a schematic side view of the foil bearing of FIG. 37.
Figure 39:
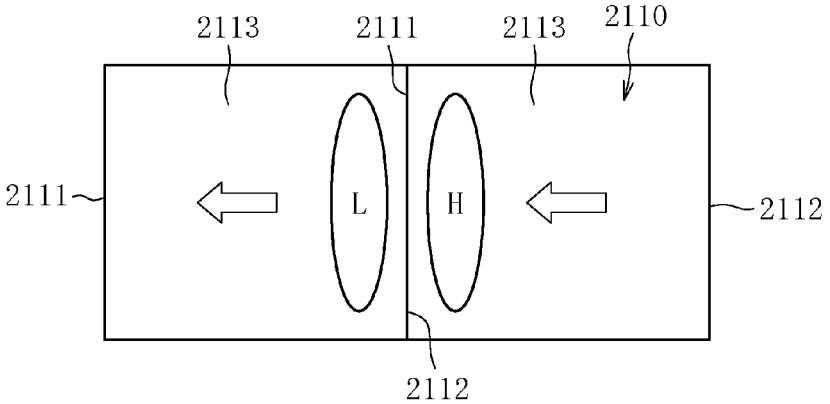
Fig. 39 PRIOR ART
FIG. 39 is a plan view of leaf foils of the foil bearing of FIG. 37.

The foil member 270 illustrated in FIG. 35 is manufactured as follows. First, as illustrated in FIG. 36A, a plurality of L-shaped slits 273 are formed at appropriate intervals into a lateral edge portion on one side of a metal flat-plate-like foil 270 through a wire cutting process, a pressing process, and the like. At this time, a region 277 between a lateral edge portion 276 on another side and adjacent one of the slits 273 is left united without being cut off. Next, as illustrated in FIG. 36B, tongue portions 274 formed of the slits 273 are curved in the same direction, and then the flat-plate-like foil 270 is rolled into a double-layer spiral form with the tongue portions 274 being directed radially inward. At the time of rolling a foil of a second turn, the tongue portions 274 of the foil of the second turn are brought to a position between adjacent tongue portions 274 of a foil of a first turn. At this time, the tongue portions 274 have been cut and raised, and hence the tongue portions 274 of the second turn are introduced to the position between the tongue portions 274 of the first turn through opening portions 275 formed through the foil 270 of the first turn. By the procedure described above, the first leaves 271 and the second leaves 272 are formed of the tongue portions 274. The leaves 271 and 272 are held to be elastically deformable by an annular portion 270e integrally comprising the lateral edge portion 276 and the region 277 between the lateral edge portion 276 and the adjacent one of the slits.

One of the ends of the foil member 270 manufactured by the procedure described above is mounted to the outer member 211 under a state in which the foil member 270 is arranged on the radially inner side with respect to the outer member 211. In this way, the foil member 270 is fixed to the outer member 211. Specifically, in the above-mentioned step of manufacturing the foil member 270, a mounting portion 270a raised radially outward is formed at one end portion of the belt-like foil, and the mounting portion 270a is fitted and fixed into an axial groove 211b formed on an inner periphery of the outer member 211. In this way, the foil member 270 can be fixed to the outer member 211.

In the embodiment described above, the leaf foils are mounted to the fixed members (thrust members 221 and outer member 211). However, the leaf foils may be mounted to the rotary members (shaft 6 and flange portion 240). In this case, wedge-like thrust bearing gaps are formed between the bearing surfaces provided to the leaf foils and the fixed members. However, in this case, the leaf foils are rotated at high speed together with the shaft 6, and hence the leaf foils may be deformed due to the centrifugal force. In particular, when the leaf foils of the thrust foil bearing 220 are rotated, the leaf foils are more liable to be deformed due to the centrifugal force. Thus, in view of avoiding the deformation of the leaf foils, it is preferred that the leaf foils be mounted to the fixed members.

Further, in the configuration of the embodiment described above, the thrust foil bearing 220 comprises the bearing members 220a provided on both the axial sides with respect to the flange portion 240 so as to support the flange portion 240 in both the thrust directions. However, the present invention is not limited thereto, and the bearing member 220a may be provided only on one axial side with respect to the flange portion 240 so as to support the flange portion 240 only in one of the thrust directions. Such a configuration is applicable, for example, to a case where the flange portion needs not be supported in another of the thrust directions, or a case where the flange portion is supported by another structure in the another of the thrust directions.

Still further, in the embodiment described above, the foil bearing according to the present invention is applied to a gas turbine. However, the present invention is not limited thereto, and the foil bearing may be applied, for example, to the supercharger as illustrated in FIG. 14.

The foil bearing according to the present invention can be used not only in the micro turbine or the supercharger, but widely used also as bearings for vehicles such as an automobile, which are used under restrictions such as a difficulty in lubricating with a liquid such as a lubricating oil, a difficulty in separately providing an auxiliary device of a lubricating oil circulatory system in view of energy efficiency, or problems that may be caused by shearing resistance of the liquid. The foil bearing according to the present invention can be widely used also as bearings for industrial devices.

Note that, the foil bearing described above is suited to a case where air is used as a lubricant, but is applicable to other gases, and is operated through intermediation of a liquid such as water and an oil.

Now, description is made of embodiments of a fourth invention of the present application with reference to FIGS. 40 to 52.

Figure 40:
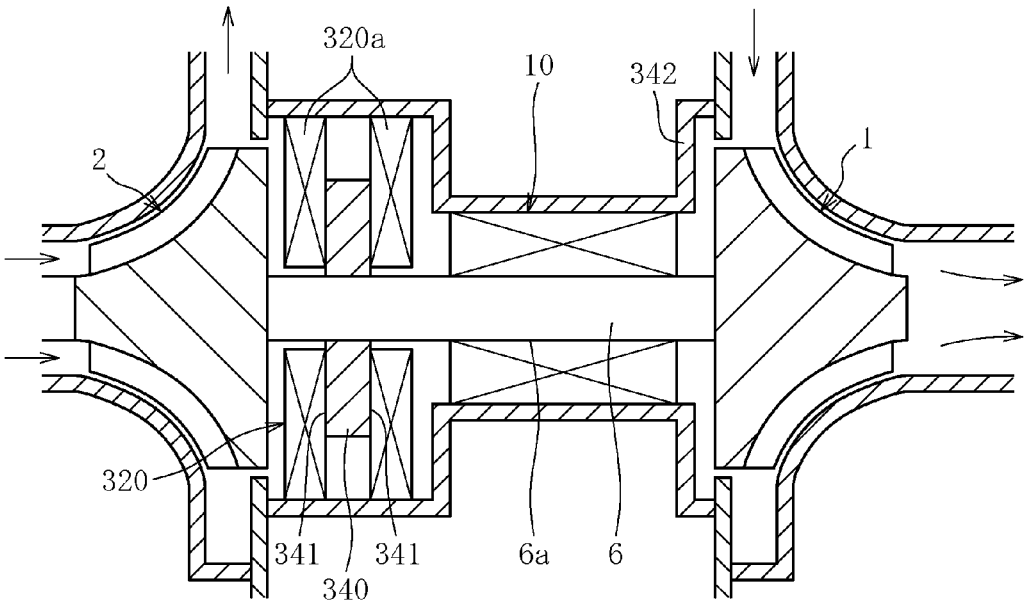
FIG. 40 is a sectional view of a support structure for the rotor of the micro gas turbine.

FIG. 40 illustrates a support structure for the rotor of the micro gas turbine (refer to FIG. 1), specifically, a support structure for the shaft 6 in the axial region between the turbine 1 and the compressor 2. This region is adjacent to the turbine 1 rotated by the high-temperature and high-pressure gas, and hence an air dynamic pressure bearing, in particular, a foil bearing is suitably used in this region. Specifically, the radial foil bearing 10 for supporting the shaft 6 in the radial direction, and a thrust foil bearing 320 for supporting a flange portion 340 provided to the shaft 6 in both the thrust directions support the rotor in a freely rotatable manner.

The radial foil bearing 10 has the same structure as that illustrated in FIG. 3, and hence redundant description thereof is omitted.

Figure 41:
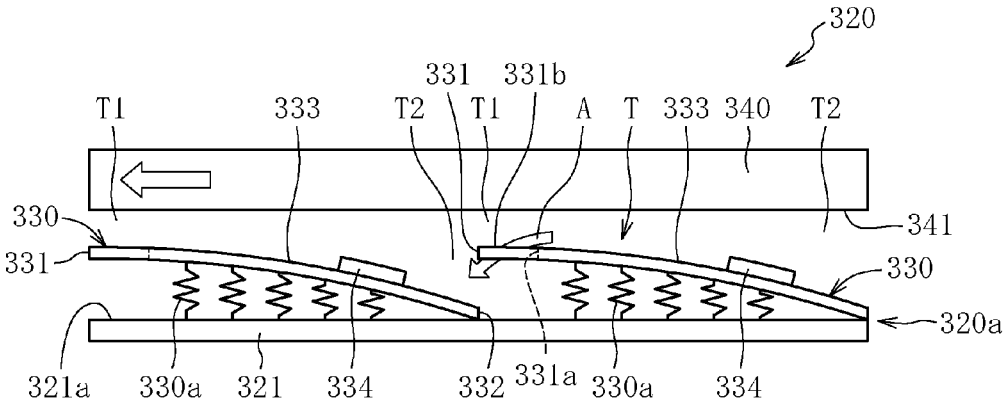
FIG. 41 is a side view of a thrust foil bearing according to an embodiment of a fourth invention of the present application, which is incorporated in the support structure for the rotor.
Figure 42:
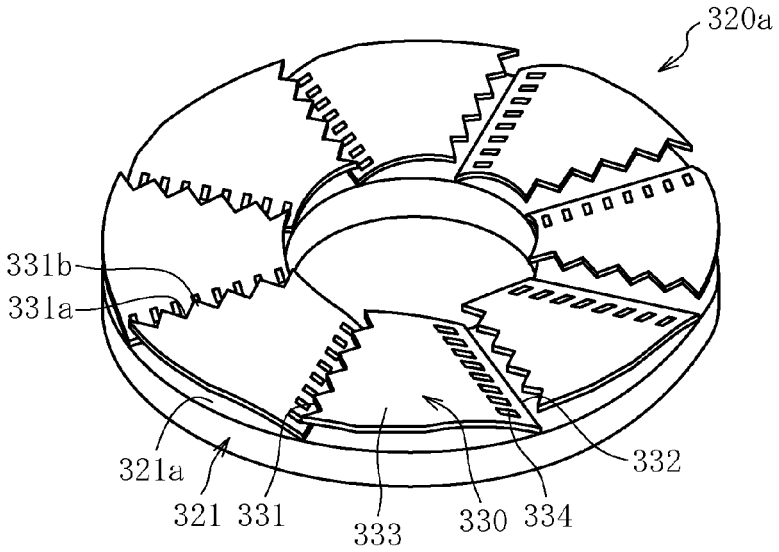
FIG. 42 is a perspective view of a bearing member of the thrust foil bearing.

As illustrated in FIGS. 40 to 42, the thrust foil bearing 320 according to the embodiment of the present invention comprises the flange portion 340 (rotary member) provided to project radially outward from the outer peripheral surface 6a of the shaft 6, disc-like thrust members 321 (fixed members) fixed to a casing 342, and foil members arranged between the flange portion 340 and the thrust members 321. In this embodiment, bearing members 320a are provided on both axial sides with respect to the flange portion 340, and the bearing members 320a each comprise the disc-like thrust members 321 (fixed members), and the foil members fixed to an end surface 321a of each of the thrust members 321. In the illustrated example, the foil members each comprise a plurality of leaves 330 fixed in an equiangular array to the end surface 321a of each of the thrust members 321.

The leaves 330 are formed of a single metal foil made of the same material and having the same thickness as those of the leaves 12 of the radial foil bearing 10, and are formed into a fan shape along the circumferential direction of the thrust member 321. The leaves 330 each comprise a free end 331 formed of an end portion on the one side in the circumferential direction (forward side in the rotational direction of the shaft 6, that is, left side in the drawings), and a fixed end 332 formed of an end portion on the another side in the circumferential direction, which is fixed to the thrust member 321. A surface of each of the leaves 330 on an opposite side with respect to the thrust member 321 serves as a thrust bearing surface 333 having a shape of a curved surface projected to the flange portion 340 side. The shape of the curved surface of the thrust bearing surface 333 is smooth without pores or steps. Note that, springs 330a schematically illustrate spring property of the leaves 330, and hence are not actually provided.

Figure 43:
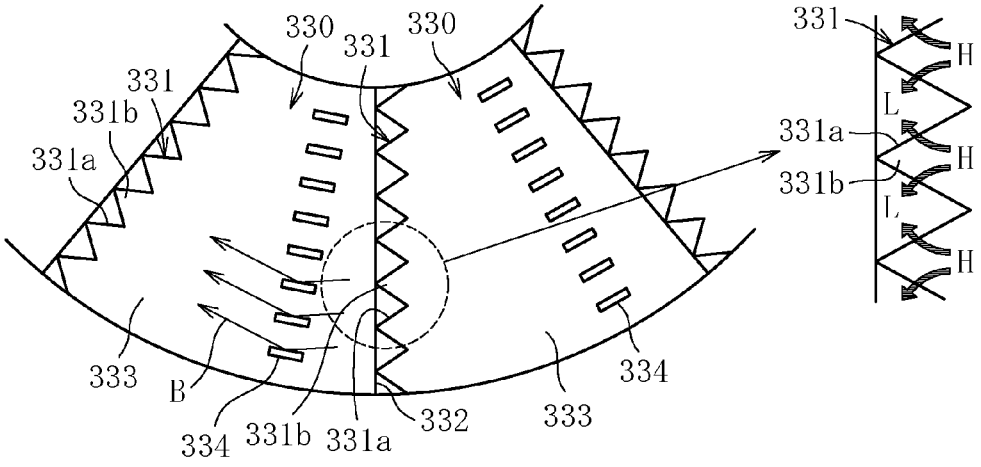
FIG. 43 is a plan view of leaves of the thrust foil bearing.

As illustrated in FIG. 43, the free end 331 of each of the leaves 330 comprises a plurality of cutout portions 331a, and land portions 331b that are continuous with the thrust bearing surface 333, and the cutout portions 331a and the land portions 331b are arranged alternately to each other in an extending direction of the free end 331 (radial direction in this embodiment). In the illustrated example, the free end 331 is formed into a zigzag shape so as to form the triangular cutout portions 331a and the land portions 331b alternately to each other.

The thrust bearing surface 333 of each of the leaves 330 comprises circumferentially long protrusions provided at a plurality of positions spaced apart from each other in the radial direction. In this embodiment, rectifying members 334 are fixed to the surface of each of the leaves 330, and the rectifying members 334 form the protrusions. The rectifying members 334 are each formed, for example, of an elongated rectangular metal plate, and fixed to the surfaces of the leaves 330 by appropriate methods such as bonding, welding, and fusing. The rectifying members 334 are arranged substantially along the circumferential direction. In the illustrated example, the rectifying members 334 are each arranged on a straight line parallel to a tangential direction of a circumference of an arbitrary point in a longitudinal direction (for example, central portion in the longitudinal direction) of each of the rectifying members 334. The rectifying members 334 are provided on the large gap portion T2 side of the thrust bearing gap T. In the illustrated example, the rectifying members 334 are each provided on the backward side in the rotational direction with respect to a circumferential center of each of the leaves 330. The rectifying members 334 are arranged at equal intervals in the radial direction. Note that, the rectifying members 334 need not be formed into a linear shape, and may be formed into a circular-arc shape parallel to the circumferential direction. Further, the protrusions provided to the thrust bearing surface 333 are not limited to the protrusions descried above, and may be formed, for example, through plastic working (such as press forming) on the leaves 330. In this case, the protrusions need to be formed without forming holes through the leaves 330. This is because, when the holes are formed through the leaves 330, the fluid in the thrust bearing gaps T is released through the holes, and hence the pressure is reduced.

Along with the rotation of the shaft 6 to the one side in the circumferential direction, the wedge-like radial bearing gap R narrowed in the radial direction toward the one side in the circumferential direction is formed between the radial bearing surfaces 12c of the leaves 12 of the radial foil bearing 10 and the outer peripheral surface 6a of the shaft 6 (refer to FIG. 3). The fluid film (air film) is formed in the radial bearing gap R, and supports the shaft 6 in the radial direction in a non-contact manner. Simultaneously, the thrust bearing gaps T narrowed in the axial direction toward the one side in the circumferential direction are formed between end surfaces 341 on both axial sides of the flange portion 340 of the thrust foil bearing 320 and the thrust bearing surfaces 333 of the foil members (leaves 330) provided on both the axial sides with respect to the flange portion 340 (refer to FIG. 41). The fluid films (air films) are formed in the thrust bearing gaps T, and support the shaft 6 in both the thrust directions in a non-contact manner. Note that, the widths of the radial bearing gap R and the thrust bearing gaps T are actually as fine as approximately several tens of micrometers, but are illustrated on an exaggerated scale in FIGS. 3 and 41.

At this time, as indicated by the arrow A in FIG. 41, the fluid in the small gap portion T1 in the thrust bearing gap T flows toward a back side of the leaf 330 via the cutout portions 331a (lower side in FIG. 41). In this way, the fluid in the entire large gap portion T2 is allowed to dynamically flow, and a larger amount of the fluid flows from the large gap portion T2 into a subsequent small gap portion T1. As a result, higher pressure is generated in the small gap portions T1,and hence the load capacity in the thrust directions can be increased.

Further, the centrifugal force generated along with the rotation of the shaft 6 may cause the fluid in the thrust bearing gap T to flow radially outward. The fluid hits against the rectifying members 334 provided to the surfaces of the leaves 330, with the result that the fluid flows along the circumferential direction (refer to the arrows B in FIG. 43). By this rectifying effect, an amount of the fluid that flows radially outward through the thrust bearing gap T is reduced. As a result, a larger amount of the fluid flows into the small gap portion T1, and the pressure can be increased. Note that, the centrifugal force applied to the fluid in the thrust bearing gap T becomes greater toward the radially outer side. Thus, it is preferred that the circumferentially long protrusions (rectifying members 334) be provided at least on the radially outer side on the thrust bearing surface 333 (radially outer side with respect to a central portion in the radial direction). In the illustrated example, the protrusions are provided at equal intervals over the entire region in the radial direction of the thrust bearing surface 333. Further, in this embodiment, the cutout portions 331a are provided to the free end 331 of each of the leaves 330 so that the fluid in the thrust bearing gap T flows toward the back side of the leaf 330 via the cutout portions 331a. Thus, the fluid is liable to be disturbed in the large gap portion T2. In view of this, the rectifying effect obtained by providing the protrusions (rectifying members 334) to each of the leaves 330 is particularly advantageous.

Further, at this time, the leaves 12 of the radial foil bearing 10 and the leaves 330 of the thrust foil bearing 320 are flexible, and hence the bearing surfaces 12c and 333 of the leaves 12 and 330 are arbitrarily deformed in accordance with operating conditions such as a load, a rotation speed of the shaft 6, and an ambient temperature. Thus, the radial bearing gap R and the thrust bearing gaps T are automatically adjusted to have appropriate widths in accordance with the operating conditions. As a result, even under severe conditions involving high temperature and high speed rotation, the radial bearing gap R and the thrust bearing gaps T can be managed to have optimum widths, and hence the shaft 6 can be stably supported.

It is desired that the radial bearing surfaces 12c and the thrust bearing surfaces 333 of the foil bearings 10 and 320 be provided with coating for reducing friction of the surfaces. As the coating of this type, there may be used, for example, a DLC film, a titanium aluminum nitride film, or a molybdenum disulfide film. Such coating may be formed not only on the radial bearing surfaces 12c and the thrust bearing surfaces 333 but also on the opposed side, that is, the outer peripheral surface 6a of the shaft 6 and the end surfaces 341 of the flange portion 340. Further, the coating described above may be formed on one of or both of the back surfaces of the leaves 12 and 330, and parts in contact therewith, that is, the inner peripheral surface 11a of the outer member 11 (refer to FIG. 3) and the end surface 321a of each of the thrust members 321 (refer to FIG. 42) so as to enhance abrasion resistance.

The present invention is not limited to the embodiment described above. Note that, in the following description, parts having the same functions as those in the embodiment described above are denoted by the same reference symbols, and redundant description thereof is omitted.

Figure 44:
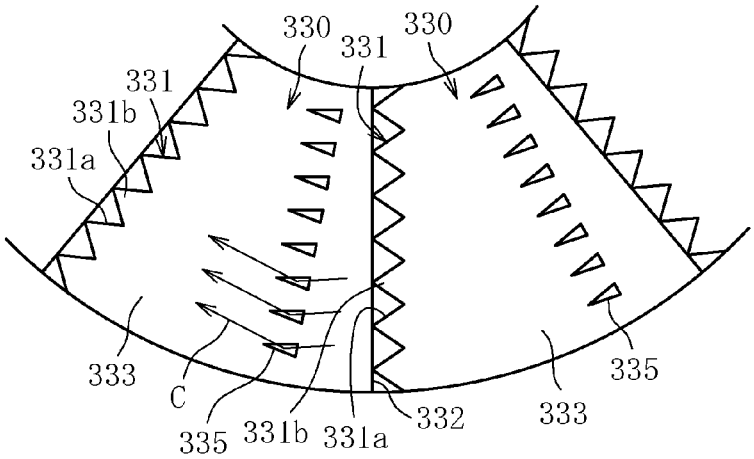
FIG. 44 is a plan view of leaves of a thrust foil bearing according to another embodiment of the fourth invention.
Figure 45:
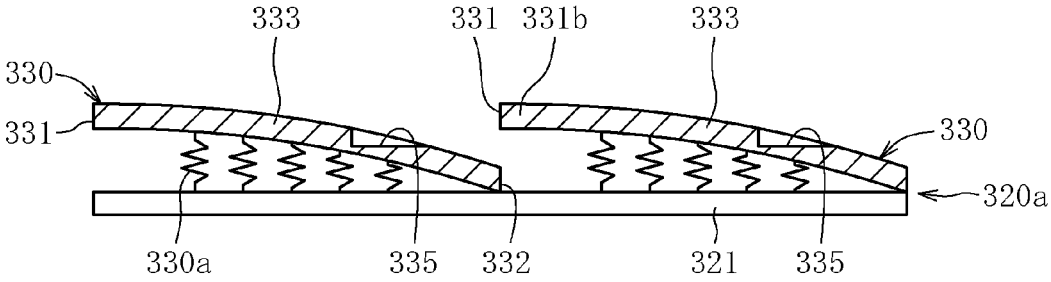
FIG. 45 is a schematic sectional view of a bearing member of the thrust foil bearing of FIG. 44.
Figure 46:
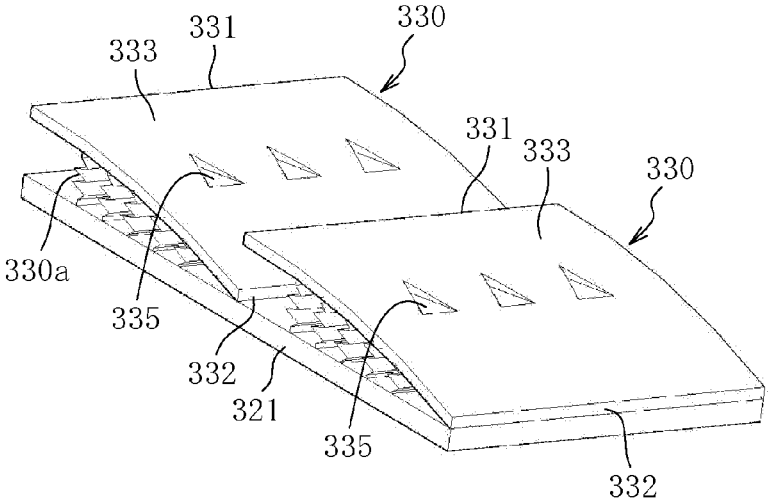
FIG. 46 is a schematic perspective view of the bearing member of the thrust foil bearing of FIG. 44.

For example, in the embodiment described above, the protrusions (rectifying members 334) are provided on the surface of each of the leaves 330. However, the present invention is not limited thereto. For example, as illustrated in FIGS. 44 to 46, the surface of each of the leaves 330 may comprise circumferentially long grooves 335. The grooves 335 are formed through the plastic working (such as press forming) on the surface of each of the leaves 330. The grooves 335 are formed without passing through the leaves 330 (refer to FIG. 45). Further, in the illustrated example, groove widths (radial widths) of the grooves 335 are gradually reduced toward the forward side in the rotational direction (free end 331 side) (refer to FIG. 44). Further, groove depths of the grooves 335 are gradually increased toward the forward side in the rotational direction (refer to FIG. 45). In other words, as illustrated in FIG. 46, the grooves 335 are large in groove width and small in groove depth on a fluid inlet side (fixed end 332 side of the leaves 330), and small in groove width and large in groove depth on a fluid outlet side (free end 331 side of the leaves 330). Note that, in FIG. 46, for the sake of simplicity of illustration, the leaves 330 having a circular-arc shape in plan view are illustrated in a rectangular shape, and the free end 331 of each of the leaves 330 is illustrated in a linear shape.

In this way, the circumferentially long grooves 335 are formed in the leaves 330. Thus, along with the rotation of the shaft 6, the fluid flowing in the thrust bearing gaps T enters the grooves 335, and hits against lateral walls of the grooves 335. As a result, the fluids flows along the circumferential direction (refer to the arrows C in FIG. 44). In particular, the grooves 335 in the illustrated example are large in groove width and small in groove depth on the fluid inlet side, and hence the fluid easily enters the grooves 335. Further, the grooves 335 are gradually reduced in groove width toward end portions on the forward side in the rotational direction, and hence directionality of the fluid that flows out via leading ends of the grooves 335 can be enhanced.

Note that, the shape of the grooves 335 is not limited to the shape described above. For example, the grooves 335 may be configured to have a uniform groove depth or a uniform groove width (not shown). Alternatively, the grooves 335 may be formed into a circumferentially long rectangular shape, or a circular-arc shape parallel to the circumferential direction.

Figure 47:
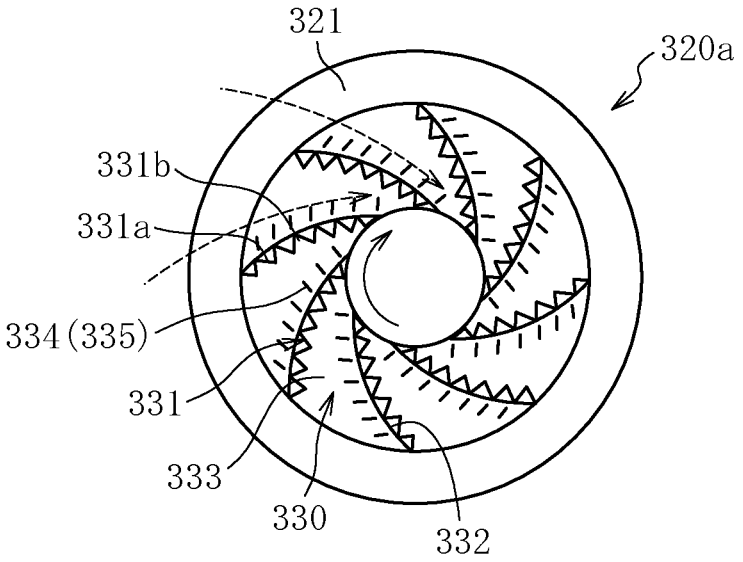
FIG. 47 is a plan view of a bearing member of a thrust foil bearing according to another embodiment of the fourth invention.
Figure 48:
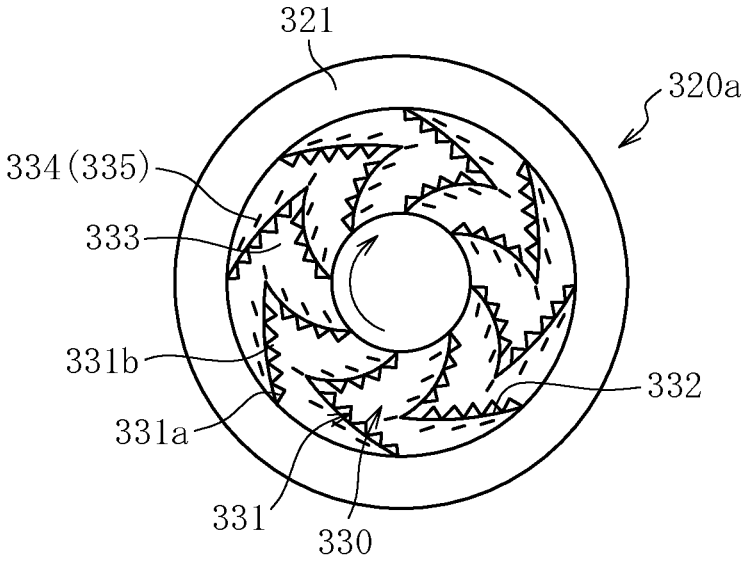
FIG. 48 is a plan view of a bearing member of a thrust foil bearing according to still another embodiment of the fourth invention.

Further, in the embodiment described above, the free end 331 of each of the leaves 330 extends along the radial direction. However, the present invention is not limited thereto. For example, as illustrated in FIGS. 47 and 48, radially outer edges of the free ends 331 of the leaves 330 may be inclined radially inward to the forward side in the rotational direction of the shaft 6. With this, along with the rotation of the shaft 6, air on the radially outer side of the thrust foil bearing 320 is fed to the radially inner side along the leaves 330 (refer to dotted-line arrows in FIG. 47). Thus, a larger amount of air can be fed into the thrust bearing gaps T, and hence higher pressure can be generated in the thrust bearing gaps T. Specifically, as illustrated, for example, in FIG. 47, the free ends 331 of the leaves 330 can be arrayed in a spiral pattern of a pump-in type. Alternatively, as illustrated in FIG. 48, the free ends 331 of the leaves 330 may be arrayed in a herringbone pattern. Note that, the herringbone pattern refers to a substantially V-shape in which the radially outer edges and radially inner edges of the free ends 331 are inclined to a radial center and to the forward side in the rotational direction of the shaft 6.

Figure 49:
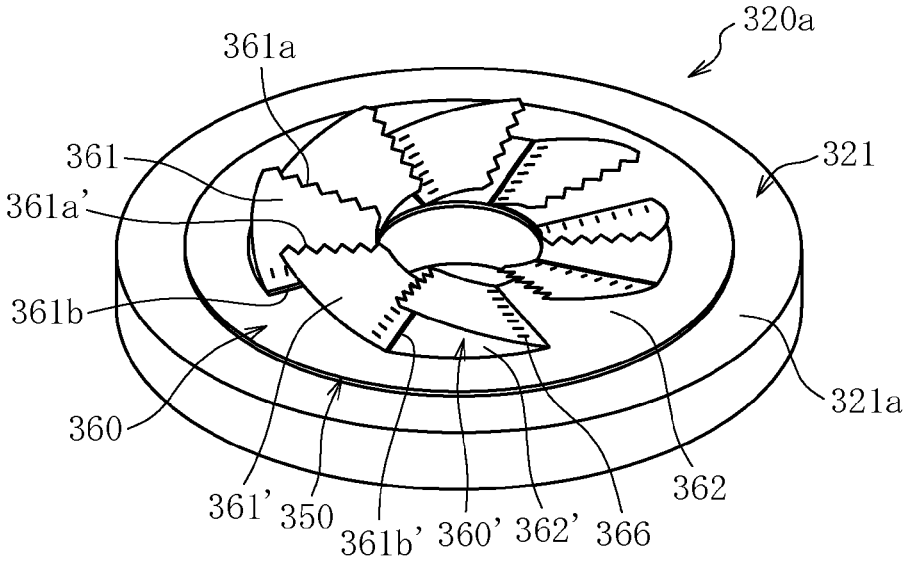
FIG. 49 is a perspective view of a bearing member of a thrust foil bearing according to yet another embodiment of the fourth invention.
Figure 50:
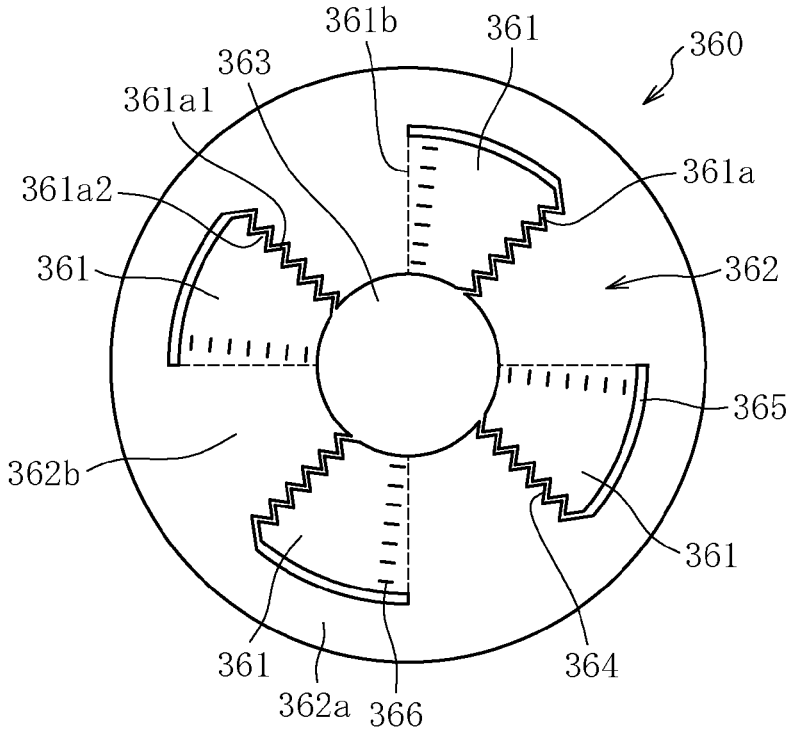
FIG. 50 is a plan view of a foil of the thrust foil bearing of FIG. 49.

Still further, in the embodiment described above, the plurality of leaves are formed separately one by one. However, the present invention is not limited thereto. For example, a plurality of leaves may be provided to a single foil. Specifically, FIG. 49 illustrates an embodiment in which two foils 360 and 360' each comprising a plurality of leaves 361 and 361' are combined with each other so as to form a foil member 350, and the foil member 350 is fixed to each of the thrust members 321.

Here, description is made of a configuration of each of the foils 360 and 360'. Note that, the foils 360 and 360' have completely the same configuration, and hence description is made only of the configuration of one foil 360, and description of another foil 360' is omitted (in FIG. 49, single quotation marks are added to reference symbols of parts of the another foil 360', which correspond to those of the one foil 360).

The foil 360 is formed into a circular shape, and comprises a circular hole 363 that is formed at a center thereof so as to allow the shaft 6 to pass therethrough. In this embodiment, a plurality of (four in the illustrated example) equiangularly arranged leaves 361 and a coupling portion 362 are formed by forming substantially L-shaped slits into a single foil 360 through a wire cutting process, a pressing process, and the like. Specifically, at a plurality of equiangular positions (four in the illustrated example) on the circular foil 360, there are provided radial slits 364 that extend radially outward from the hole 363 in a zigzag pattern toward a position short of a radially outer rim of the foil 360. Then, circumferential slits 365 extend from radially outer ends of the slits 364 toward the another side in the circumferential direction (backward side in the rotational direction of the shaft 6, that is, counterclockwise direction in FIG. 50). When those radial slits 364 and circumferential slits 365 are formed into the foil 360, the plurality of leaves 361 each having an end portion 361a on the one side in the circumferential direction, which is provided as the free end that is freely movable upward and downward in the axial direction, and the coupling portion 362 for coupling the leaves 361 to each other can be formed integrally with each other. The coupling portion 362 comprises an annular portion 362a surrounding outer peripheries of the plurality of leaves 361, and a plurality of (four in the illustrated example) extending portions 362b extending radially inward from the annular portion 362a. The extending portions 362b are continuous with end portions 361b on the another side in the circumferential direction of the leaves 330 (indicated by dotted lines in FIG. 50). In the illustrated example, the extending portions 362b of the coupling portion 362 and the leaves 361 are equal to each other in circumferential length, and provided alternately to each other in the circumferential direction. The free end 361a of each of the leaves 361 is formed into a zigzag shape comprising a plurality of cutout portions 361a1 and land portions 361a2 formed alternately to each other. Each of the leaves 361 comprises circumferentially long protrusions or grooves 366 that are formed at a plurality of positions spaced apart from each other in the radial direction.

The two foils 360 and 360' are assembled to each other by the method illustrated in FIG. 7, and hence redundant description thereof is omitted here.

Figure 51:
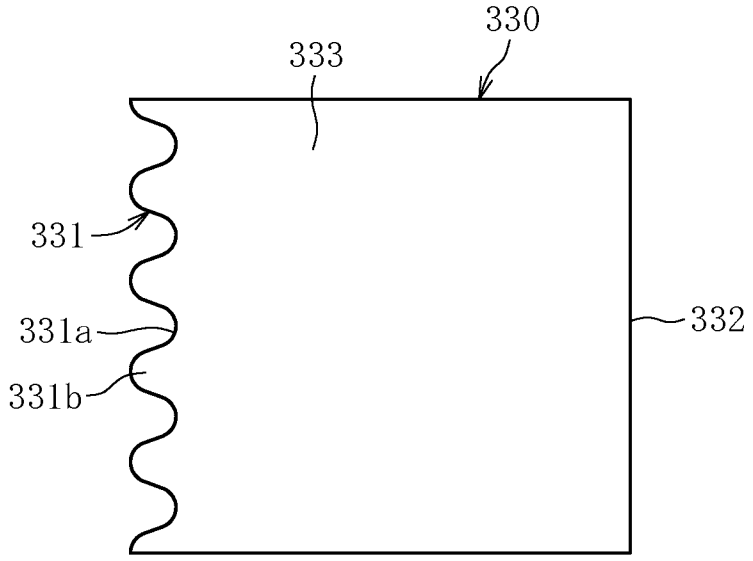
FIG. 51 is a plan view of a leaf of a thrust foil bearing according to another embodiment of the fourth invention.
Figure 52:
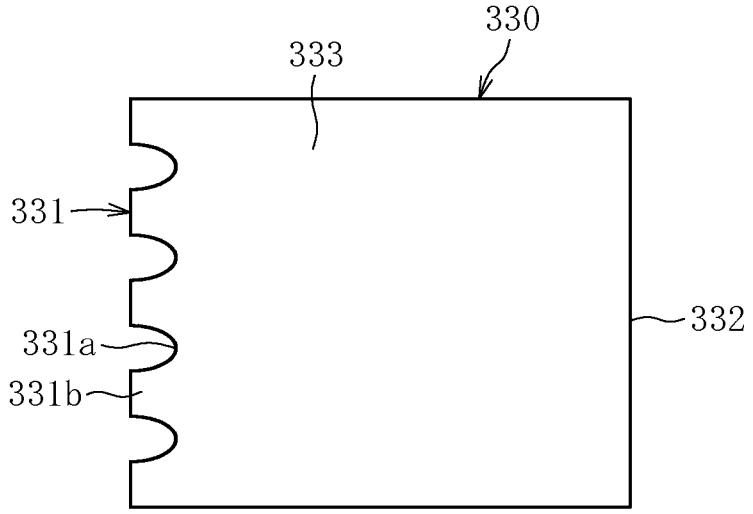
FIG. 52 is a plan view of a leaf of a thrust foil bearing according to still another embodiment of the fourth invention.

Further, the shape of the free end 331 of the leaf 330 is not limited to the shape described above. For example, as illustrated in FIG. 51, the free end 331 of the leaf 330 may be formed into a corrugated shape. Alternatively, as illustrated in FIG. 52, the free end 331 of the leaf 330 may comprise a plurality of cutout portions 331a provided at a plurality of positions spaced apart from each other in the radial direction. Further, the cutout portions 331a and the land portions 331b may be formed not only into the triangular shape (refer to FIG. 43), the corrugated shape (refer to FIG. 51), or the circular-arc shape (refer to FIG. 52), but also into a rectangular shape or a trapezoidal shape (not shown). In addition, the free end 331 may be formed into a linear shape (not shown).

Still further, in the embodiment described above, the foil member is fixed to the fixed member (thrust member 321, outer member 11). However, reversely, the foil member may be fixed to the rotary member (flange portion 140, shaft 6). In this case, a wedge-like thrust bearing gap or radial bearing gap is formed between the bearing surfaces provided to the foil member and the fixed member. However, in this case, the foil member is rotated at high speed together with the shaft 6, and hence the foil member may be deformed due to the centrifugal force. In particular, when the foil member of the thrust foil bearing 320 is rotated, the foil member is more liable to be deformed due to the centrifugal force. Thus, in view of avoiding the deformation of the foil member, it is preferred that the foil member be fixed to the fixed member.

Yet further, in the configuration of the embodiment described above, the bearing members 320a are provided on both the axial sides with respect to the flange portion 340 so as to support the flange portion 340 in both the thrust directions. However, the present invention is not limited thereto, and the bearing member 320a may be provided only on one axial side with respect to the flange portion 340 so as to support the flange portion 340 only in one of the thrust directions. Such a configuration is applicable, for example, to a case where the flange portion needs not be supported in another of the thrust directions, or a case where the flange portion is supported by another structure in the another of the thrust directions.

Yet further, in the embodiment described above, the present invention is applied to a leaf-type thrust foil bearing. However, the present invention is not limited thereto. For example, the present invention is applicable also to a thrust foil bearing of a bump foil type comprising a top foil having a thrust bearing surface and a corrugated back foil arranged between the top foil and a thrust member, and to a thrust foil bearing using a combination of the leaf type and the bump foil type (arranging the back foil between leaves and the thrust member).

Yet further, in the embodiment described above, the thrust foil bearing 320 according to the present invention is applied to a gas turbine. However, the present invention is not limited thereto, and the thrust foil bearing 320 may be applied, for example, to a supercharger as illustrated in FIG. 14.

The foil bearing according to the present invention can be used not only in the micro turbine or the supercharger, but widely used also as bearings for vehicles such as an automobile, which are used under restrictions such as a difficulty in lubricating with a liquid such as a lubricating oil, a difficulty in separately providing an auxiliary device of a lubricating oil circulatory system in view of energy efficiency, or problems that may be caused by shearing resistance of the liquid. The foil bearing according to the present invention can be widely used also as bearings for industrial devices.

Note that, the foil bearing described above is suited to a case where air is used as a lubricant, but is applicable to other gases, and is operated through intermediation of a liquid such as water and an oil.

Now, description is made of embodiments of a fifth invention of the present application with reference to FIGS. 53 to 57.

Figure 53:
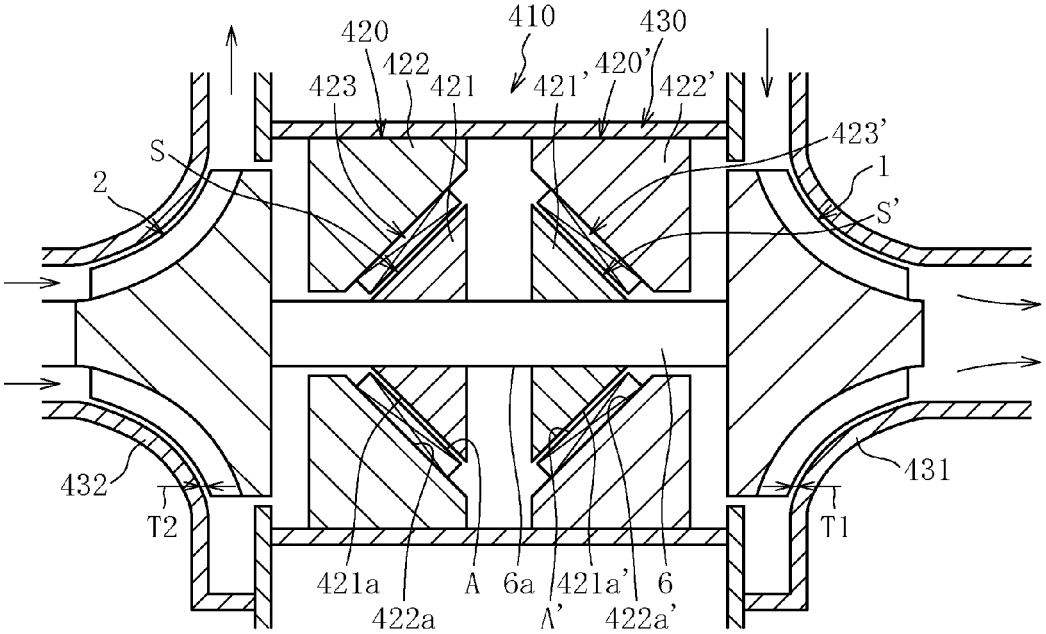
FIG. 53 is an axial sectional view of a foil bearing according to an embodiment of a fifth invention of the present application, which is incorporated in the micro gas turbine.

FIG. 53 illustrates a support structure for the rotor of the micro gas turbine (refer to FIG. 1), specifically, a support structure in the axial region between the turbine 1 and the compressor 2. This region is adjacent to the turbine 1 rotated by the high-temperature and high-pressure gas, and hence an air dynamic pressure bearing, in particular, a foil bearing 410 is applied.

The foil bearing 410 according to an embodiment of the present invention comprises a first bearing portion 420 and a second bearing portion 420' arranged in an axial alignment. As illustrated in exploded view in FIG. 54, the first bearing portion 420 comprises an annular projecting portion 421 provided to project from the shaft 6 to an outer periphery, an annular outer member 422 provided around the projecting portion 421, and a foil member 423 provided between the projecting portion 421 and the outer member 422. The second bearing portion 420' has a structure corresponding to an axial inverse of the first bearing portion 420, and comprises a projecting portion 421', an outer member 422', and a foil member 423'. Note that, in the example illustrated in FIG. 54, the foil bearing 410 is partially cut away in the circumferential direction. However, actually, as illustrated in FIG. 55, the projecting portions 421 and 421', and the outer members 422 and 422' are each formed into an annular shape that is continuous over the entire circumference, and the foil members 423 and 423' are each provided substantially over the entire periphery.

The projecting portion 421 of the first bearing portion 420 is fixed to the outer peripheral surface 6a of the shaft 6, and the outer member 422 is fixed to an inner periphery of a casing 430 (refer to FIG. 53). The first bearing portion 420 has a pair of first tapered surfaces facing each other. In the illustrated example, the first bearing portion 420 has a first tapered outer peripheral surface 421a provided to the projecting portion 421, and a first tapered inner peripheral surface 422a provided to the outer member 422. The first tapered outer peripheral surface 421a and the first tapered inner peripheral surface 422a are inclined at the same angle with respect to the axial direction.

The foil member 423 has a flexible bearing surface A, and is arranged in a tapered space between the first tapered outer peripheral surface 421a of the projecting portion 421 and the first tapered inner peripheral surface 422a of the outer member 422. In this embodiment, as illustrated in FIG. 55, the foil member 423 is fixed to the first tapered inner peripheral surface 422a of the outer member 422 provided on the fixed side, and a bearing gap S is formed between the first tapered outer peripheral surface 421a of the projecting portion 421 provided on the rotary side and the bearing surface A of the foil member 423. Note that, a width of the bearing gap S is actually as fine as approximately several tens of micrometers, but are illustrated on an exaggerated scale in FIG. 55.

Figure 54:
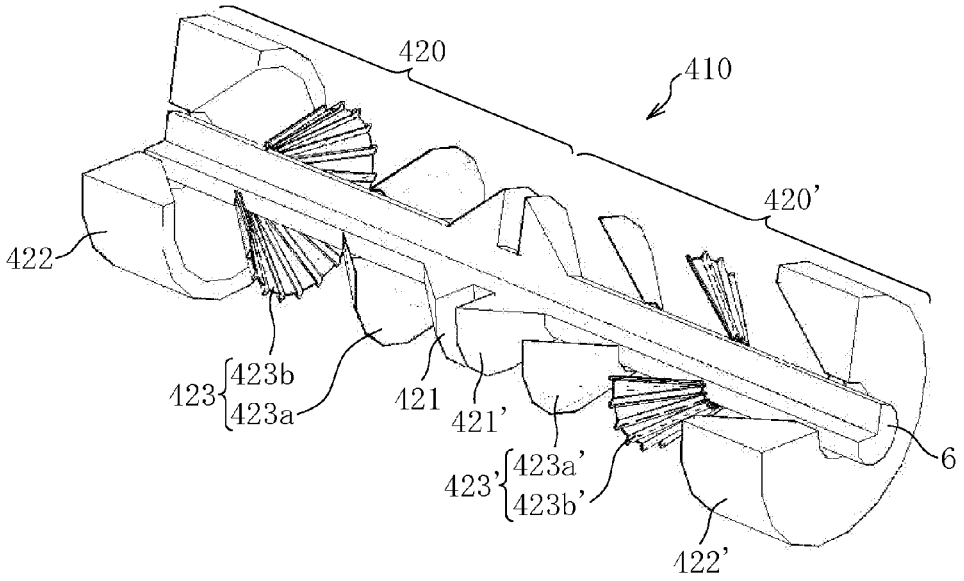
FIG. 54 is a partially cutaway exploded perspective view of the foil bearing.
Figure 55:
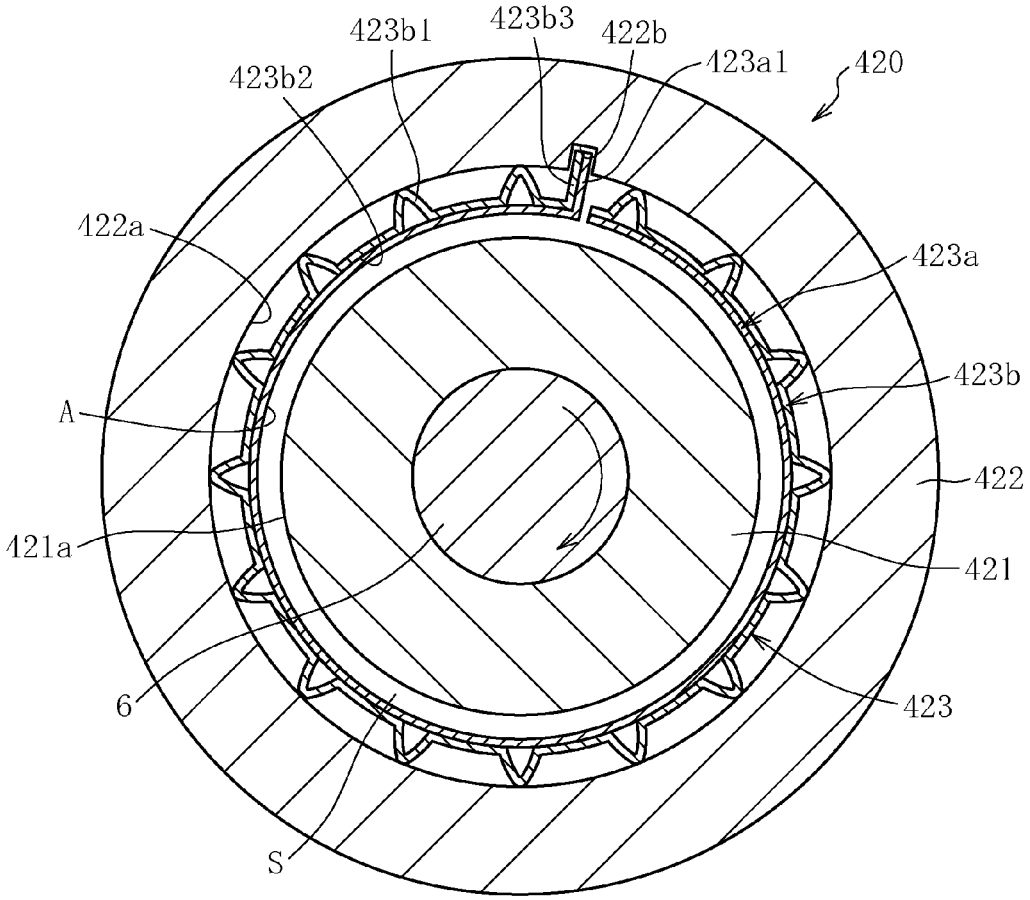
FIG. 55 is an axially orthogonal sectional view of the foil bearing.

The foil member 423 in this embodiment is of what is called a bump foil type comprising a metal top foil 423a having the bearing surface A, and a metal back foil 423b for elastically supporting the top foil 423a (refer to FIG. 54). The top foil 423a is formed of a single tapered foil, and has an inner peripheral surface that serves as the bearing surface A (refer to FIG. 55). The bearing surface A has a smooth tapered shape without pores and steps. The top foil 423a comprises one end 423a1 fitted and fixed to a groove 422b formed in the inner peripheral surface 422a of the outer member 422. The back foil 423b is formed of a single foil formed overall into a tapered shape, and is arranged between the top foil 423a and the outer member 422. The back foil 423b comprises bent portions 423b1 projected radially outward from a plurality of positions in the circumferential direction. The back foil 423b has one end 423b3 fitted and fixed to the groove 422b of the inner peripheral surface 422a of the outer member 422. The bent portions 423b1 of the back foil 423b each comprise a radially outer end that abuts against the first tapered inner peripheral surface 422a of the outer member 422, and the back foil 423b has an inner peripheral surface 423b2 that abuts against an outer peripheral surface of the top foil 423a. In this way, the back foil 423b elastically supports the top foil 423a from therearound.

The top foil 423a and the back foil 423b are each formed of a thin film foil made of a metal that is excellent in resiliency and processability, such as a steel material or a copper alloy. As in this embodiment, in the air dynamic pressure bearing that uses air as a fluid film, a lubricating oil does not exist in an atmosphere, and hence a rust inhibiting effect by an oil cannot be expected. A carbon steel and brass can be taken as typical examples of the steel material and the copper alloy. However, general carbon steel is liable to corrode due to rust, and brass may be subjected to delayed cracking due to processing strain (this liability becomes higher in proportion to a Zn content in brass). Thus, it is preferred that the belt-like foil be made of stainless steel or bronze.

The second bearing portion 420' has a pair of second tapered surfaces facing each other. In this embodiment, as illustrated in FIG. 53, the second bearing portion 420' has a second tapered outer peripheral surface 421a' provided to the projecting portion 421', and a second tapered inner peripheral surface 422a' provided to the outer member 422'. The first tapered surfaces of the first bearing portion 420 each comprise a large diameter portion arranged on one side in the axial direction (turbine 1 side, that is, the right side in FIG. 53), and the second tapered surfaces of the second bearing portion 420' each comprise a large diameter portion arranged on another side in the axial direction (compressor 2 side, that is, the left side in FIG. 53). As a result, the large diameter portion of each of the first tapered surfaces and the second tapered surfaces is arranged on an inner side in the axial direction, and the small diameter portion thereof is arranged on an outer side in the axial direction. Note that, components of the second bearing portion 420' correspond to an axial inverse of the components of the first bearing portion 420. Thus, single quotation marks are added to reference symbols of the corresponding components, and detailed description thereof is omitted.

In the foil bearing 410, along with the rotation of the shaft 6 to the one side in the circumferential direction, the bearing gaps S and S' are formed between the bearing surfaces A and A' of the first bearing portion 420 and the second bearing portion 420' and the tapered outer peripheral surfaces 421a and 421a' of the projecting portions 421 and 421'. Fluid films are formed in the bearing gaps S and S' and support the shaft 6 in the radial direction and both the trust directions in a non-contact manner (refer to FIG. 53). In particular, as in the illustrated example, when the shaft 6 is rotated parallel to the ground, the shaft 6 is decentered downward by its own weight with respect to the outer members 422 and 422'. Thus, the bearing gaps S and S' are each formed therebetween into a shape of a wedge narrowed toward the one side in the circumferential direction. Then, along with the rotation of the shaft 6, the fluid in the wedge-like bearing gaps S and S' is forced into the narrow side. As a result, pressure of the fluid films is increased.

At this time, the top foils 423a and 423a' and the back foils 423b and 423b' are flexible, and hence the bearing surfaces A and A' of the top foils 423a and 423a' are arbitrarily deformed in accordance with operating conditions such as a load, a rotation speed of the shaft 6, and an ambient temperature. Thus, the bearing gap S is automatically adjusted to have an appropriate width in accordance with the operating conditions. As a result, even under severe conditions involving high temperature and high speed rotation, the bearing gap Scan be managed to have an optimum width, and hence the shaft 6 can be stably supported.

In this way, when the bearing gaps S and S' are formed between the tapered bearing surfaces A and A' and the tapered outer peripheral surfaces 421a and 421a', the fluid films can be formed in the bearing gaps S and S' and support the shaft 6 in the radial direction and the thrust directions. Further, the first tapered surfaces and the second tapered surfaces are provided in axial symmetry, and hence the shaft 6 can be supported in both the thrust directions.

Figure 58:
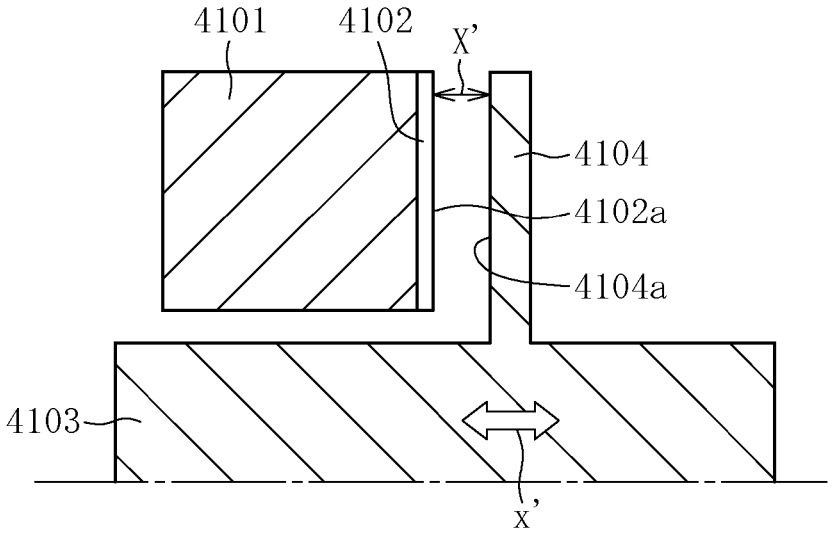
FIG. 58 is a sectional view of a foil bearing in which a bearing gap is formed in a thrust direction.
Figure 59:
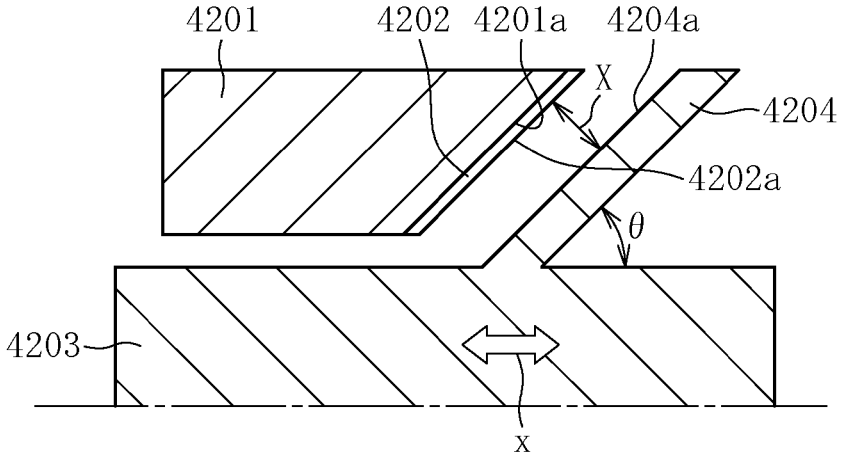
FIG. 59 is a sectional view of a foil bearing in which a bearing gap is formed in a direction inclined with respect to the thrust direction.

Further, the bearing gaps S and S' are formed in directions inclined with respect to the thrust directions (normal directions of the tapered bearing surfaces A and A'). Thus, in comparison with a case where the bearing gaps are formed in the thrust directions, an allowable moving amount in the thrust directions of the shaft 6 can be reduced (refer to FIGS. 58 and 59). With this, as illustrated in FIG. 53, a thrust gap T1 between the turbine 1 and a housing 431 that receives the turbine 1 on an inner periphery thereof, and a thrust gap T2 between the compressor 2 and a housing 432 that receives the compressor 2 on an inner periphery thereof can be set to be small. As a result, a rate of conversion by the turbine 1 and a rate of compression by the compressor 2 can be increased.

It is desired that the bearing surfaces A and A' of the foil bearing 410 be provided with coating for reducing friction of the surfaces. As the coating of this type, there may be used, for example, a DLC film, a titanium aluminum nitride film, or a molybdenum disulfide film. Such coating may be formed not only on the bearing surfaces A and A' but also on the opposed side, that is, the tapered outer peripheral surfaces 421a and 421a' of the projecting portions 421 and 421'.

Further, during an operation of the bearing, slight sliding occurs not only between a back surface of the top foil 423a (surface on an opposite side with respect to the bearing surface A) and the inner peripheral surface 423b2 of the back foil 423b, but also between bent portions 423b1 of the back foil 423b and the tapered inner peripheral surfaces 422a and 422a' of the outer members 422 and 422'. Thus, the coating described above may be formed also on those sliding parts so as to enhance abrasion resistance. Note that, in order to achieve a greater vibration damping effect, generation of a frictional force at those sliding portions to some extent may be preferred. Thus, the coating on those parts needs not have significantly low frictional property. For those reasons, it is preferred that the DLC film, the titanium, or aluminum nitride film be used as the coating on those parts.

The present invention is not limited to the embodiment described above. Note that, in the following description, parts having the same functions as those in the embodiment described above are denoted by the same reference symbols, and redundant description thereof is omitted.

Figure 56:
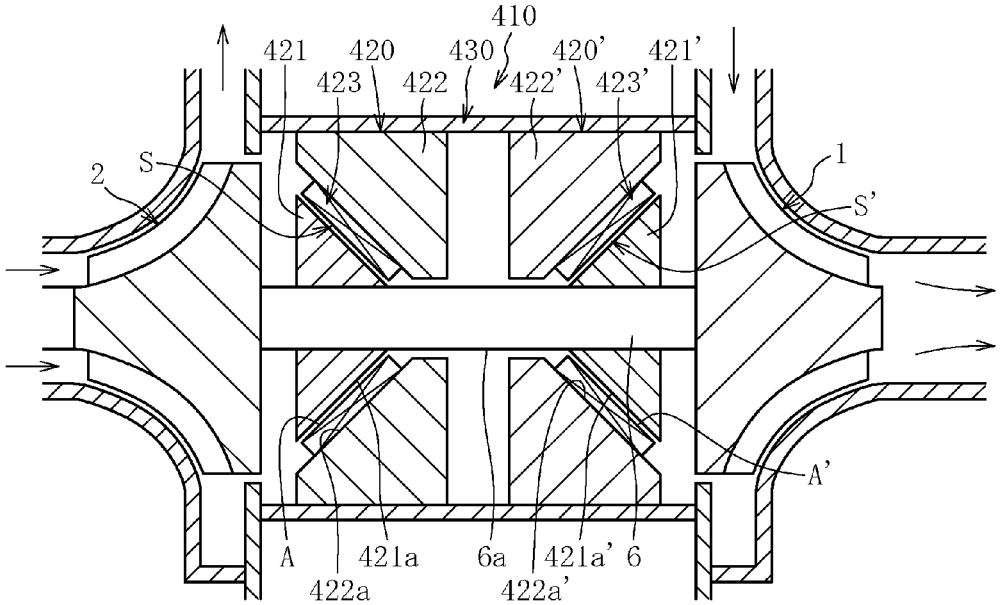
FIG. 56 is an axial sectional view of a foil bearing according to another embodiment of the fifth invention.

For example, in the embodiment illustrated in FIG. 56, the first bearing portion 420 and the second bearing portion 420' are arranged so as to locate the large diameter portions of the first tapered surfaces and the second tapered surfaces on the outer side in the axial direction. With this, an axial distance between the large diameter portions of the bearing gaps S and S' can be set to be larger than that in the embodiment illustrated in FIG. 53. A peripheral speed of the shaft 6 (projecting portions 421 and 421') with respect to the outer members 422 and 422' is higher on a large diameter side of each of the first tapered surfaces and the second tapered surfaces. Therefore, the pressure of the fluid films formed in the bearing gaps S and S' is highest on the large diameter portions of the first tapered surfaces and the second tapered surfaces. Thus, as illustrated in FIG. 56, when the axial distance between the large diameter portions of the bearing gaps S and S' (bearing span) is set to be large, a bearing rigidity, in particular, a moment rigidity of the foil bearing 410 can be increased.

Further, in the embodiment described above, the first tapered surfaces and the second tapered surfaces are formed in axial symmetry. However, the present invention is not limited thereto, and inclination angles thereof may be set to be different from each other.

Still further, in the embodiment described above, the first bearing portion 420 and the second bearing portion 420' of the foil bearing 410 each comprise the foil bearing of the bump foil type. However, the present invention is not limited thereto, and one of or both of the first bearing portion 420 and the second bearing portion 420' may comprise a foil bearing of what is called a leaf type comprising a plurality of leaf foils arranged in a circumferential array.

Figure 57:
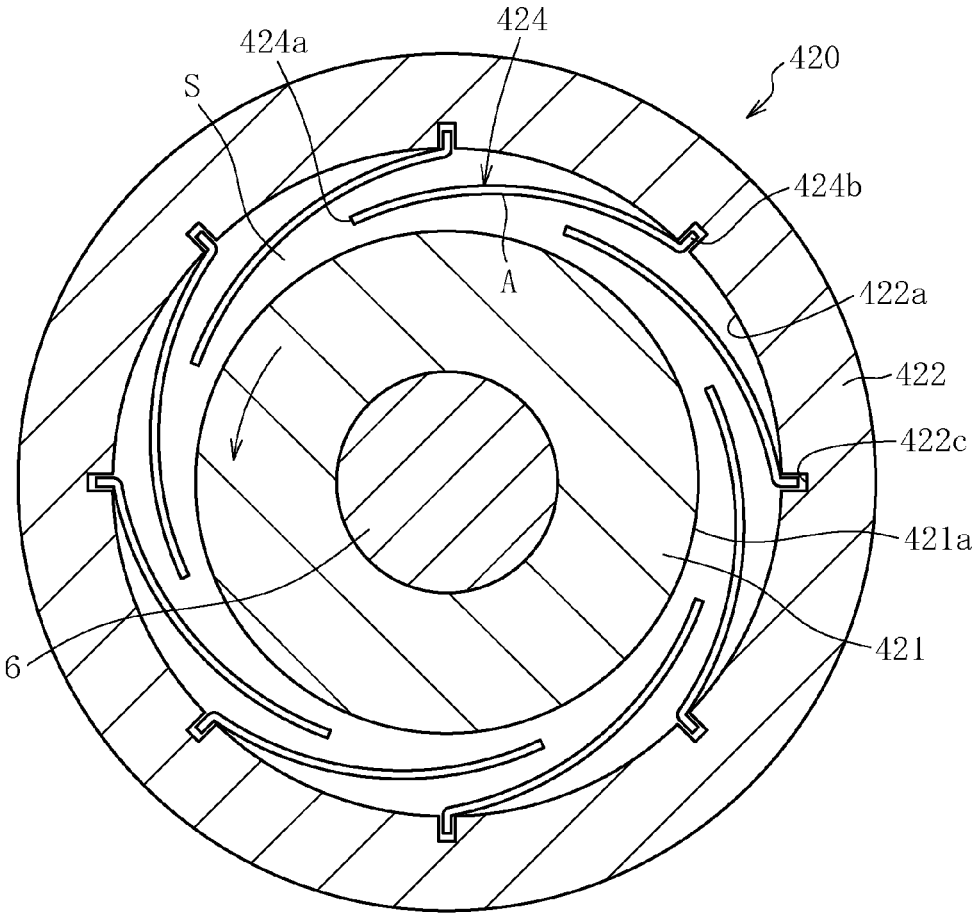
FIG. 57 is an axially orthogonal sectional view of a foil bearing according to still another embodiment of the fifth invention.

Specifically, as illustrated, for example, in FIG. 57, a plurality of leaf foils (leaves 424) as foil members can be arranged in a circumferential array along the tapered inner peripheral surface 422a of the outer member 422. The leaves 424 are each formed of a metal thin film foil, and each comprise an end portion 424a on the one side in the circumferential direction (forward side in the rotational direction of the shaft 6 (refer to the arrow)), and an end portion 424b on another side in the circumferential direction, the end portion 424a being provided as a free end, the end portion 424b being fixed to the outer member 422. The fixed end 424b of the leaf 424 is fitted and fixed to a groove 422c formed in the inner peripheral surface 422a of the outer member 422. A partial region on the free end 424a side of the leaf 424 is arranged to overlap in the radial direction with another leaf 424. The plurality of leaves 424 each have a radially inner surface that serves as the smooth bearing surface A without pores or steps, and the wedge-like bearing gaps S narrowed in the radial direction toward the one side in the circumferential direction are formed between the bearing surfaces A of the leaves 424 and the outer peripheral surface 421a of the projecting portion 421.

By the way, in the foil bearing of the bump foil type, when the shaft 6 is rotated parallel to the ground (refer to FIG. 53), the shaft 6 is decentered downward by its own weight with respect to the outer members 422 and 422' as described above. As a result, the wedge-like bearing gaps are formed therebetween. However, for example, when the shaft 6 is rotated perpendicular to the ground, the shaft 6 is self-aligned by its own weight with a bearing center along the tapered surfaces. Thus, the wedge-like bearing gaps are not formed, and hence the pressure of the fluid films is difficult to increase. Meanwhile, in the leaf type foil bearing illustrated in FIG. 57, the wedge-like bearing gaps S are formed even under a state in which the shaft 6 is arranged at the bearing center. Thus, higher pressure can be generated irrespective of a decentered state of the shaft 6. In this way, in view of feasibility of reducing the number of components, and feasibility of easily adjusting spring property of the back foil, it is preferred to employ the foil bearing of the bump foil type. Meanwhile, when the shaft 6 is perpendicular to the ground, or when thrust loads are higher than a radial load, it is preferred to employ the leaf type foil bearing.

Further, in the embodiment described above, the foil bearing 410 comprises the first bearing portion 420 and the second bearing portion 420' for supporting the shaft 6 respectively in one of the thrust directions and the another of the thrust directions. However, the present invention is not limited thereto, and the foil bearing 410 may comprise merely one of the bearing portions.

Still further, in the embodiment described above, the foil members 423 and 423' are fixed to the members on the fixed side (outer members 422 and 422'). However, reversely, the foil members 423 and 423' may be fixed to the members on the rotary side (projecting portions 421 and 421' of the shaft 6). In this case, the bearing gaps S and S' are formed between the bearing surface A of each of the foil members 423 and 423' and the tapered inner peripheral surfaces 422a and 422a' of the outer members 422 and 422'. However, when the foil members are fixed to the members on the rotary side, the foil members are rotated at high speed, and hence the foils may be deformed due to the centrifugal force. Thus, in view of avoiding the deformation of the foils, it is preferred that the foil members be mounted to the members on the fixed side as in the embodiment described above.

Yet further, in the embodiment described above, the foil bearing 410 according to the present invention is applied to a gas turbine. However, the present invention is not limited thereto, and the foil bearing 410 may be applied, for example, to a supercharger as illustrated in FIG. 14.

The foil bearing according to the present invention can be used not only in the micro turbine or the supercharger, but widely used also as bearings for vehicles such as an automobile, which are used under restrictions such as a difficulty in lubricating with a liquid such as a lubricating oil, a difficulty in separately providing an auxiliary device of a lubricating oil circulatory system in view of energy efficiency, or problems that may be caused by shearing resistance of the liquid. The foil bearing according to the present invention can be widely used also as bearings for industrial devices.

Note that, the foil bearing described above is suited to a case where air is used as a lubricant, but is applicable to other gases, and is operated through intermediation of a liquid such as water and an oil.

The structures according to the embodiments of the first to fifth inventions of the present application described above may be appropriately combined with each other.

REFERENCE SIGNS LIST

1 turbine
2 compressor
3 power generator
4 combustor
5 regenerator
6 shaft
7 air-intake port
8 inverter
9 exhaust heat recovery device
10 radial foil bearing
20 thrust foil bearing
21 thrust member
22 foil member
30 foil
31 leaf
31a free end
31b end portion
31c thrust bearing surface
32 coupling portion
40 flange portion
42 casing
R radial bearing gap
T thrust bearing gap

The invention claimed is:

1. A thrust foil bearing comprising:

a thrust member; and a foil member mounted to an end surface of the thrust member and having a thrust bearing surface that forms a thrust bearing gap, wherein the foil member comprises a plurality of foils, each of the plurality of foils integrally comprising a plurality of leaves and a coupling portion for coupling the plurality of leaves to each other, wherein each of the plurality of leaves comprises a free end on one side in a circumferential direction, and the thrust bearing surface, wherein each of the plurality of foils has slits formed therein to form the plurality of leaves and the coupling portion, and wherein the plurality of leaves of one of the plurality of foils are inserted through the slits of another of the plurality of foils so as to arrange the plurality of leaves of the one of the plurality of foils and the plurality of leaves of the another of the plurality of foils alternately to each other in the circumferential direction.

2. The thrust foil bearing according to claim 1, wherein the free end of each of the plurality of leaves comprises a radially outer edge inclined radially inward to a forward side in a rotational direction of a rotary member.

3. The thrust foil bearing according to claim 2, wherein the free ends of the plurality of leaves are arranged in a spiral pattern that feeds air into the thrust bearing gap.

4. The thrust foil bearing according to claim 2, wherein the free ends of the plurality of leaves are arranged in a herringbone pattern.

5. The thrust foil bearing according to claim 1, further comprising support portions arranged to respectively support the plurality of leaves from an opposite side with respect to the thrust bearing surface.

6. The thrust foil bearing according to claim 1, further comprising a coating provided on the thrust bearing surface of each of the plurality of leaves.

7. The thrust foil bearing according to claim 1, further comprising a coating provided on a surface on an opposite side with respect to the thrust bearing surface of each of the plurality of leaves.

8. The thrust foil bearing according to claim 1, wherein the thrust foil bearing is used for supporting a rotor of a gas turbine.

9. The thrust foil bearing according to claim 1, wherein the thrust foil bearing is used for supporting a rotor of a supercharger.

*10. A foil bearing, comprising:*

*a fixed member comprising a flat end surface;*

*a rotary member comprising a flat end surface opposed to the flat end surface of the fixed member;*

*a plurality of leaf foils formed separately from each other and the fixed member, each of the plurality of leaf foils being independently attached to the flat end surface of the fixed member, the plurality of leaf foils forming an equiangular array, each of the plurality of leaf foils comprising a free end on one side thereof in a circumferential direction, and each of the plurality of leaf foils having a bearing surface opposed to the flat end surface of the rotary member; and*

*a plurality of thrust bearing gaps, each of the plurality of thrust bearing gaps being formed between the bearing surface of each of the plurality of leaf foils and the flat end surface of the rotary member, and*

*wherein the free end of each of the plurality of leaf foils comprises:*

*a plurality of cutout portions; and*

*a plurality of land portions that are continuous with the bearing surface, and*

*wherein the plurality of cutout portions and the plurality of land portions alternate with respect to each other.*

*11. The foil bearing according to claim 10, wherein the plurality of cutout portions and the plurality of land portions of the free end of each of the plurality of leaf foils form a zigzag shape.*

*12. The foil bearing according to claim 10, wherein the plurality of cutout portions and the plurality of land portions of the free end of each of the plurality of leaf foils form a corrugated shape.*

*13. The foil bearing according to claim 10, further comprising a coating provided on the bearing surfaces of the plurality of leaf foils.*

*14. The foil bearing according to claim 10, further comprising a coating provided on surfaces of the plurality of leaf foils that are on an opposite side of the plurality of leaf foils with respect to the bearing surfaces.*

*15. The foil bearing according to claim 13, wherein the coating comprises any one of a DLC film, a titanium aluminum nitride film, or a molybdenum disulfide film.*

*16. The foil bearing according to claim 13, wherein each of the plurality of thrust bearing gaps comprises:*

*a small gap portion formed near the free end of the bearing surface of each of the leaf foils; and*

*a large gap portion formed at another side in the circumferential direction with respect to the small gap portion, and*

*wherein, as the rotary member rotates, a part of air in the small gap portions passes toward back sides of the plurality of leaf foils through the cutout portions.*

*17. A foil bearing, comprising:*

*a fixed member comprising a cylindrical inner peripheral surface;*

*a rotary member comprising a cylindrical outer peripheral surface opposed to the cylindrical inner peripheral surface of the fixed member;*

*a plurality of leaf foils formed separately from each other and the fixed member, each of the plurality of leaf foils being independently attached to the cylindrical inner peripheral surface of the fixed member, the plurality of leaf foils forming an equiangular array, each of the plurality of leaf foils comprising a free end on one side thereof in a circumferential direction, and each of the plurality of leaf foils having a bearing surface opposed to the cylindrical outer peripheral surface of the rotary member; and*

*a plurality of radial bearing gaps, each of the plurality of radial bearing gaps being formed between the bearing surface of each of the plurality of leaf foils and the cylindrical outer peripheral surface of the rotary member, and*

*wherein the free end of each of the plurality of leaf foils comprises:*

*a plurality of cutout portions; and*

*a plurality of land portions that are continuous with the bearing surface,*

*wherein the plurality of cutout portions and the plurality of land portions alternate with respect to each other.*

*18. The foil bearing according to claim 17, wherein each of the plurality of radial bearing gaps comprises:*

*a small gap portion formed near the free end of the bearing surface of each of the leaf foils; and*

*a large gap portion formed at another side in the circumferential direction with respect to the small gap portion, and*

*wherein, as the rotary member rotates, a part of air in the small gap portions passes toward back sides of the plurality of leaf foils through the cutout portions.*

* * * * *